(12) United States Patent
Okada et al.

(10) Patent No.: US 6,745,282 B2
(45) Date of Patent: Jun. 1, 2004

(54) COMPRESSED DATA MANAGING APPARATUS AND METHOD THEREFOR TO MANAGE COMPRESSED DATA OF A DISK STORAGE

(75) Inventors: Yoshiyuki Okada, Kawasaki (JP); Masanaga Tokuyo, Kawasaki (JP); Shigeru Yoshida, Kawasaki (JP); Hiroyuki Shimoi, Kawasaki (JP); Naoaki Okayasu, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 0 days.

(21) Appl. No.: 10/294,766

(22) Filed: Nov. 15, 2002

(65) Prior Publication Data
US 2003/0084238 A1 May 1, 2003

Related U.S. Application Data

(62) Division of application No. 08/573,458, filed on Dec. 15, 1995.

(30) Foreign Application Priority Data

Jan. 13, 1995 (JP) ................................................. 7-4492
Oct. 2, 1995 (JP) ............................................. 7-255416

(51) Int. Cl.[7] ............................................. G06F 12/00
(52) U.S. Cl. .......................... 711/112; 711/159; 711/165
(58) Field of Search .................................. 711/112, 159, 711/165

(56) References Cited

U.S. PATENT DOCUMENTS

| 5,237,460 A | 8/1993 | Miller et al. .................. 360/8 |
| 5,574,952 A | 11/1996 | Brady et al. .................. 710/68 |
| 5,606,706 A | 2/1997 | Takamoto et al. .......... 711/100 |
| 5,915,129 A | 6/1999 | Slivka et al. .................. 710/68 |

FOREIGN PATENT DOCUMENTS

JP           6-332622         12/1994

OTHER PUBLICATIONS

U.S. patent application Ser. No. 08/573,458, Okada et al., filed Dec. 15, 1995.

Primary Examiner—Reginald G. Bragdon
(74) Attorney, Agent, or Firm—Staas & Halsey LLP

(57) ABSTRACT

An apparatus and method include allocating a compressed segment representing data that is obtained by assembling pieces of the data requested to write, and compressing the assembled data to a compression sector representing a block; changing, when updating content of the compressed segment in the compression sector recorded in said disk storage device, an area storing the compressed segment corresponding to an updating target into an invalid data area; comparing a size of the invalid data area in the compression sector recorded in said disk storage device with a preset fiducial value; and reading, from the disk storage device when the size of invalid data is larger than the preset fiducial value with respect to a certain compression sector, all of the compressed segments, exclusive of the invalid data, being allocated to the certain compression sector releasing a storage area of the storage device recording the certain compression sector.

4 Claims, 50 Drawing Sheets

FIG. 3

| WRITE POSITION COLUMN | COMPRESSION FACTOR COLUMN | RECORD POSITION COLUMN | VALID/INVALID COLUMN |
|---|---|---|---|
| 0 0 0 0 | 1 | 0 0 0 0 0 | VALID |
| 0 0 0 1 | 1 | 0 0 0 0 2 | INVALID |
| 0 0 0 2 | 2 | 1 9 9 9 8 | VALID |
| ... | ... | ... | ... |
| ... | ... | ... | ... |

(a)

| COMPRESSED SEGMENT AREA RATE COLUMN | HEAD POSITION COLUMN | ALLOCABLE NUMBER COLUMN | ALLOCATED NUMBER COLUMN | NEW ALLOCATING POSITION COLUMN |
|---|---|---|---|---|
| ① 5% | 0 0 0 0 0 | 5 2 4 2 8 | 1 0 0 | |
| ② 50% | 1 9 9 9 8 | 2 6 2 1 4 4 | 5 0 0 0 | |
| ③ 30% | 1 1 9 9 9 8 | 1 0 4 8 5 8 | 6 0 0 | |
| ④ 15% | 1 6 3 3 3 4 | 3 9 3 2 2 | 2 0 | |

(b)

F I G. 32
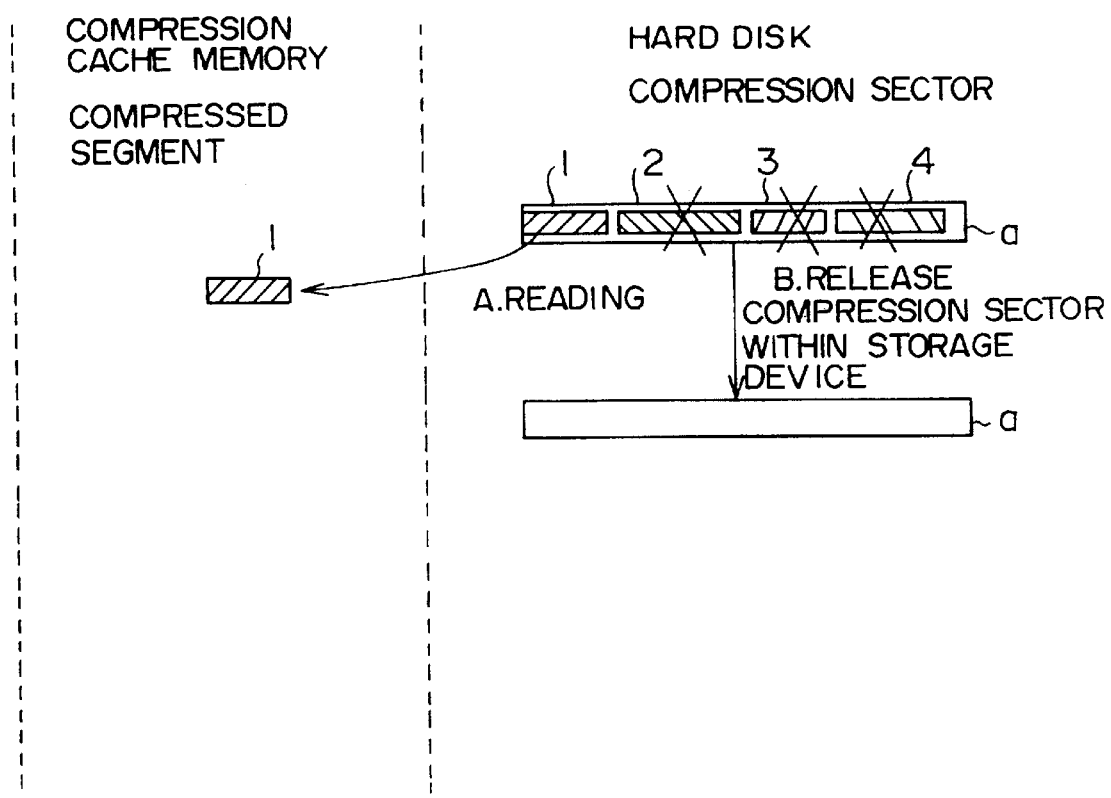

COMPRESSED DATA MANAGING APPARATUS AND METHOD THEREFOR TO MANAGE COMPRESSED DATA OF A DISK STORAGE

CROSS-REFERENCE TO RELATED APPLICATIONS

This application is a divisional of application Ser. No. 08/573,458, filed Dec. 15, 1995 now pending.

This application is based upon and claims priority of Japanese patent application nos. 7-4492, filed Jan. 13, 1995, 7-255416, filed Oct. 2, 1995, and U.S. patent application Ser. No. 08/573,458, filed Dec. 15, 1995, the contents being incorporated herein by reference.

BACKGROUND OF THE INVENTION

The present invention relates generally to a storage controlling apparatus and, more particularly, to a storage controlling apparatus to control a disk storage device having a rotary type storage medium, such as a floppy disk, a magnetic disk, an optical disk and a magneto-optic disk.

Further, the present invention relates generally to a method of controlling a disk storage device and, more particularly, to a method of controlling the disk storage device having a rotary type storage medium, such as floppy disk, a magnetic disk, an optical disk and a magneto-optic disk.

Moreover, the present invention relates generally to a method of managing compressed data and, more particularly, to a method of managing compressed data in a disk storage device having a rotary type storage medium, such as a floppy disk, a magnetic disk, an optical disk and a magneto-optic disk.

With an advancement of software and a spread of multimedia, the data in a variety of forms such as images, voices, fonts, etc. are dealt with. Then, a disk storage device having a larger storage capacity is demanded to store such data.

Successive introductions of the disk storage devices having large storage capacities are not economical, and a change in the system involves a loss of time, which is not an ignorable aspect.

Then, there is developed a technology of apparently increasing the capacity of the disk storage device by compressing the data (hereinafter simply expressed by a compression) instead of an augment in a capacity of the disk storage device. This data compression is conducted by use of software on one hand and by use of hardware on the other hand.

The software-assisted compression is actualized as one function of, e.g., an OS (Operating System). Then, when an application outputs an item of write data, the data is automatically compressed and recorded on a disk recording device.

On the other hand, the hardware-assisted compression is actualized as one function of an apparatus interposed between a host (computer, etc.) and the disk recording device. Such an apparatus is termed a in the present specification.

According to this storage controlling apparatus, the write data outputted from the host is compressed and written (recorded) to the disk storage device. A record position of the write data after being compressed is, however, normally different from a write position designated from the host.

It is because a data length of the post-compression write data is normally smaller than a data length of the write data outputted from the host. Therefore, if the post-compression write data is recorded in the write position designated from the host, an unused record area is generated, with the result that the disk storage device is not effectively employed.

Then, it is required that the disk storage device be effectively used by recording the compressed data in a position different from the write position designated from the host. This kind of technique is called a in the present specification.

For example, a CFS (Cluster File System), an LFS (Log File System), a fixed mapping system, etc., are known as a compressed data management.

Based on the CFS, one or more pieces of write data are assembled into one item of data and thereafter compressed, thereby generating the data known as a compressed segment. Then, these compressed segments are classified according to sizes (data lengths) thereof. Subsequently, the compressed segments each having the same size are recorded on the disk recording device, thus, managing the compressed data. Note that a size of the compressed segment serves to determine which area on the disk recording device to record the compressed segment.

According to the LFS, each time the data is updated, the updated data is written to a rearmost area on the disk storage device that is now used, and the pre-updating compressed data is invalidated. Then, cleaning (rearrangement) such as a garbage collection, etc. is executed for a null time, and invalid data extending from a head down to a rearmost area are compacted, thus, managing the compressed data.

According to the fixed mapping system, the compressed data are managed by making use of a mapping table created in accordance with (preset) stages of compression ratios of the compressed data. The fixed mapping system requires an exceptional process for the data compressed at a compression ratio under the set compression ratio. The exceptional process may be a process of writing the data having an unexpected data length in an area secured otherwise.

In the case of the above software-assisted compression, a CPU time consumes for the compression processing, resulting in such a defect that an extra load is applied on the CPU.

On the other hand, in the case of the hardware-assisted compression, though no extra load is applied on the CPU, the following problems arise.

To start with, the CFS has a possibility in which a seek happens many times because of a record position on the disk storage device being different per compressed segment, and a reading/writing performance declines. Further, when the area for recording the compressed segment having a given size (data length) is full of the compressed segments, the problem is how the compressed segments of the same size are recorded.

Next, the LFS presents a problem in which a usability remarkably declines due to a temporary inaccessibility from the host during the cleaning operation.

SUMMARY OF THE INVENTION

The present invention relates to a storage controlling apparatus capable of performing a software-unassisted compression by controlling a disk storage device.

Further, the present invention relates to a method of controlling a disk storage device for performing the software-unassisted compression.

Moreover, the present invention relates to a method of managing compressed data that is capable of making a compression ratio effective, avoiding a decline of usability due to cleaning and optimizing a seek.

The present invention provides a method of managing compressed data, including: an allocating operation allocating a compressed segment representing data that is obtained by assembling plural pieces of the data requested to write, and compressing the assembled data to a compression sector representing a block having a predetermined length; a compression sector recording operation recording the compression sector including at least one compressed segment on a disk storage device; an invalid data area changing operation changing, when updating content of the compressed segment in the compression sector recorded in said disk storage device, an area storing the compressed segment corresponding to an updating target into an invalid data area, wherein the compressed segment corresponding to the updating target in the invalid data area becomes invalid data by updating; a comparing operation comparing a size of the invalid data area in the compression sector recorded in said disk storage device with a preset fiducial value, with respect to each compression sector recorded in the disk storage device; an operation of determining whether the size of the invalid data area is larger than the preset fiducial value; and a releasing process executing operation reading, from the disk storage device when determining that the size of invalid data is larger than the preset fiducial value with respect to a certain compression sector, all of the compressed segments, exclusive of the invalid data, being allocated to the certain compression sector releasing a storage area of the disk storage device recording the certain compression sector.

The present invention provides a compressed data managing apparatus, including: means for allocating one or more compressed segments to at least one compression sector, each compressed segment representing data that is obtained by assembling plural pieces of the data requested to write, and compressing the assembled data, and the compression sector representing a block having a predetermined length; means for recording the compression sector allocated with at least one compressed segment on a disk storage device; means for changing, when updating content of the compressed segment in the compression sector recorded in the disk storage device, an area storing the compressed segment corresponding to an updating target included in the compression sector into an invalid data area, wherein the compressed segment corresponding to the updating target in the invalid data area becomes invalid data by updating; means for comparing a size of the invalid data area in the compression sector with a preset fiducial value, with respect to each compression sector recorded in the disk storage device; means for determining whether the size of the invalid data area is larger than the preset fiducial value; and means for reading, from the disk storage device, when determining that the size of invalid data area is larger than the preset fiducial value with respect to certain compression sector, all of the compressed segments, exclusive of the invalid data, being allocated to the certain compression sector and releasing a storage area of the disk storage device recording the certain compression sector.

BRIEF DESCRIPTION OF THE DRAWINGS

Other aspects and/or advantages of the present invention will become apparent during the following discussion in conjunction with the accompanying drawings, in which:

FIG. 3 is a diagram showing a management table provided in a disk data management unit;

FIG. 32 is a diagram showing an example of releasing the compression sector;

DESCRIPTION OF THE PREFERRED EMBODIMENTS

Embodiments of the present invention will hereinafter be discussed with reference to the drawings.

1. Outline of the Embodiment

This embodiment is concerned with a storage controlling apparatus causing a disk storage unit (hereinafter referred to as a hard disk), having no compression/decompression function, to actualize the compression/decompression functions.

2. Whole Construction

Figure 1:
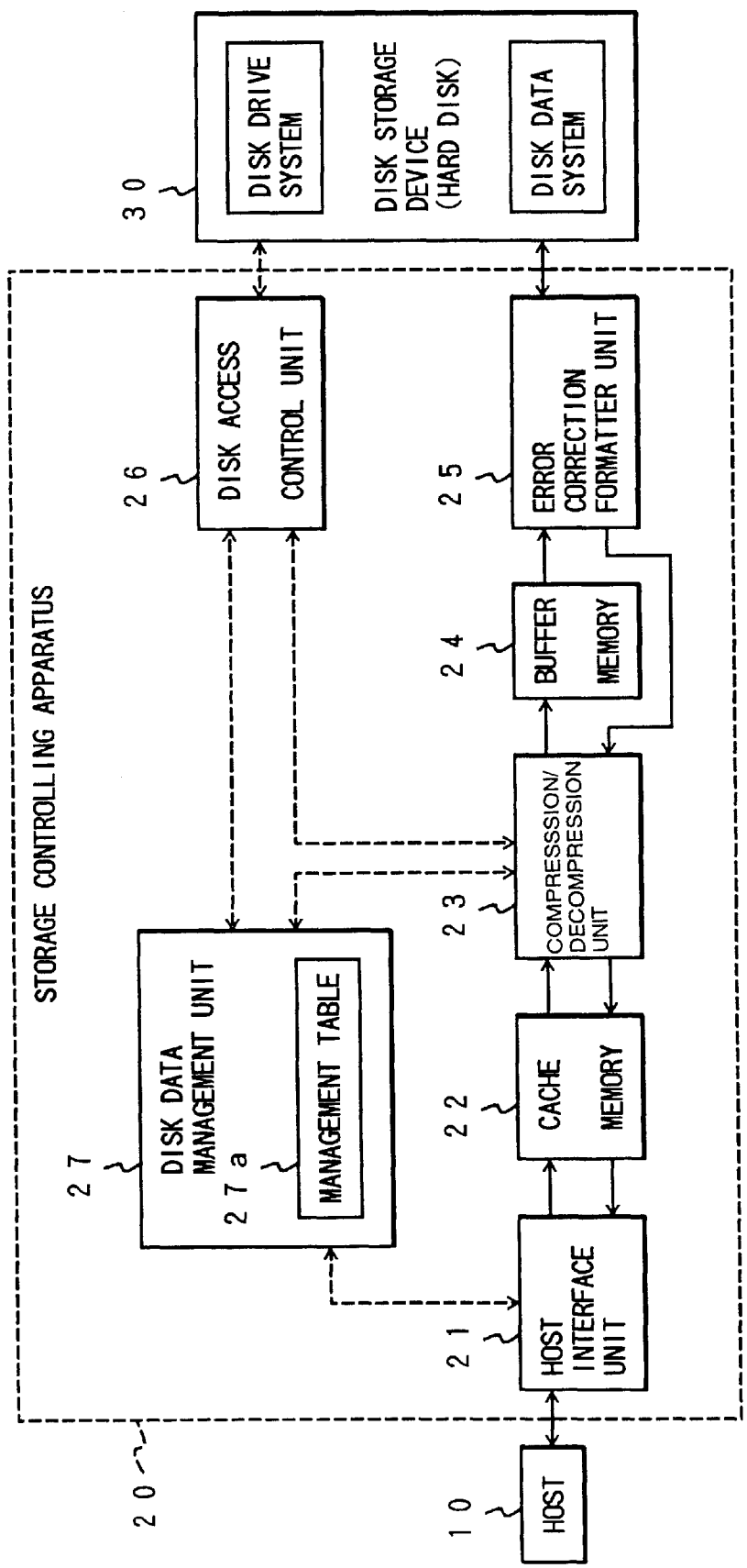
FIG. 1 is a block diagram of a block diagram showing the principle of a disk storage controlling apparatus according to the present invention, in accordance with an embodiment of the present invention.

FIG. 1 is a diagram illustrating a construction in the embodiment. As shown in FIG. 1, a host 10 and a hard disk 30 are connected to a storage controlling apparatus 20.

(Host 10)

The host 10 is a device to perform writing/reading processes with respect to the hard disk 30 without being aware of the storage controlling apparatus 20 and involves a use of, specifically, a work station, a personal computer, etc.

The host 10, to perform the writing process outputs an item of write data and a writing position for the write data.

Further, the host 10, to effect the reading process outputs a position where the read data is recorded (hereinafter termed a reading position).

Note that the host 10 writes and reads the data to and from the hard disk 30, wherein typically the data having a size on the order of 4K bytes serves as one unit. This item of 1-unit data is known as a logical sector.

(Hard Disk 30)

Employed is the hard disk 30 of such a type as to incorporate no compression/decompression function, and the data compressed by the storage controlling apparatus 20 is written (recorded) to the hard disk 30.

(Storage Controlling Apparatus 20)

The storage controlling apparatus 20 compresses the write data input from the host 10 and writes the compressed data to the hard disk 30. A size of the thus compressed write data is smaller than before being compressed. Accordingly, if the write data is written in the write position designated by the host 10, a recording area of the hard disk 30 cannot be effectively used.

To cope with this, the storage controlling apparatus 20 effects a process of effectively using the reading area of the hard disk 30, i.e., a compressed data management process by writing the write data in a position different from the write position designated by the host 10.

Then, the storage controlling apparatus 20, when inputting a reading request from the host 10, decompresses the data read from the hard disk 30 and outputs the decompressed data to the host 10.

Next, the constructive elements of the storage controlling apparatus 20 will be described with reference to FIG. 1.

(A) Host Interface Unit 21

A host interface unit 21 is connected to a disk data management unit 27 and a cache memory 22 as well as being connected to the host 10.

Also, the host interface unit 21 interfaces with the host 10. That is, the host interface unit 21 inputs write and read instructions, etc. from the host 10 and outputs the read data to the host 10.

(B) Cache Memory 22

The cache memory 22 is connected to the host interface unit 21 and a compression/decompression unit 23.

Further, the cache memory 22 temporarily stores the write data input from the host interface unit 21.

Then, the cache memory 22 inputs the decompressed read data from the compression/decompression unit 23 and temporarily stores the same data.

(C) Compression/Decompression Unit 23

The compression/decompression unit 23 is connected to the disk data management unit 27, a disk access control unit 26, the cache memory 22, a buffer memory 24 and an error correction formatter unit 25.

Also, the compression/decompression unit 23, after collecting one or more pieces of write data stored in the cache memory 22, compresses the collected data. At this time, the disk data management unit 27 is notified of a result of the compression.

Then, the compression/decompression unit 23 decompresses the read data input from the error correction formatter unit 25.

(D) Buffer Memory 24

The buffer memory 24 temporarily stores the write data compressed by the compression/decompression unit 23.

(E) Error Correction formatter Unit 25

The error correction formatter unit 25 adds a code for an error correction to the post-compression write data stored in the buffer memory 24 and records the same data on the hard disk 30.

Based on the error correction code, the error correction formatter unit 25 also corrects the data read from the hard disk 30.

(F) Disk Data Management Unit 27

The disk data management unit 27 is connected to the host interface unit 21, the compression/decompression unit 23 and the disk access control unit 26.

Further, the disk data management unit 27 includes a management table 27a stored with a correspondence relationship between the write position of the write data designated by the host 10 and a record position of the post-compression write data.

Herein, the management table 27a is formed of two tables shown in FIGS. 3(a) and 3(b).

A first table illustrated in FIG. 3(a) has a write position column, a compression ratio column, a record position column and a valid/invalid column.

The write position column is a column stored with the write position of the write data designated by the host 10 and, more specifically, stored with 4-digit hexadecimal numbers starting from "0000". It is to be noted that this number is called a.

The compression ratio column is a column stored with an item of data indicating a compression ratio at which the write data is compressed by the compression/decompression unit 23. The numerals "1" and "2" shown in the compression ratio column of FIG. 3 correspond to areas (1) and (2) in FIG. 4 respectively. Hence, it follows that the write data having a write position of 0002H (H represents a symbol giving an indication of being a hexadecimal number) is compressed at a compression ratio between 1/4–1/2.

The record position column is a column stored with a piece of information indicating which position to record the write data on the hard disk 30 after compressing the write data designated with the write position shown in the write position column. To be specific, the record position column is stored with the 4-digit hexadecimal numbers starting from "0000". Note that this number is called a.

The valid/invalid column is a column stored with a piece of data indicating whether a content of the data recorded with the record position shown in the record position column is valid or invalid. Seeing if the data is valid or invalid will be stated later. As one example, however, if the already-recorded data is to be updated, and if a record position of the post-updating data is different from a record position of the pre-updating data, the record position of the pre-updating data is invalidated.

A second table shown in FIG. 3(b) has a compressed segment area rate column, a head position column, an allocable number column, an allocated number column and a new allocation position column.

The compressed segment area rate column is a column stored with a value indicating which rate to set a compressed segment area, defined as one of a plurality of segmented record areas on the hard disk 30. The rate indicates an occupation ratio of the compressed segment when compared to the disk. The illustrated percentage is the number of compressed segments within a compressed segment area compared to the total number of blocks. Referring to FIG. 3(b), four compressed segment areas, namely area $\hat{1}$, area $\hat{2}$, area $\hat{3}$, and area $\hat{4}$ are set at 5%, 50%, 30% and 1%, respectively.

The head position column is a column stored with data indicating which position to set the compressed segment area on the hard disk 30 and, specifically, stored with the 4-digit hexadecimal numbers. For example, when the whole capacity of the hard disk 30 is 1 G byte (=1,073,741,824 bytes) and a size of a 1-unit physical block is 512 bytes, it follows that the hard disk 30 is formed with physical blocks of 2,097,12 units. When the numerical value of 2,097,12 is expressed in hexadecimal numbers, in accordance with the rate shown in the compressed segment area rate column, it turns out a value shown in the head position column of FIG. 3(b).

The allocable number column is a column stored with numbers allocable to the respective compressed segment areas.

The allocated number column is a column stored with the numbers that have already been allocated among the values shown in the allocable number column.

The new allocation position column is a column stored with a value indicating which position to enable the allocation to start in each compressed segment area.

(G) Disk Access Control Unit 26

The disk access control unit 26 is connected to the disk data management unit 27, the compression/decompression unit 23 and the hard disk 30.

Also, the disk access control unit 26 controls a disk access to the hard disk 30 so that the write data to which the error correction formatter unit 25 adds the error correction code is recorded in the record position stored in the management table 27a incorporated into the disk data management unit 27.

2.1 Modified Example of Whole Construction

Figure 2:
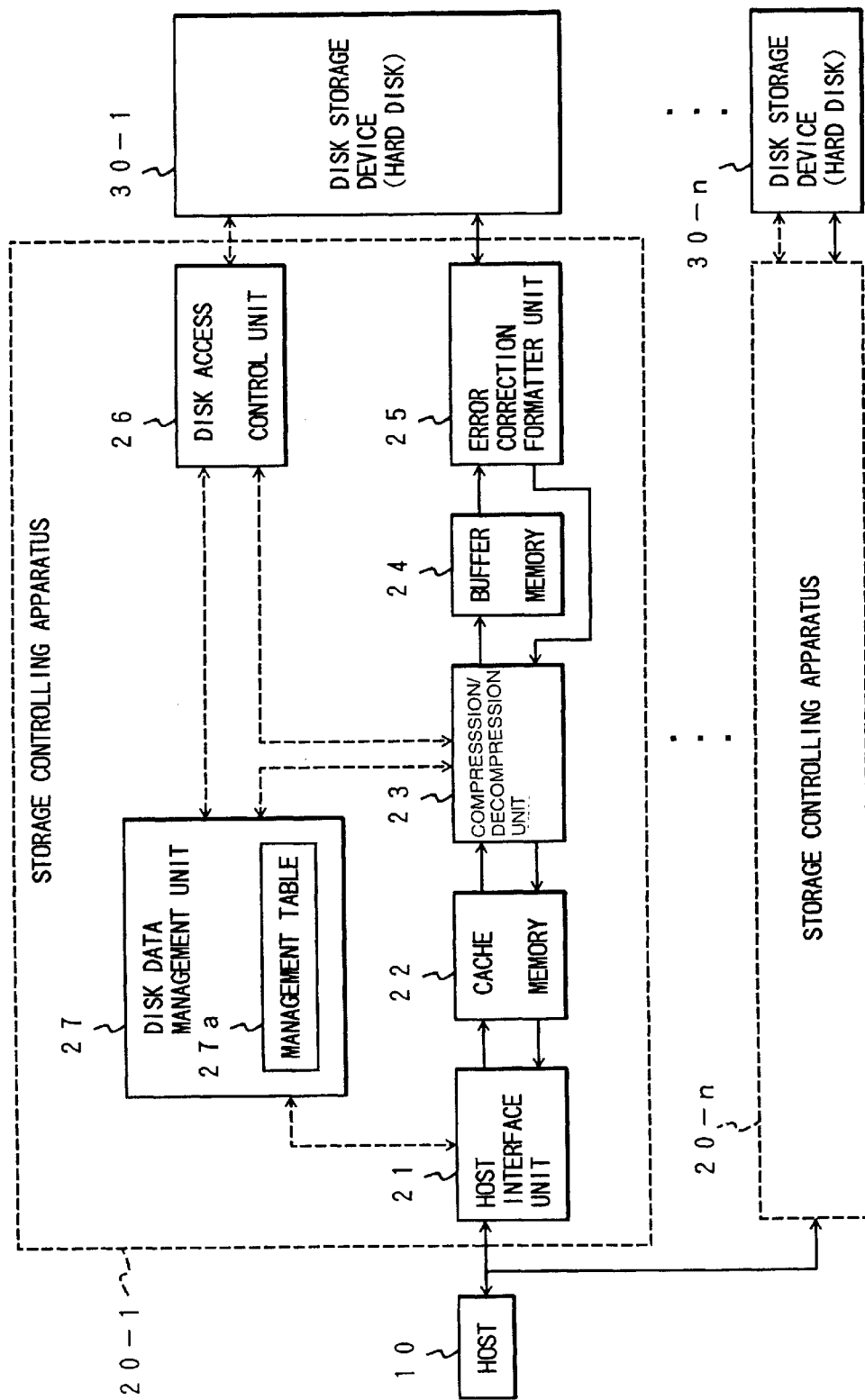
FIG. 2 is a block diagram illustrating a modified example of the embodiment.

FIG. 2 is a diagram illustrating a construction of a modified example of the embodiment. As seen from FIG. 2, if a plurality of hard disks 30 are provided, the storage controlling apparatus 20 may be connected to each hard disk 30. If constructed in this way, the arrangement is applicable to the hard disk 30 as well that is actualized as a disk array device (RAID: Redundant Arrays of Inexpensive Disks).

Further, the construction may also be such that the storage controlling apparatus 20 may be incorporated into the hard disk 30.

3. Compressed Data Management by CFS System

Next, the compressed data management conducted by the storage controlling apparatus 20 will be explained. The compressed data management which will be described herein is based on the CFS system discussed in the prior art.

3.1 Processing Concept of Compressed Data Management by CFS System

3.1.1 Unit for Compressed Data Management

Figure 4:
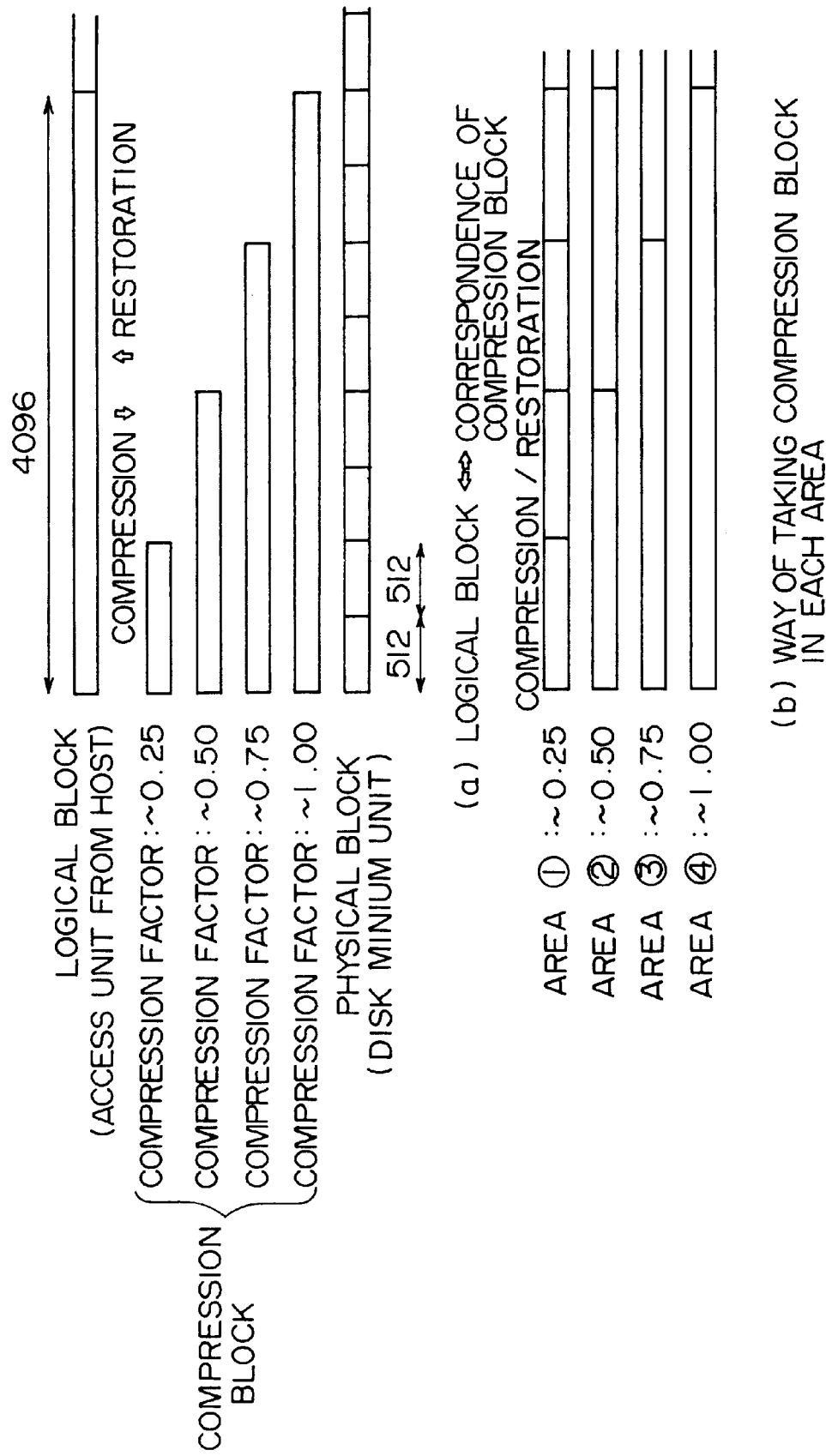
FIG. 4 is a diagram showing a unit for a data management (part 2)
Figure 5:
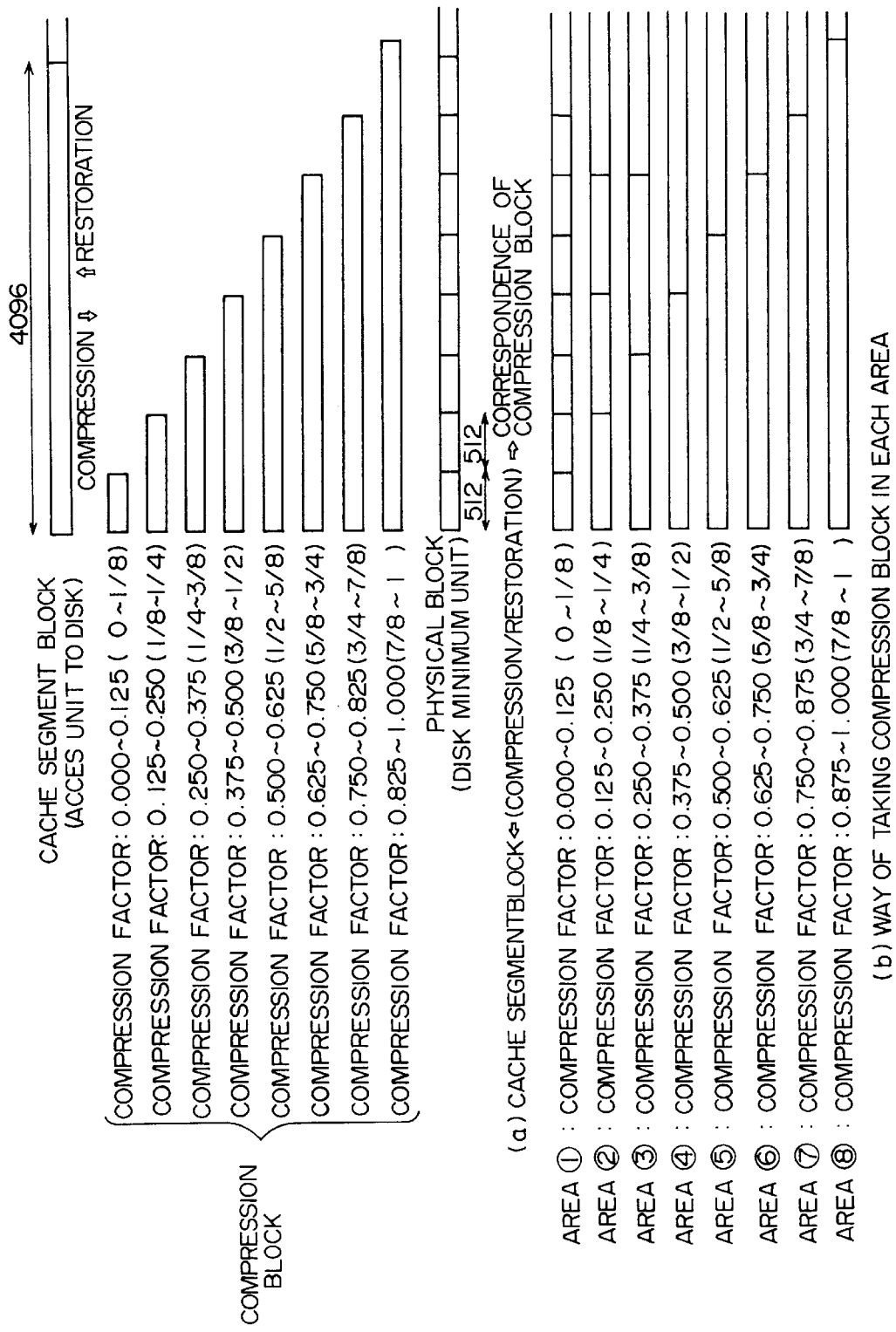
FIG. 5 is a diagram showing the unit for the data management (part 1)

FIGS. 4 and 5 illustrate a unit for compressed data management.

FIG. 5(a) shows a corresponding relationship of a logical block versus a compression block. Referring to FIG. 5(a), a length of the logical block is 4096, while a length of each physical block on disk is 512. The compression block is defined as a multiple of an integer with respect to the physical block in accordance with each compression ratio. Further, FIG. 5(b) shows the way of taking the compression block in each compressed segment area.

FIG. 4(a) illustrates a corresponding relationship of a logical block versus a compression block. Referring to FIG. 4(a), the length of the logical block is 4096, while the physical block length on disk is 512, wherein the compression block is a multiple of an integer with respect to the physical block in accordance with each compression ratio. Further, FIG. 4(b) shows the way of taking the compression block in each compressed segment area.

3.1.2 Processing Procedure 1

Figure 6:
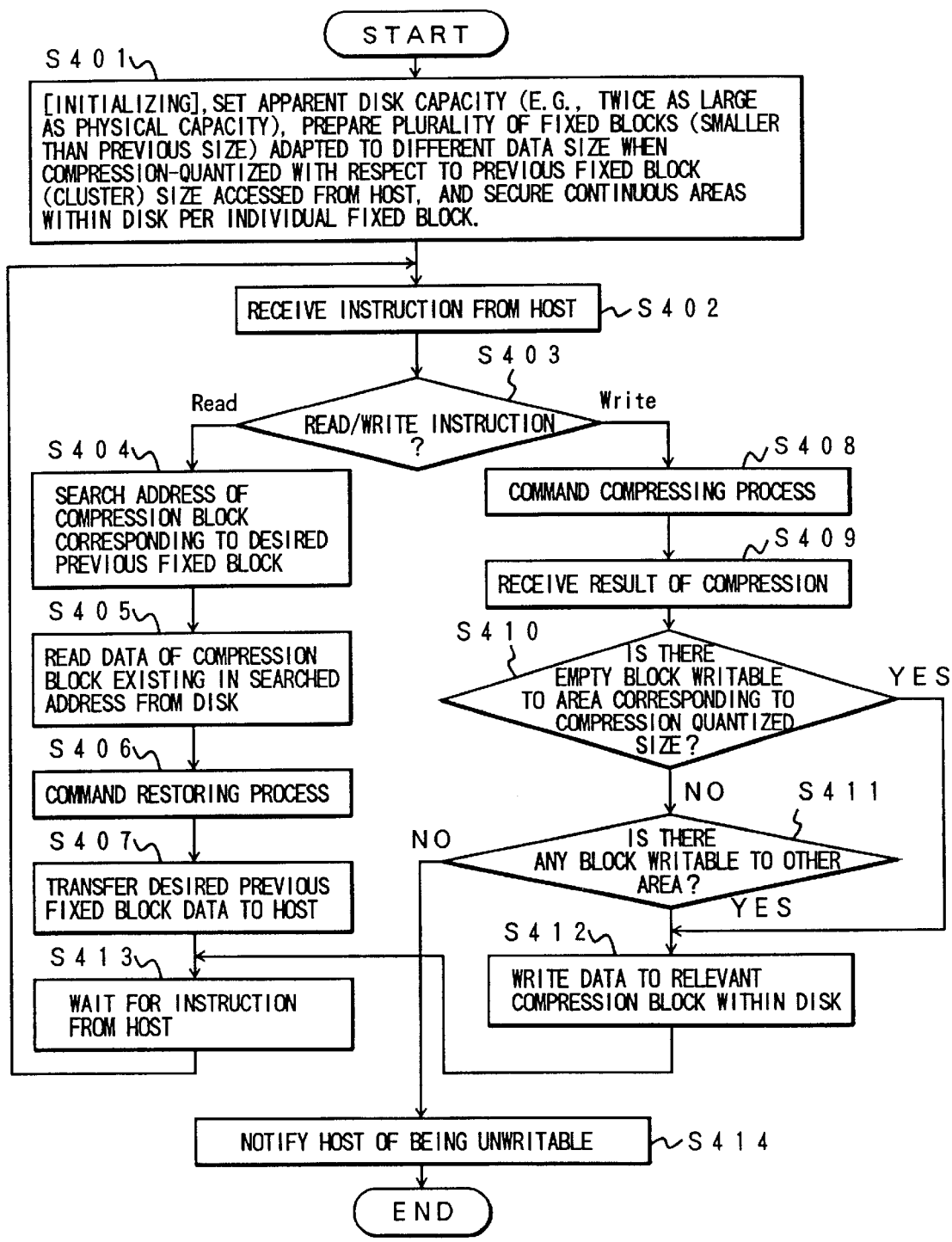
FIG. 6 is a processing flowchart of a compressed data managing method based on a CFS (part 1)

FIG. 6 illustrates a processing procedure 1 of a compressed data management method. To start with, an apparent disk capacity is set, e.g., twice as large as a physical capacity by way of initialization. Prepared subsequently are a plurality of compression blocks (smaller than the previous size) adapted to different data sizes after being compression-quantized with respect to a size of the previous fixed block (logical block) accessed from the host 10. By way of initialization, a continuous area is secured within the disk for storing individual compression blocks within compressed segment areas (operation 401). Note that previous fixed blocks herein are blocks with uniformity in terms of the unit (sizes of 2K, 4K and 8K on a sector or cluster unit) as accessed from the host.

Next, an instruction is received from the host (operation 402).

Checked next is whether the instruction received in operation 402 is a Read Instruction or Write Instruction (operation 403).

If determined as the Read Instruction in operation 403, an address of the compression block a desired previous fixed block as requested by the host computer is searched (operation 404). That is, in the Table shown in FIG. 3(a), the previous fixed block "corresponds to the logical block address," while the "compression block" corresponds to the "physical block address" in the record position column. For instance, a 0002H logical block shows a 1-to-1 correspondence with respect to a 19998H compression block in an area 2.

Then, the data of the compression block existing in the searched address is read out of the disk (operation 405).

Subsequently, a decompression process is commanded (operation 406).

Then, the desired previous fixed block data is transferred to the host 10 (operation 407).

Next, there is a wait for an instruction from the host 10 (operation 413).

On the other hand, if determined as the Write Instruction in operation 403, the disk data management unit 27 commands the compression/decompression unit 23 to perform a compression process (operation 408).

Then, a result of the compression is received (operation 409).

Checked subsequently is whether or not there is a writable empty block in the area corresponding to a compression quantizing size (operation 410). It is to be noted that the area corresponding thereto is an area in which blocks of the same compression size in FIGS. 5 and 3 is compressed. For example, if the number of entire compression blocks in a certain area of FIG. 3 is equal to the number of occupied compression blocks, this indicates that there is not a block available to be written in that area any longer.

If the answer is NO in operation 410, whether or not there are writable blocks in other areas is checked (operation 411).

If the answer is YES in either of operation 411 or in operation 410, the data is written to a relevant compression block within the disk (operation 412). Then, the processing moves to operation 413.

If the answer is NO in operation 411, the host 10 is informed of being unwritable (operation 414).

3.1.3 Processing Procedure 2

Figure 7:
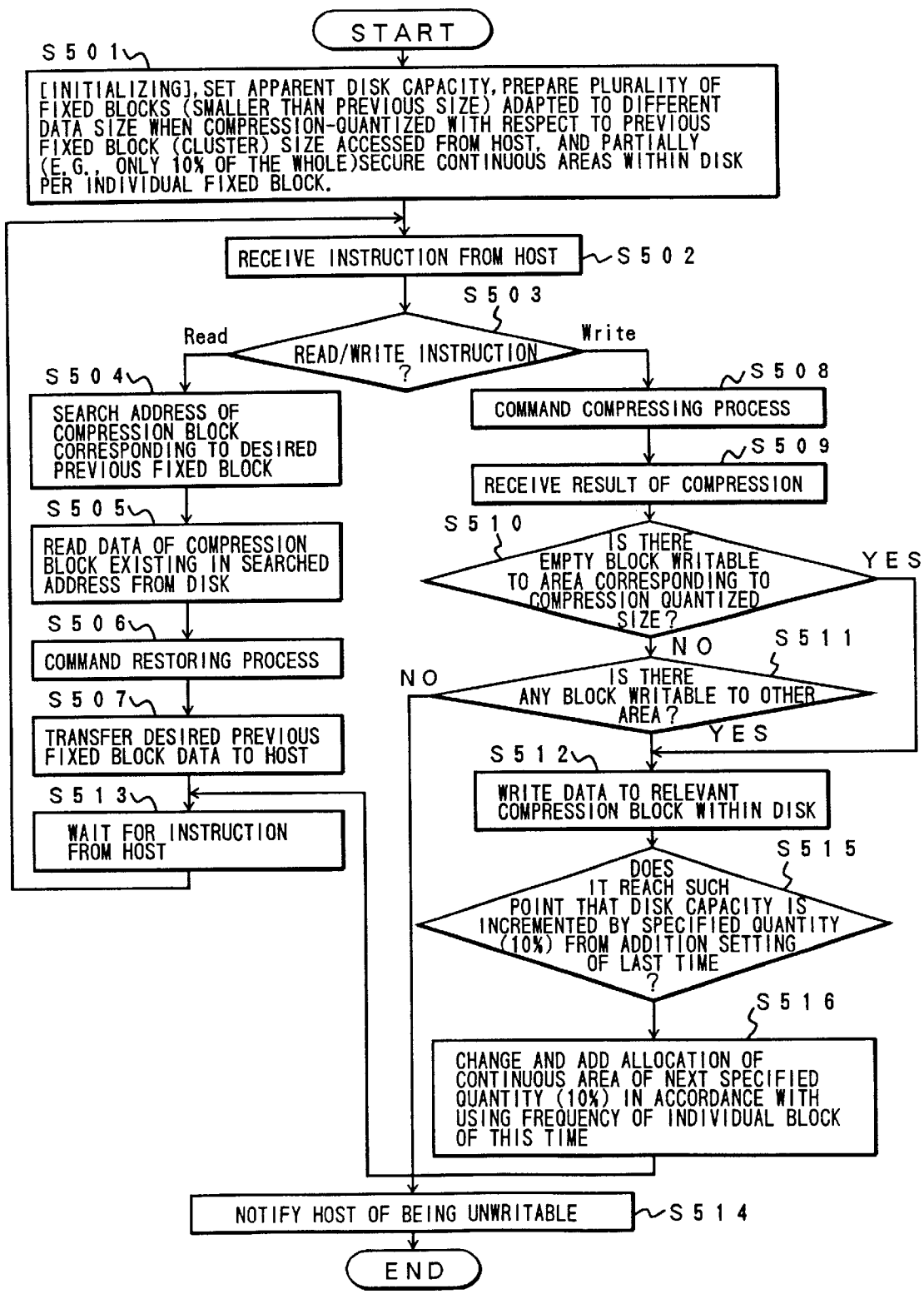
FIG. 7 is a processing flowchart of the compressed data managing method based on the CFS (part 2)

FIG. 7 shows a processing procedure 2. To begin with, an apparent disk capacity is set by way of initialization. Prepared subsequently are a plurality of compression blocks (smaller than the previous size) adapted to different data sizes after being compression-quantized, respect to a size of the previous fixed block (logical block) accessed from the host 10, and a continuous area is partially secured (e.g., only 10% of the whole) within the disk for storing individual compression block (operation 501). This thereby sets an occupation ratio of the continuous area with respect to a total disk storing area.

Figure 8:
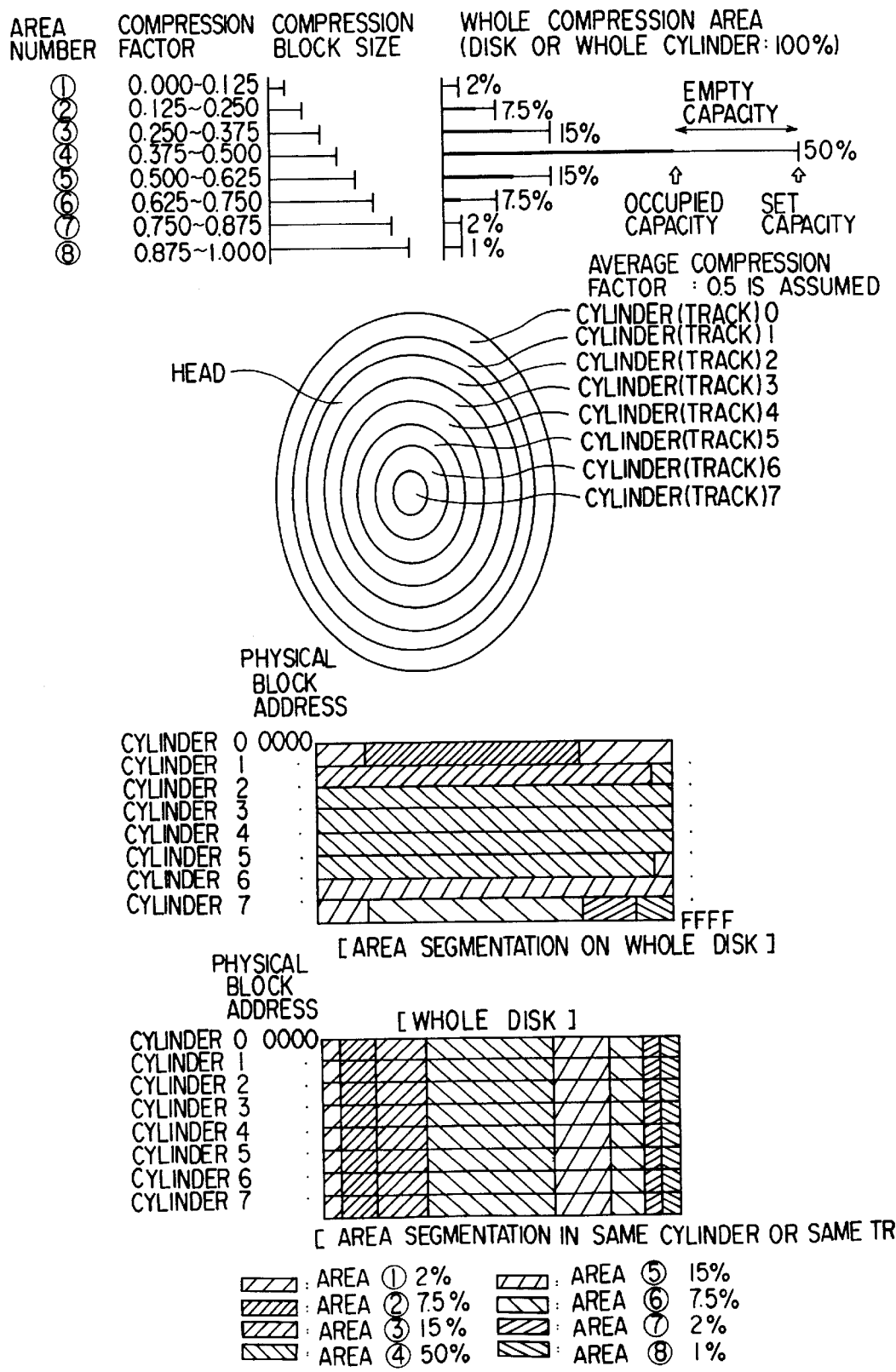
FIG. 8 is a diagram illustrating a concept for determining an area of a compression block.
Figure 9:
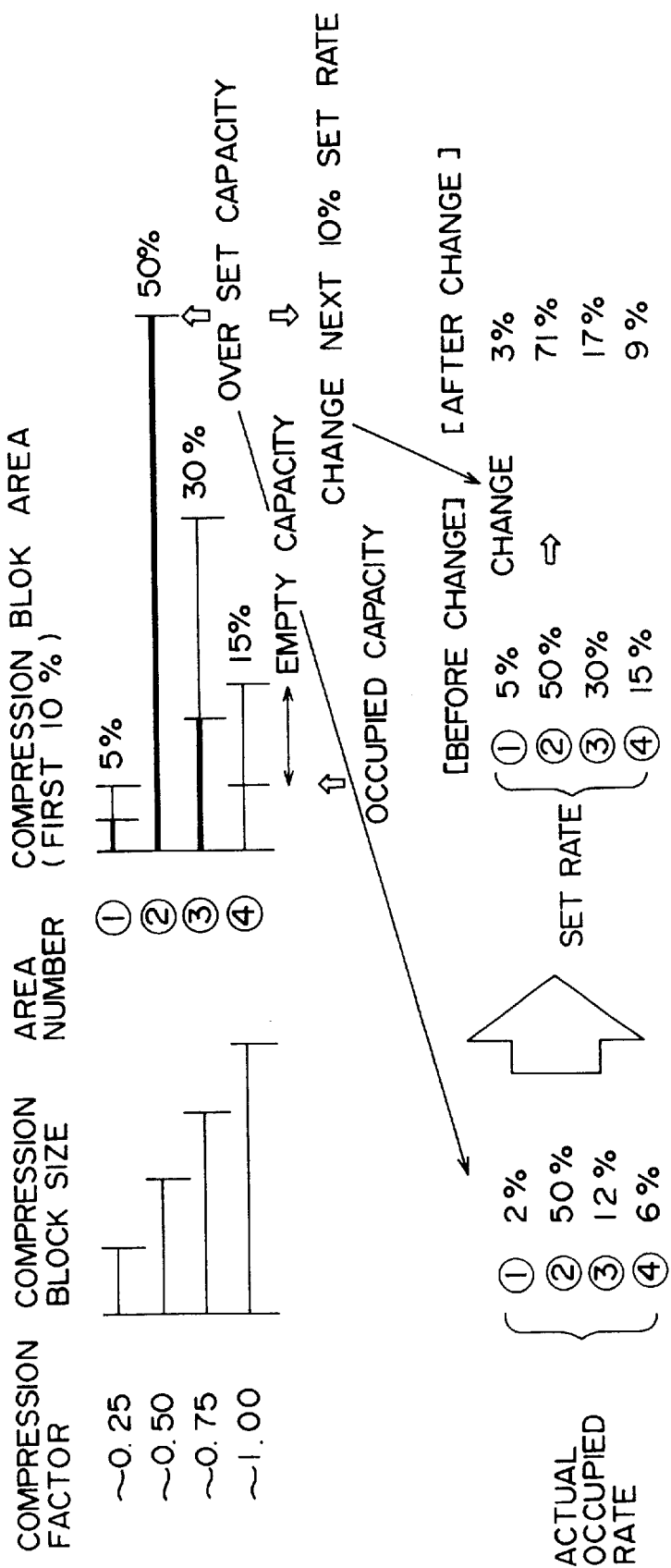
FIG. 9 is a diagram illustrating a concept for partially determining the area of the compression block.

Note that a method of setting the apparent disk capacity may include, e.g., a method of initializing a rate of occupation for each compressed segment area on the whole disk, the number of compression blocks and the physical block addresses by setting a capacity twice the physical capacity (see FIG. 8), and a method of partially changing a compressed segment area allocated for storing a type of a compression block if any one of the other compressed segment areas overflows after effecting the initialization (see FIG. 9). In processing flows shown in FIGS. 7 and 10, the latter method is adopted, wherein there is performed such an initialization that a capacity equivalent to 10% of the whole disk capacity serves as an area for storage of each of the compression blocks.

Next, an instruction is received from the host 10 (operation 502).

Checked next is whether the instruction received in operation 502 is the Read Instruction or Write Instruction (operation 503).

If determined as the Read Instruction in operation 503, an address of the compression block corresponding to a desired previous fixed block is searched (operation 504).

Then, the data of the compression block existing in the searched address is read from the hard disk 30 (operation 505).

Subsequently, the decompression process is commanded (operation 506).

Then, the desired previous fixed block data is transferred to the host 10 (operation 507).

Next, there is a wait for an instruction from the host 10 (operation 508).

On the other hand, if determined as the Write Instruction in operation 502, the compression process is commanded (operation 508).

Then, a result of the compression is received (operation 509).

Checked subsequently is whether or not there is a writable empty block in the area corresponding to the compression quantizing size (operation 510).

If the answer is NO in operation 510, whether or not there are writable blocks in other areas is checked (operation 511).

If the answer is YES in either of operation 511 or in operation 510, the data is written to a relevant compression block within the hard disk 30 (operation 512). In this case, updating the data is needed.

Checked then is whether such a point has been that a specified quantity of the disk capacity is filled with the specified segments (e.g., 10%) from the addition setting of the last time (operation 51).

If an answer of having reached is given in operation 51, an allocation of another continuous area for the next specified quantity (10%) is change-added in accordance with a using frequency of the individual compressed segment areas of this time (operation 516), and the processing moves to operation 513. The using frequency is the rate of occupation of compressed segments actually recorded in the disk compared to the total. Note that the change-addition of the continuous area allocation implies changing a next available 10% area of the disk in consideration of an actual occupy rate as shown in FIG. 9.

If the answer is NO in operation 511, the host 10 is informed of being unwritable (operation 514).

3.1.4 Processing Procedure 3

Figure 10:
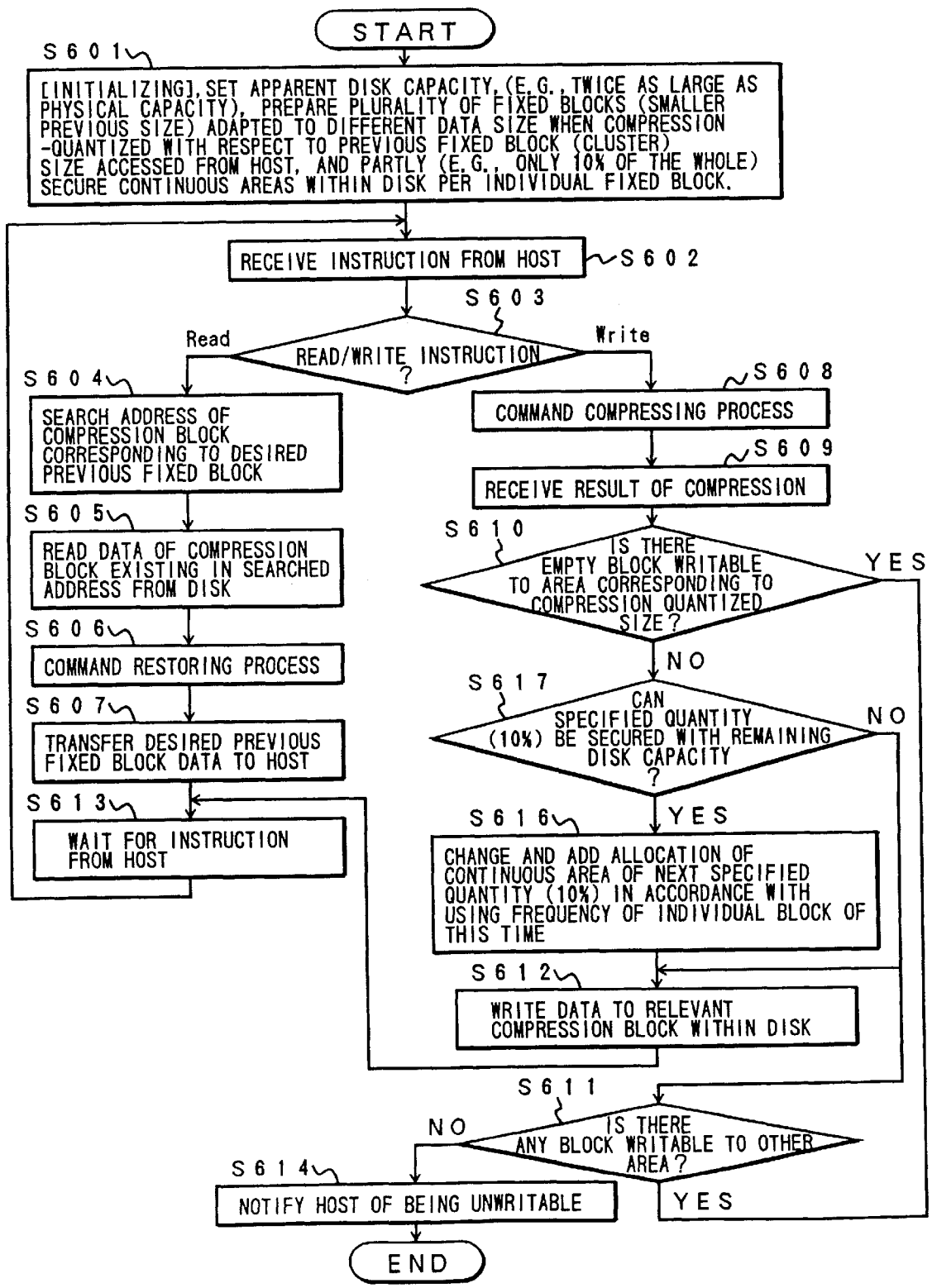
FIG. 10 is a processing flowchart of the compressed data managing method based on the CFS (part 3)

FIG. 10 shows a processing procedure 3. At first, an apparent disk capacity is set by way of initialization. Prepared then are a plurality of compression blocks (smaller than the previous size) adapted to different data sizes when compression-quantized with respect to a size of the previous compression block (logical block) accessed from the host 10, and a continuous area is partially secured (e.g., only 10% of the whole) within the hard disk 30 for every individual fixed block (operation 601).

Next, an instruction is received from the host 10 (operation 602).

Checked next is whether the instruction received in operation 602 is the Read Instruction or Write Instruction (operation 603).

If determined as the Read Instruction in operation 603, an address of the compression block corresponding to a desired previous fixed block is searched (operation 604).

Then, the data of the compression block existing in the searched address is read from the hard disk 30 (operation 605).

Subsequently, the decompression process is commanded (operation 606).

Then, the desired previous fixed block data is transferred to the host 10 (operation 607).

Next, there is a wait for an instruction from the host 10 (operation 608).

On the other hand, if determined as the Write Instruction in operation 602, the compression process is commanded (operation 608).

Then, a result of the compression is received (operation 609).

Checked subsequently is whether or not there is a writable empty block in the area corresponding to the compression quantizing size (operation 610).

If the answer is NO in operation 610, there is checked whether or not a settable capacity (corresponding to an undefined area) can be continuously secured by the specified quantity (10%) with respect to the remaining disk capacity (operation 617).

If the answer is YES in operation 617, the allocation of the continuous area for the next specified quantity (10%) is change-added in accordance with the using frequency of the individual block of this time (operation 616).

After executing operation 616, if the answer is both in operation 610 and in operation 611, the data is written to the relevant compression block within the hard disk 30 (operation 612). Then, the processing moves to operation 613.

If the answer is NO in operation 617, whether or not there is the writable blocks in other areas is checked (operation 611).

If the answer is NO ion operation 611, the host 10 is informed of being unwritable (operation 614).

3.2 Specific Examples

FIG. 8 is shows a case where the rate of each compressed segment area is determined based on a cylinder unit or on the whole disk. For instance, the compression size is classified into 8 types, wherein the whole disk or the intra cylinder area is segmented at respective rates as illustrated in FIG. 8 at the initial stage.

Figure 11:
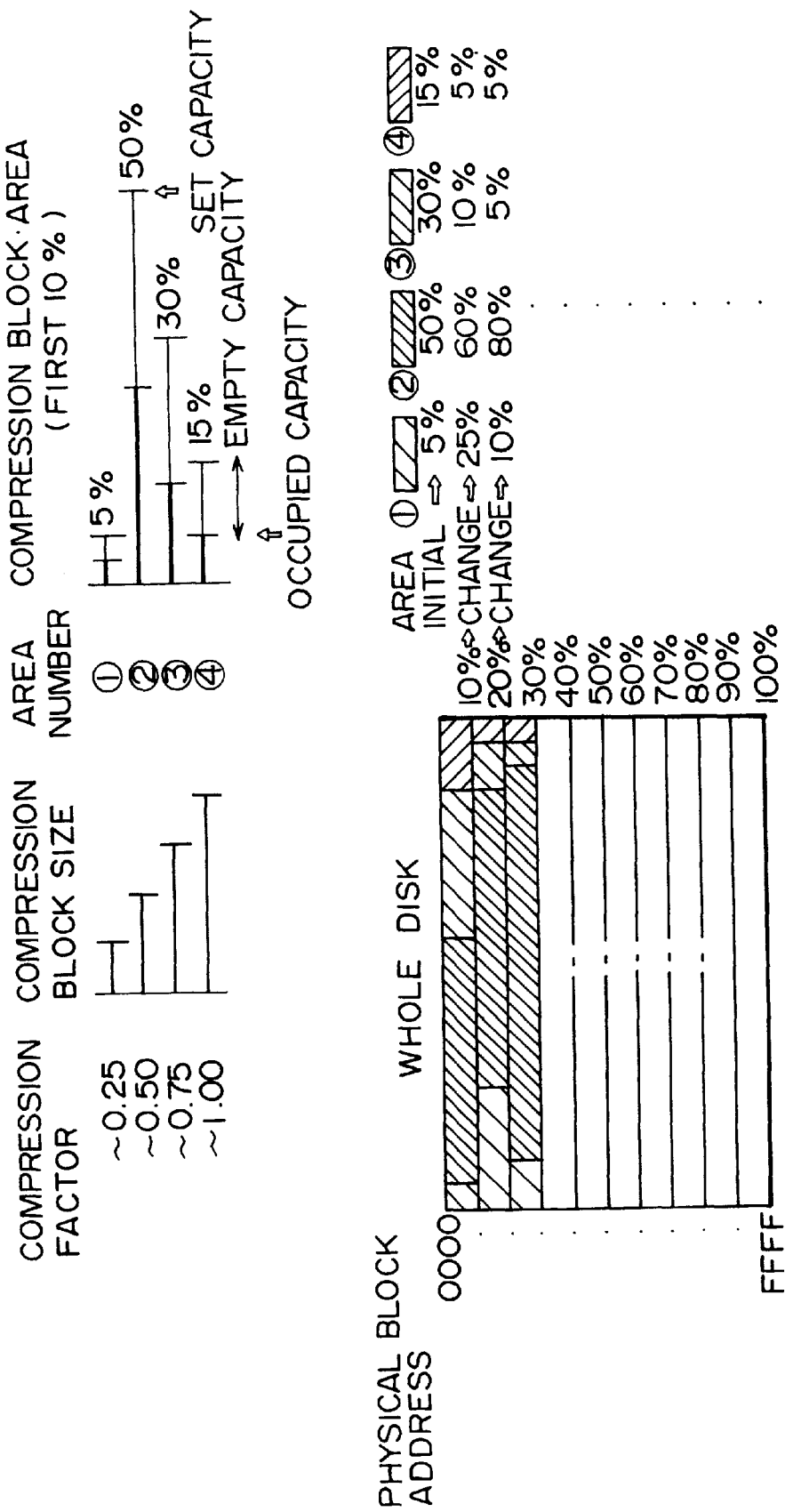
FIG. 11 is a diagram illustrating a concept for partially determining the area of the compression block.

Then, FIG. 11 illustrates a case where a next segment area is set with a reflection of a compression distribution (statistic quantity) picked in the segment area of the last time at the next point of time so that each compressed segment area is partially set at the initial stage. For example, referring to FIG. 11, the processing is done in such a way that the next segment area continuous area is set at intervals of every 10% of the whole disk capacity. FIG. 9 illustrates an example of changing the next segment area if overflowed due to a discordance in terms of the rate of the segment area.

Figure 12:
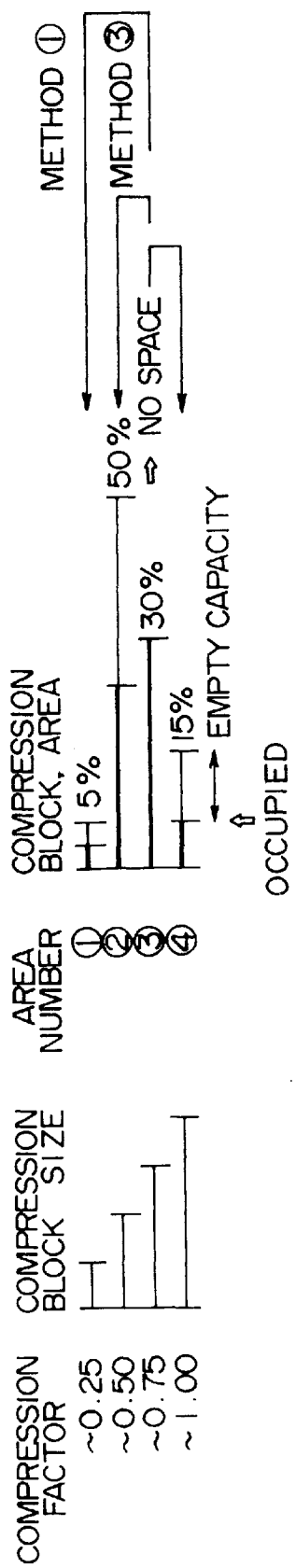
FIG. 12 is a diagram of assistance in explaining a method of searching, if a relevant area has no space, a space in other areas.

Further, referring to FIG. 12, if there is no empty in the relevant compressed segment area, an empty area is searched by use of one adjacent compressed segment area larger by one size, or a plurality of segments of a smaller compressed segment area. In the case of searching the smaller area, as illustrated in FIG. 12, it is preferable to employ the plurality of segments of the area having the same size to the greatest possible degree. That is, it is preferable to use N-pieces of areas having a 1/N size.

4. Compressed Data Management by PFS

Next, the compressed data management conducted by the storage controlling apparatus 20 will be explained. The compressed data management that will be explained herein is based on the PFS discussed in the prior art. Note that the term "PFS" named by the present inventors is an abbreviation of "Packed File System".

4.1.1 Outline of Compressed Data Management by PFS

At the first onset, a concept defined as will be explained with reference to FIG. 13.

The host 10 outputs the data to be written to the hard disk 30 in a data format known as a logical sector (refer to the explanation of 2. Whole Construction). The storage controlling apparatus 20 assembles a plurality of logical sectors and thus generates the data on the order of 16K bytes (hereinafter, the byte is shown in a letter "B"), which is called a cache segment.

The reason why the cache segment is generated is that a data length is too short if the logical sector remains it is, and hence an individual item of data is hard to manage. In other words, the management table 27a provided in the disk data management unit 27 must have a multiplicity of capacities for the management, with the result that the packaging becomes difficult.

The cache segment is compressed by a reversible compression method (coding method capable of complete decompression to pre-compression state) such as an LZ (lempel-Ziv) method, a Huffman coding method and an arithmetic coding method. The compressed data is called a compressed segment.

This compressed segment is allocated to a compression sector representing a buffer having a predetermined length.

The compression sector is written to (recorded on) the hard disk 30.

The compressed segment is smaller in terms of the data length than the pre-compression data, i.e., the cache segment. Accordingly, instead of the cache segment, the compression sector is recorded on the hard disk 30, thereby making it possible to apparently increase the capacity of the hard disk 30.

When the compression sector is recorded in a write position designated by the host 10, however, it is impossible to increase the apparent capacity of the hard disk 30.

It is because an unused recording area is generated when the compression sector is recorded in the write position designated by the host 10, and the hard disk 30 is not effectively used.

Then, it is required that the compression sector be recorded in a position different from the write position designated by the host 10 in order to effectively use the hard disk 30. Thus, making the write position corresponding to the actual record position is termed mapping. Data about this mapping are recorded in the management table 27a provided in the disk data management unit 27.

The "apparent capacity" herein connotes a capacity obtained by adding a capacity increased by the compression to a physical capacity of the hard disk 30. For instance, if the compression ratio is 50% with respect to the physical capacity of 1 GB, the apparent capacity is 2 GB.

4.1.2 Cache Segment

Whether the cache segment is generated by assembling some logical sectors is generally determined by a combination of a capacity of the hard disk 30, a capacity of the memory for managing it and a logical sector length.

For instance, a situation shown in Table 1 is assumed. Herein, let x KB be a length of the cache segment.

| | |
|---|---|
| Logical Sector Length | 4 KB |
| Physical Capacity of Hard Disk 30 | 2 GB |
| Apparent Capacity of Hard Disk | 4 GB |
| Cache Segment Length | x KB |
| Compression sector Length | 32 KB |
| Management Memory Capacity | 512 KB |

Herein, let x KB be the cache segment length, the number of the compression sectors writable (enterable into) on the hard disk 30 is obtained by the formula (1): 1

Number of Sectors (Number of Entries)=Hard Disk 30's Physical Capacity/Compression Sector Length=2 GB/32 KB (1)

Hence, the number of bits necessary for expressing this compression sector is obtained by the formula (2):

Number of Bits Needed for Addressing Compression sector= $\log_2$(Hard Disk 30's Physical Capacity/Compression sector Length)=$\log_2$(2 GB/32 KB) (2)

Further, the number of cache segments that represents the number of logical sectors assembled is obtained by the formula (3):

Number of Cache Segments (Number of Entries)=Hard Disk 30's apparent Capacity/Cache Segment Length=4 GB/xKB (3)

Obtained from this in accordance with the formula (4) is a minimum capacity required for the management memory for managing the correspondence between the cache segment and the compressed segment.

Minimum Capacity Required for Management Memory=Number of Cache Segments×times Number of Bits Needed for Expressing Compression Sector=(4 GB/xKB).times. log 2(2 GB/32 KB) (4)

Herein, if it is assumed that the cache segment length the length of the logical sector of the host, a requisite is that minimum capacity needed for the management memory=2 MB.

On the other hand, if set such that cache segment length= host logical sector length×4=16 KB, the result is that minimum capacity needed for the management memory=512 KB.

It can be known that the set management memory is enough to take in.

From the above-mentioned, it can be also understood that the capacity required for managing the compression sectors recorded on the hard disk 30 becomes larger with a smaller cache segment length.

On the other hand, dividing the logical sector outputted from the host 10 has no merit in terms of processing.

Then, the data length of the cache segment is set to a multiple of a natural number of the data length of the logical sector.

4.1.3 Relationship Between Compression Sector Length and Cylinder Capacity

The compression sector has, if a data length thereof is too small, a reduced number of compressed segments to be allocated (packed), with the result that an unallocated area known as a fragment is generated. This fragment may be a factor to cause a decrease in data filling rate into the hard disk 30 and is therefore preferably made as small as possible.

On the other hand, if the data length of the compression sector is elongated, the number of the compressed segments to be allocated increases, and the data filling rate into the hard disk 30 is also improved.

However, an access time to the hard disk 30 rises as the data length of the compression sector increases. Especially, if the data length of the compression sector is larger than a physical cylinder length of the hard disk 30, it follows that a plurality of cylinders are accessed.

This causes a phenomenon called a seek on the hard disk 30. The seek takes a longer time than continuous reading and writing and may be therefore a neck in terms of reducing the access time.

Then, the data length of the compression sector is determined to satisfy such a condition as to increase the data filling rate without generating the seek.

4.1.4 Bit Zone Recording (BZR)

Figure 14:
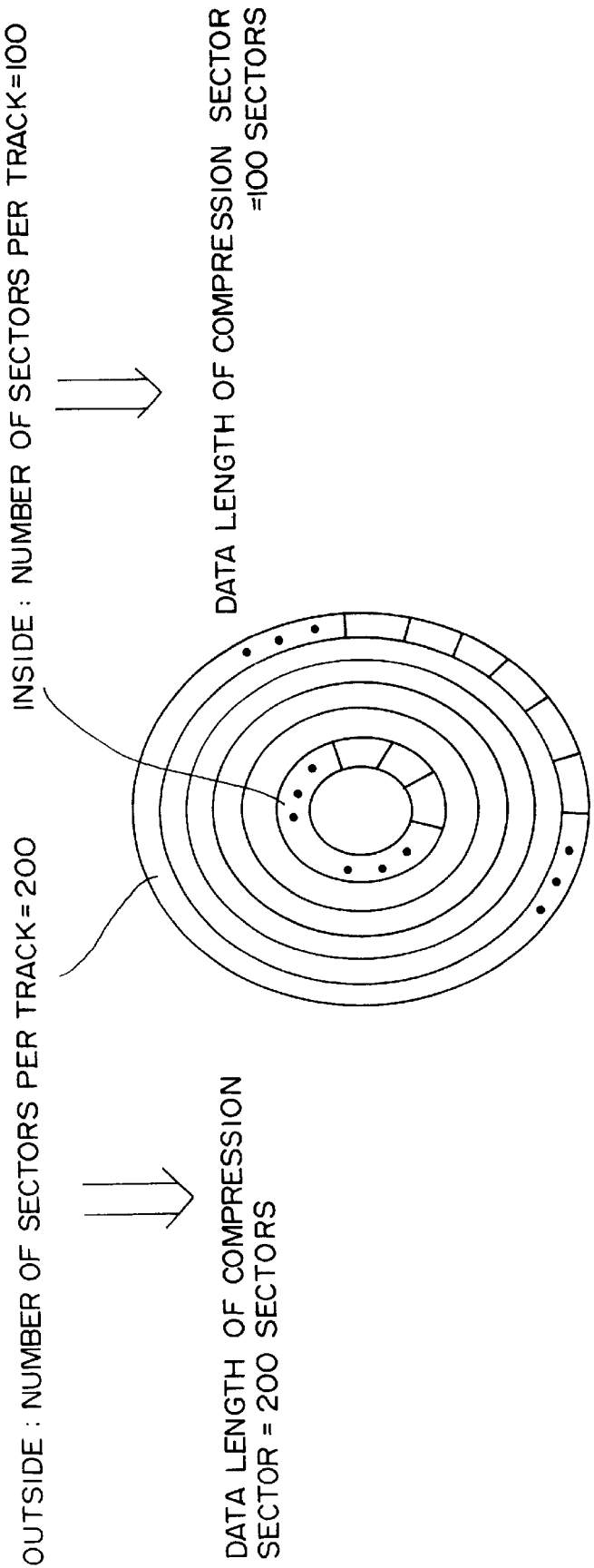
FIG. 14 is a diagram showing bit zone recording.
Figure 15:
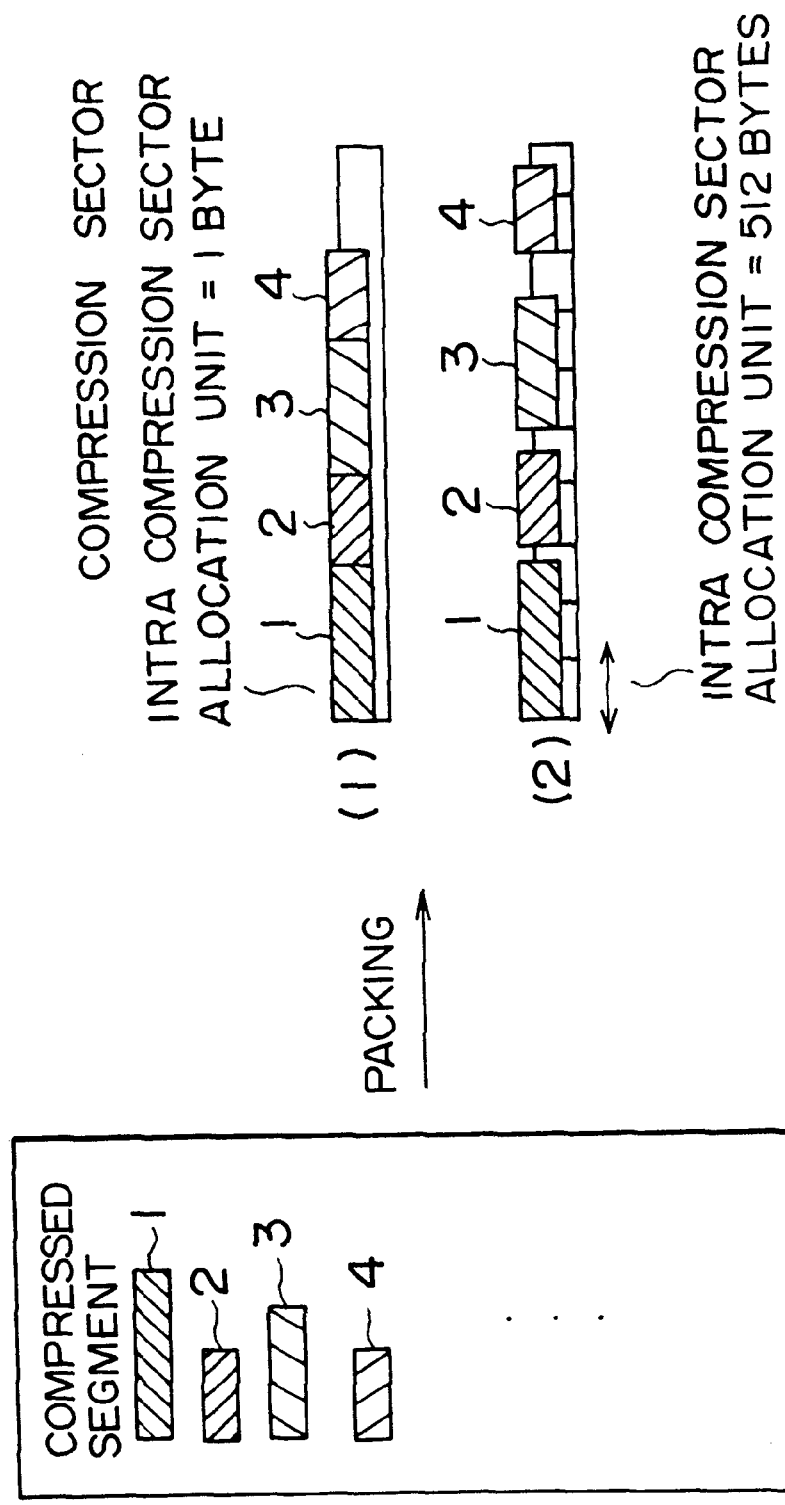
FIG. 15 is a diagram illustrating a unit for allocation within a compression sector.

In a general disk type storage device, as illustrated in FIG. 14, the number of sectors within the cylinder differs depending on where the cylinder is positioned, i.e., on an inner or outer periphery or in the middle. It is because a larger quantity of magnetic substances exist in the cylinders closer to the outer periphery and a greater number of sectors can be therefore created.

Thus, the number of sectors within the cylinder differs depending on the position of the cylinder, which is referred to as bit zone recording (BZR).

It may happen that the data is written so as not to extend over the cylinders because of accessing at a high speed, depending on the operating system (OS).

The data for the BZR are, however, generally concealed with respect to the host 10, and, in some cases, the host 10 may merely see the hard disk 30 in which the capacity per cylinder is uniform. In this case, the OS is incapable of writing the data so as not to extend over the cylinder.

On the other hand, if the data for the BZR are employed, the number of compression sectors per cylinder or track is set for every zone as well as setting the compression sector length per zone.

The reasons for setting in this way are that 1) the access speed is enhanced by preventing the compression sector from being accessed (READ/WRITE) astride the cylinder or the track midways, and that 2) the number of compression sectors per cylinder is the same over the whole disk in the case of the disk having the same number of sectors per cylinder, but, on the BZR disk, the compression sectors may extend over the cylinder if the number of compression sectors per cylinder is not properly set per zone.

Specifically, when the length of one compression sector=32 KB=64 sectors, two compression sectors are provided per track ("2 compression sectors/track") in a "128 sectors/track" zone. In a "96 sectors/track" zone, however, one and half compression sectors are provided per track ("1.5 compression sectors/track"), and it follows that the compression sector extends over the track. Then, the setting is such that the length of one compression sector=48 sectors to attain "2 compression sectors/track". With this setting, there can be attained such accessing as to reduce the number of seeks.

4.1.5 Relationship Between Compression Sector Length and Logical Sector Length When the accessing to the hard disk 30 is demanded of a higher speed, a logical sector length is available as a substitute for the compression sector length.

In the case of compression sector length=cylinder length described above, the data quantity is quite larger than on the logical sector with an access size requested by the host 10. Six hundred sectors exists per cylinder on a certain hard disk 30. Supposing that the logical sector=4 KB=8 sectors, for accessing one logical sector, it is required that the compression sector having a 75-fold capacity corresponding thereto be accessed on the hard disk 30. This is too futile and may probably be a factor for reducing the speed.

Then, if the compression sector length—the logical sector length, this provides a coincidence with the size requested by the host 10, and no reduction in the speed is caused. In fact, however, as shown previously, it may happen that the size of the cache segment is a multiple of a natural number of the logical sectors, and hence the compression sector length is used as a multiple of the natural number of the logical sector length.

4.1.6 Relationship Between Compression Sector Length and Cache Segment Length The compression sector length can be, when used as a multiple of the natural number of the logical sector length, set as specifically shown in the formula (5):

Compression sector Length=Cache Segment Length/Set Compression Rate.times.Natural Number (5)

This can be understood from the fact that the plurality of compressed segments are allocated en bloc. That is, when cache segment length=logical sector length× natural number, a unit length allocated to the compressed segment is the cache segment length, and the compression sector is obtained by compressing the cache segment and further assembling a plurality of these compressed segments.

4.1.7 Relationship Between Minimum Allocation Unit for Packing and Physical Writing Unit on Hard Disk 30

Next, a minimum allocation unit for packing shown in FIG. 1 will be explained. The assembled compressed segments are allocated to the compression sector. On this occasion, however, it is necessary to prepare a table indicating which position of the (1) compression sector each of the assembled compressed segments exists. At this time, when managing the position per byte (B), the addressing corresponding to the size of the compression sector is needed. Therefore, when the data length of the compression sector is 32 KB, the 1-bit address management table 27a is required for every compressed segment for managing the position of the compressed segment.

According to the example given above, when the hard disk 30's apparent capacity=4 GB and the cache segment length=16 KB, a theoretical total number of the cache segments of the hard disk 30 numbers 256K. Accordingly, a total number of the compressed segments of the hard disk 30 is also the same as 256K. It is required that each of these 256K-pieces of cache segments be possessed of 1-bit position data within the compression sector.

Videlicet, the total capacity goes such as 256K.times.1 bits/8 bits=480 KB. It has already been shown that the memory for managing the corresponding relationship between the cache segment and the compression sector has 512 KB, but most of the capacity of 480 KB thereof is required.

On the other hand, if some futile area is allowed between the compressed segments, an amount of the addressing for managing the position within the compression sector can be reduced. For example, if the minimum allocation unit for packing is set to 512 bytes, there exists a possibility in which a futile area on the order of 511 B at the maximum exists between the compressed segments. However, there suffices the addressing capable of actualizing this relationship: compressed data length 32 KB/minimum allocation unit 512 B=64 entries. That is, it comes to 6 bits. In this case, the memory for the position data needed has a capacity given by: 256K pieces×6 bits/8 bits=192 KB. It can be understood that the capacity is remarkably reduced down to 192 KB as compared with the previous capacity of 480 KB.

Further, the minimum allocation unit increases according to a multiple of the natural number of 512 B, thereby further reducing the capacity of the memory needed for managing the position data. However, in case the allocation unit is made too large, the futile area between the compressed segments increases, with the result that the data filling rate into the hard disk 30 decreases.

Now, 512 B given so far by way of one example of the minimum allocation unit is based on the physical minimum writing unit to the hard disk 30. When accessing only a specified compressed segment in the compression sector stored in the hard disk 30, unnecessary physical sectors may be eliminated, and consequently high-speed accessing can be attained.

4.1.8 Minimum Allocation Unit for Packing

If there is some allowance in the management memory, and when trying to enhance the data filling rate into the hard disk 30 to the greatest possible degree, 1 B (byte) can be used as the minimum allocation unit.

4.1.9 Capacity Used for Packing Within Compression Cache

Figure 16:
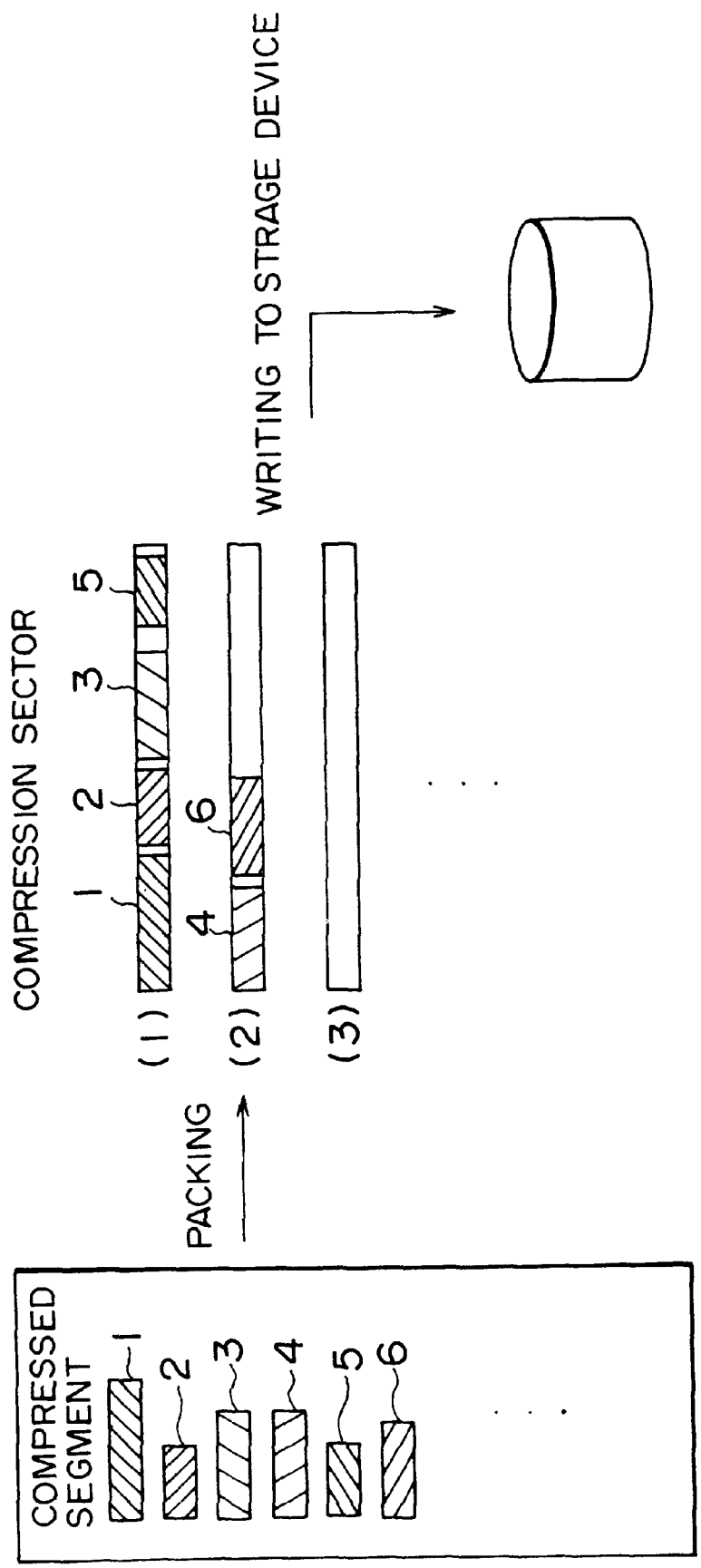
FIG. 16 is a diagram illustrating an example where a compression cache has a plurality of compression sectors.

Next, a memory capacity used for packing within the compression cache will be explained. FIG. 13 shows an example where there is provided one compression sector to which the compressed segments are assembled and then allocated. That is, the memory capacity of the compression cache that is needed for the compression sector may suffice for one compression sector. As illustrated in FIG. 16, however, the memory capacity of the compression cache that is needed for the compression sector can be increased, and the number of the compression sectors to which the compressed segments are assembled and then allocated can be also increased.

Increasing the number of the compression sectors will yield advantages which follow. As shown in FIG. 16, a data string of the compressed segments appears such as 1, 2, 3, 4, 5, 6, and it is assumed that a request for the allocation to the compression sector is to be given. If there is only one compression sector, the compressed segments generated in time-series are allocated in sequence, and, just when reaching an impossible-of-allocation status, the data has to be written to the hard disk 30. In an example of FIG. 16, items of data 1, 2, 3 could be allocated, but an item of data 4 cannot be allocated because of the data being too large for the remaining capacity of the compression sector. Accordingly, in the case of one compression sector, the data 1, 2, 3 are written to the hard disk 30 with a considerable allowance.

If a plurality of compression sectors exist in the compression cache, however, the data 1, 2, 3 are allocated to a first compression sector, and the data 4, if not allocated to the first compression sector, is allocated to other compression sector. Then, when the data 5 is allocated to the first compression sector, the first compression sector can be written to the hard disk 30 without having a large amount of futile areas. Thus, the compression cache has the plurality of compression sectors, whereby the data can be written to the hard disk 30 at a high data filling rate. Then, it is also possible to flexibly cope with a question as to how the plurality of compressed segments are allocated to the compression sector.

4.1.10 Case of Using Only One Compression Sector

Figure 13:
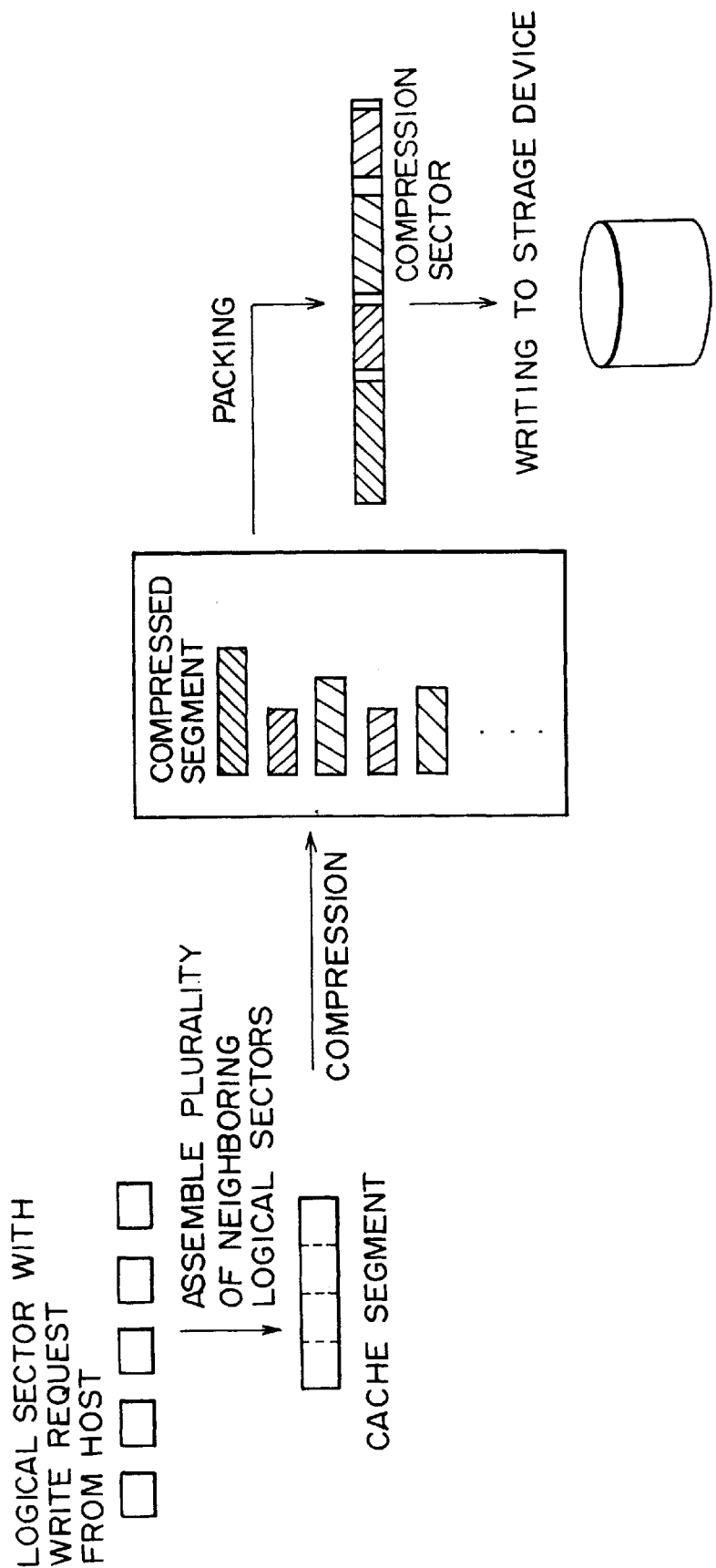
FIG. 13 is a diagram illustrating a concept of managing the compressed data based on a PFS.

When making attempt to enhance a speed of the apparatus rather than increasing the data filling rate into the hard disk 30, as shown in FIG. 13, it is effective that the capacity used for packing is equalized to the compression sector length, i.e., a process of selecting the plurality of compression sectors is omitted by use of only one compression sector.

Under such conditions, the following processes (a) through (d) are repeatedly executed, and the write of the data is implemented.
- (a) The cache segment to which a write request is given is compressed.
- (b) If the area for packing has no space for storing the compressed segments, i.e., if in a state where the packing cannot be performed any more, the compression sector is written to the hard disk 30.
- (c) The compressed segments are packed.
- (d) The operation goes back to the process (a).

According to this method, the process of selecting the plurality of compression sectors can be omitted.

4.1.11 Time-Series Sequential Packing

Figure 17:
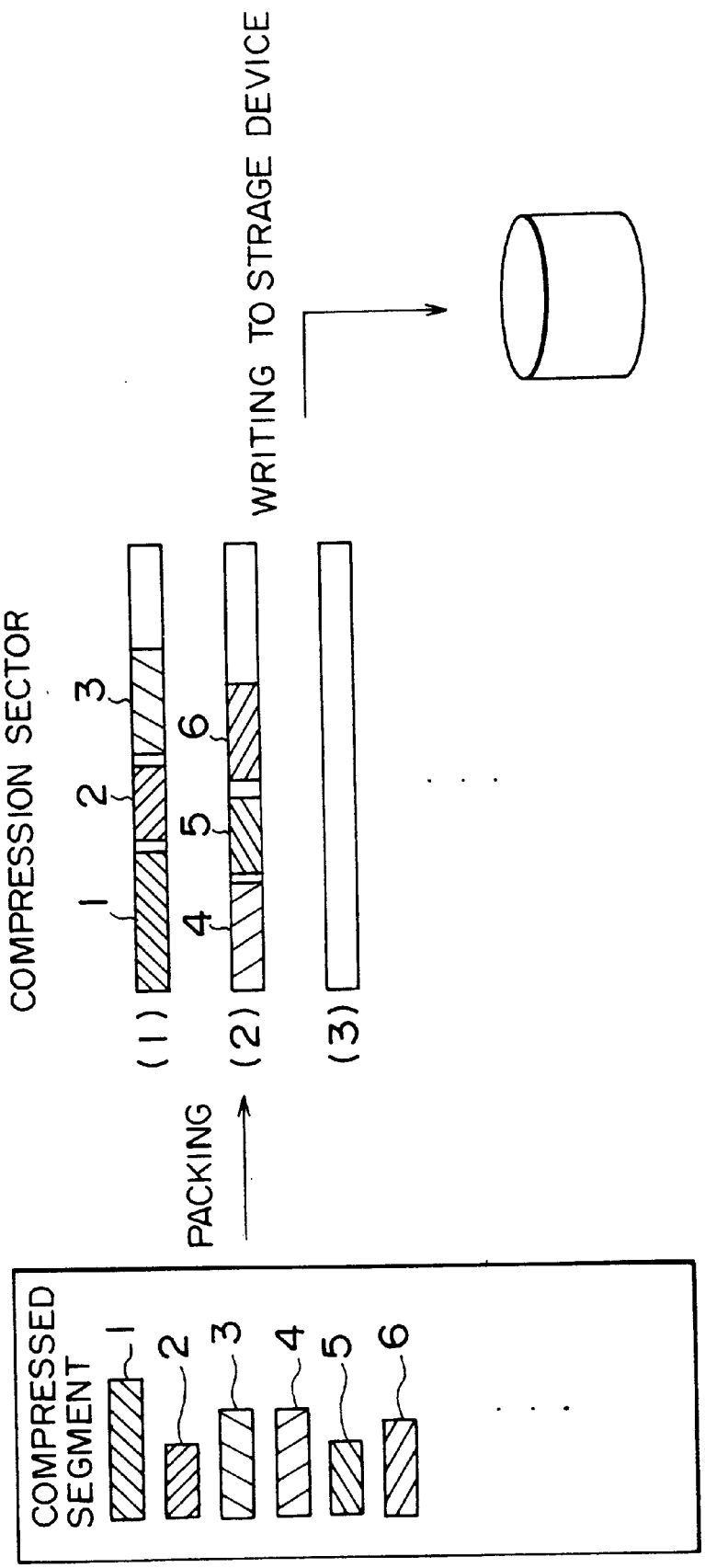
FIG. 17 is a diagram showing an example where compressed segments are packed in time-series.

Time-series sequential packing is defined as a method acquired by further commonizing the method of explained in 4.1.10 (see FIG. 17). This method is based on such a condition that a degree of freedom of packing is enhanced by increasing the number of compression sector as an object for packing from one to two or more.

Under such a condition, the following processes (a) through (d) are repeatedly executed, and the data writing is implemented.
- (a) The cache segment to which the write request is given is compressed.
- (b) If the area for packing has no space for storing the compressed segments, i.e., if in the state where the packing cannot be performed any more, the compression sector is written to the hard disk 30.
- (c) The compressed segments are packed.
- (d) The operation goes back to the process (a).

Specific examples of the processes (a)–(d) given above will be explained with reference to FIG. 17. To start with, it is assumed that the data (compressed segments) are generated in the sequence of 1, 2, 3, 4, 5, 6 . . . . Then, when the data are allocated to the compression sector (1) in the sequence as the data are generated, the data 4 is not allocable to the compression sector (1) and therefore allocated to the compression sector (2). Then, items of data 5 and 6 subsequent to the data 4 are allocated to the compression sector (2). Subsequently, the compression sector that cannot be packed any more is written to the hard disk 30.

This method exhibits such a characteristic that the high-speed execution can be done because of being very simple.

4.1.12 Different Size Mixed Packing

Figure 18:
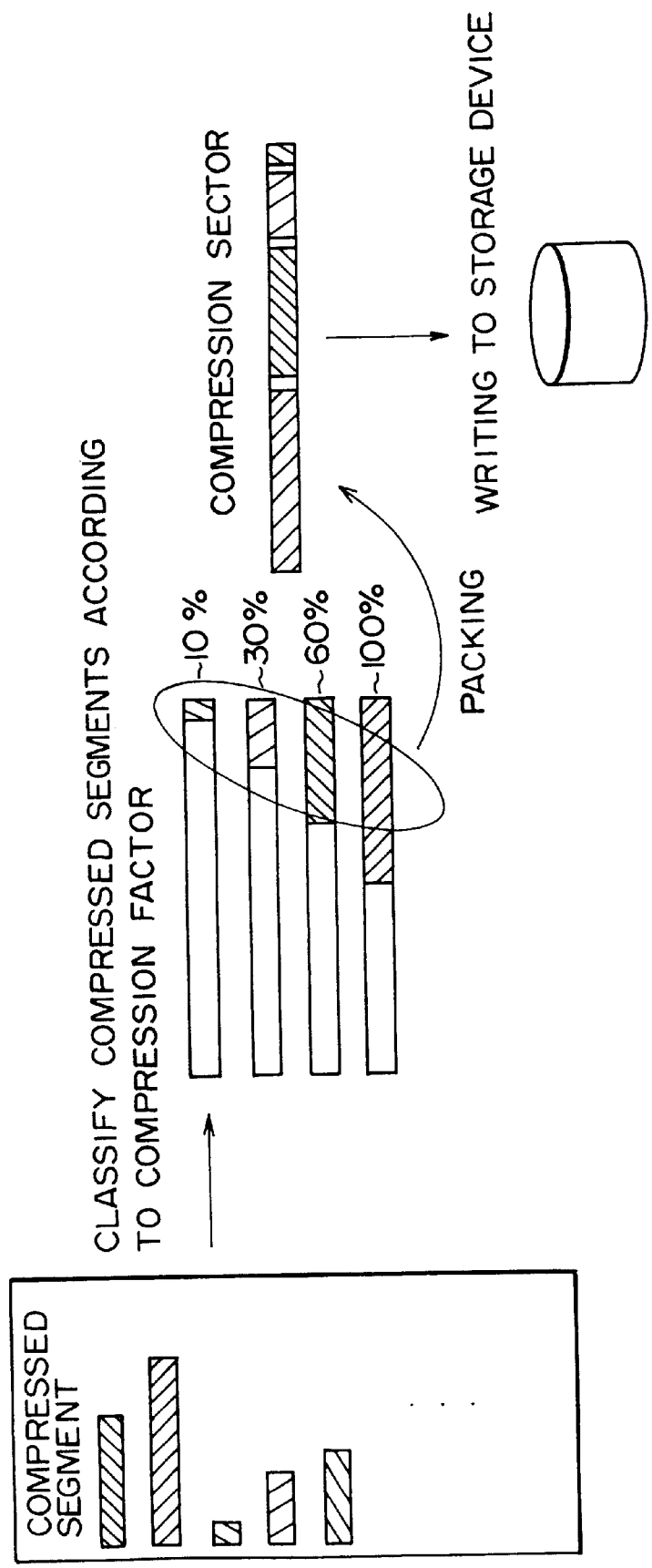
FIG. 18 is a diagram showing an example where the compressed segments having a specified size are combined and then packed.

In the case of the time-series sequential packing, the allocation of the compressed segments to the compression sector is determined by a time-series sequence, and hence there is no flexibility relative to the allocation, with a poor data filling rate into the hard disk 30. In contrast with this, different size packing shown in FIG. 18 is capable of obtaining a densest data filling rate. With this packing, the compressed segments having a predetermined compression ratio are assembled per compression ratio, whereby the compression sector is written to the hard disk 30 without having any fragment (futile area to which the compressed segments are not allocable).

Referring to FIG. 18, the data with the compression ratios 60%, 100%, 10%, 30% are generated in sequence, and, when the data with the compression ratio 30% is generated, the compression ratios amounts to 200%. It is therefore possible to allocate the compressed segments to the compression sector having a data length twice as large as the cache segment length with no fragment. Note that if not reachable to 200% even with a combination of the data strings, the data strings a combination of which is most approximate to 200% are written to the hard disk 30, and it follows that a free storage area for packing is formed.

4.1.13 Packing of Vicinal Compressed Segments

For accessing a logical sector from the host 10, it is required that a compression sector corresponding to the logical sector be accessed on the side of the hard disk 30. In the case of continuous accessing to the logical sectors from the host 10 also, the compression sectors corresponding to the respective logical sectors are similarly accessed on the hard disk 30. At this time, positions of the compression sectors on the hard disk 30 are determined without depending on addresses of the logical sectors. For this reason, even when accessing the logical sectors having continuous addresses, there is no assurance for the continuous access on the actual hard disk 30. Further, there is a possibility in which the accessing on the hard disk 30 may entail the seek, and this may be a factor by which the host 10 cannot obtain an expected access speed.

Then, with respect to the logical sector having vicinal logical addresses, there is effected the allocation to the same compression sector as much as possible. The vicinity of the address of the logical sector reflects also in the compression sector. When performing such packing, and if the logical sector having a specified address is to be accessed, this logical sector is accessed together with the logical sectors having the addresses in the vicinity thereof on the hard disk 30, and the compression sectors exclusive of the original access target sector are saved temporarily with the cache. Next, when the logical sectors having the vicinal addresses are accessed from the host 10, the data on the cache are accessible without taking trouble to perform accessing on the hard disk 30.

The specific example given above will be described with reference to FIG. 19. At first, it is assumed that there are generated pieces of data with addresses "0000", "0001", "0004", "7000", "8000", "8003" in sequence. At the first onset, the data having the address "0000" is allocated to the compression sector (1). Then, the data having the address "0001" is, it is determined, in close proximity to the address "0000" and similarly allocated to the compression sector (1). In the same way, the data having the address "0004" is allocated to the compression sector (1). Next, the data having the address "7000" is, it is determined, spaced away from the address "0004" and allocated to the compression sector (2). Next, the data having the address "8000" is, it is determined, spaced away from the address "7000" and allocated to the compression sector (3). Then, the data having the address "8003" is, it is determined, in close proximity to the address "8000" and allocated to the compression sector (3).

Herein, the reading process goes as shown in the following processes (a) through (c).

(a) Obtained are a corresponding compression sector and positions of the compressed segments within the compression sector by use of the management table (mapping able) 27a with respect to an address of the cache segment to which the read request is given from the host 10.

(b) If the corresponding compression sector or the compressed segments have already been saved in the read cache, the data are read therefrom and transmitted to the host 10, and the operation returns to the process (a).

(c) The corresponding compression sector is read from the hard disk 30 and saved in the read cache. Target compressed segments are transmitted to the host 10, and the operation goes back to the process (a).

The reading is actualized by the above processes, and, with this actualization, after reading a certain compressed segment (after a relatively short time has elapsed), the compressed segment packed to the same compression sector becomes a target for reading from the host 10. Then, fast accessing is attainable by reading from the high-speed cache memory 22 without taking trouble to access the hard disk 30.

Herein, whether to access the hard disk 30 can be known by examining the management table 27a for the cache. That is, if registered in the management table 27a, the data may be read from the cache memory 22.

4.1.14 Random Packing

The method of performing the allocation to one compression sector in which the logical sectors having the vicinal logical addresses are assembled can be expected in terms of its high-speed accessing but is not so good in terms of a data filling rate into the hard disk 30. On the other hand, the different size mixed packing is quite good in terms of the data filling rate but is large in terms of a process of collecting the different sizes, and there is an exceptional process if the data with a size needed does not come. Given then is an explanation of a method of assembling the compressed segments having different sizes and allocating these segments in a pseudo manner.

To be specific, when the compressed segments demanded to be allocated to the compression sector are set in the time-series sequence such as 1, 2, 3 . . . , a compression sector to which the same segments are allocated is determined from random numbers generated by, e.g., the formula (6) with respect to all these pieces of data.

Packing Target compression Sector=Random Number % Number of Compression Sectors Used for Packing  (6)

where "%" is the operator for obtaining a remainder of the division.

A specific example of the random packing will be described with reference to FIG. 20. At first, if it is assumed that the data (compressed segments) are generated in the sequence such as 1, 2, 3, 4, 5, 6 . . . . In accordance with the formula (6), pieces of data 2, 4, 1, 3, 5 are respectively allocated to the compression sectors (1), (2), (3), (4), (5). Next, in accordance with the formula (6), the data 6 is allocated to the compression sector (1).

With respect to the time-series compressed segments, the data length exhibits a correlation between the time proximity compressed segments. For this reason, the time-series sequence is disordered by the random numbers, thereby making it possible to create such a state in the pseudo manner that the compressed segments of the different sizes are assembled and then allocated. This serves to actualize the packing exhibiting a comparatively high data filling rate.

Note that if the thus determined compression sector does not have a capacity enough to pack the compressed segments, a compression sector other than the determined compression sector may be a target.

4.1.1 Pseudo Random Packing

Pseudo random packing is defined as a method in which the above random packing is simplified and is characterized such that the allocation compression sector is not determined by the random numbers, but simply the sequence is changed. That is, when there are five compression sectors, the first through fifth compressed segments are respectively allocated to the first through fifth compression sectors. Next, the sixth compressed segment is allocated again to the first compression sector.

A specific example of the pseudo random packing will be explained with reference to FIG. 21. It is first assumed that the data (compressed segments) are generated in the sequence such as 1, 2, 3, 4, 5, 6 . . . . The data 1, 2, 3, 4, 5, 6 are respectively allocated to the compression sectors (1), (2), (3), (4), (5). Next, the data 6 is allocated to the compression sector (1).

Based on the pseudo random packing, the compressed segments are not so scattered as the random numbers. The compressed segments proximal in terms of the time-series are, however, surely allocated to other compression sector, and hence there is produced such an effect as to avoid an increase in the number of compressed segments having the same size within one compression sector.

4.1.16 Example of Packing to Minimize Remaining Capacity

Given next is an explanation of a method of further enhancing the data filling rate by a combination with the packing method discussed so far. Assumed is a state where an individual allocation quantity becomes relatively small as the allocation of the compressed segments to the plurality of compression sectors goes on (see FIG. 22).

Figure 22:
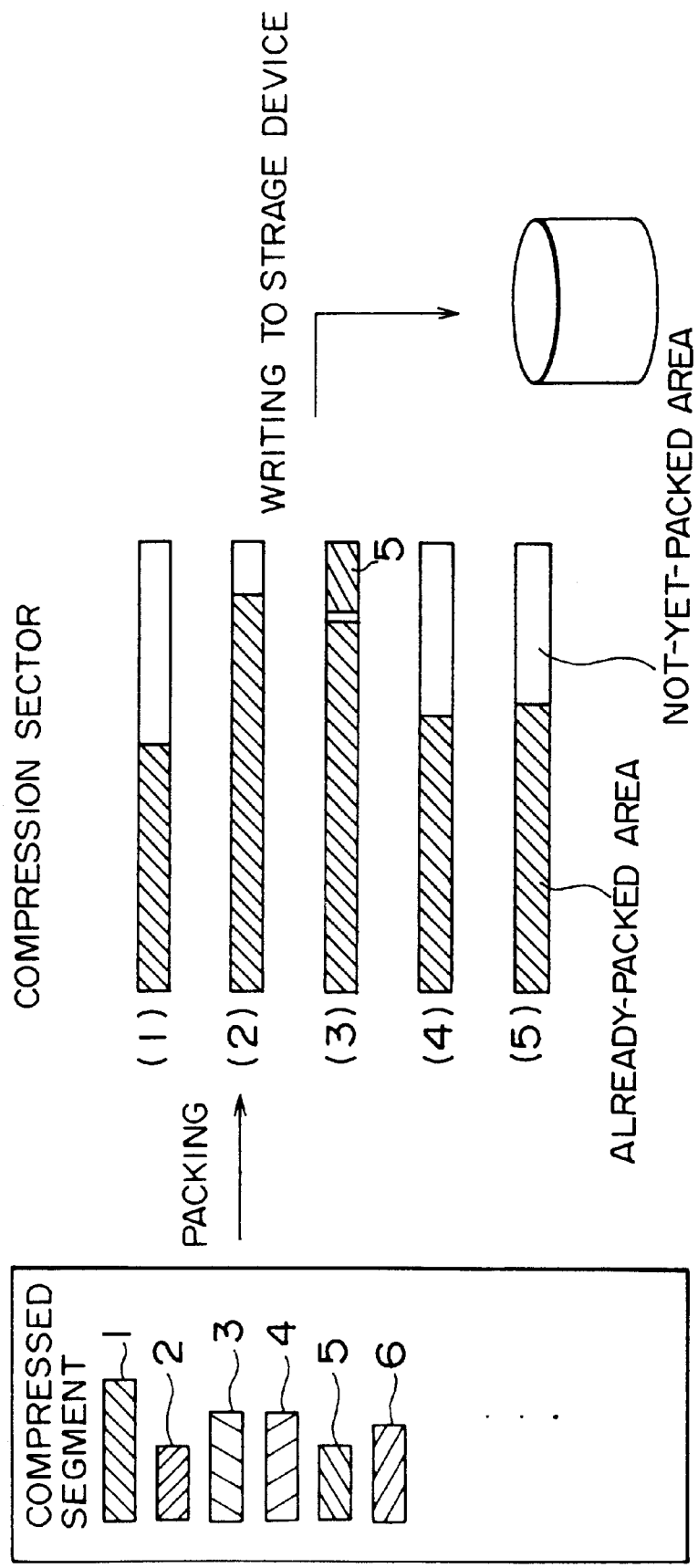
FIG. 22 is a diagram showing an example of packing to reduce the remainder of the compression sectors.

According to this method, taking the compressed segment 5 shown in FIG. 22 for example, the remaining capacity of a certain compression sector is minimized by allocating this compressed segment 5 to the compression sector. That is, referring to FIG. 22, the compressed segment 5 is allocated to the compression sector (3).

This method, though comparatively simple, always works to reduce futile areas (fragments) existing in the compression sector.

It is to be noted that a comparison between the allocation and the remaining capacity is conducted by use of operators ">", "<" on the firmware.

Further, the remaining capacity of each compression sector has a variable corresponding thereto is set by updating a content of the variable each time the packing is conducted.

4.1.17 Example of Packing With Prediction of Remaining Capacity

Figure 23:
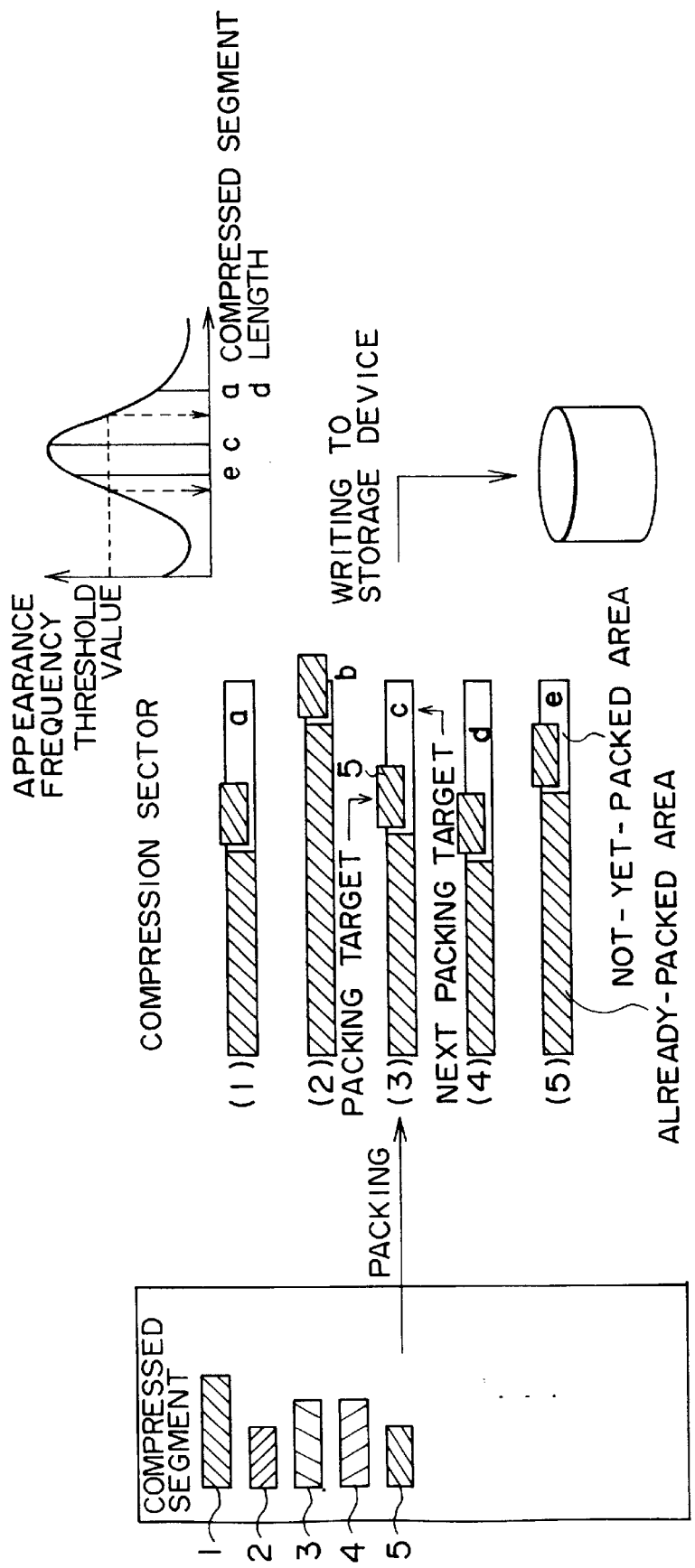
FIG. 23 is a diagram illustrating an example of packing so as to predict a length of the next compressed segment.

Next, there will be discussed a packing method involving a prediction of the compressed segment to which an allocation request will be given. To start with, as illustrated in FIG. 23, there is assumed a situation in which the compressed segment 5 is allocated to one of the compression sectors (1) to (5). At this time, the attention is paid to a remaining capacity after allocating the compressed segment 5. If a data length of this remaining capacity is hard to appear in terms of a frequency thereof, this compression sector is, thereafter, not accessed but is left on the cache memory 22 for a long time, with the result that the memory is not effectively utilized.

Then, a length of the data that is likely to be allocated is predicted from an appearance frequency distribution diagram (the axis of abscissas indicates a compressed segment length, while the axis of ordinates indicates an appearance frequency) of the compressed segment length shown rightly upward in FIG. 23. Herein, it is presumed that pieces of data respectively having compressed segment lengths a, b, c, d, e are written to not-yet-packed areas of the compression sectors (1), (2), (3), (4), (5).

The data that is easy to appear in terms of its frequency as in the case of the compressed segment length "c" is allocated to the compression sector in a comparatively short time and then written to the hard disk 30. That is, the memory for the compression sectors is released. In the case of FIG. 23, it follows that the compression sector (3) has a possibility of being written to the hard disk 30 in the short time.

Note that the data length is predicted by use of the appearance frequency of the compressed segment length in FIG. 23. More specifically, the remaining capacities of the respective compression sectors in FIG. 23 are a, b, c, d and e. Let x be the length of data to be packed, and a relationship of b<x is established. Hence, the compression sector having a capacity other than (b) becomes a packing target. Among them, the compressed segment length exhibiting the highest appearance frequency is (c), and therefore, statistically, the highest possibility is, it is predicted, that the data having the size (c) will come afterward.

The appearance frequency distribution in FIG. 23 becomes static because of using the static data prepared beforehand, and the remaining capacity may be predicted by using this static appearance frequency distribution. This prediction involves the use of the data prepared beforehand and therefore yields an effect of facilitating the operation.

The appearance frequency distribution in FIG. 23 shows the frequencies versus the compressed segment lengths. Hence, the data lengths of the compressed segments that appear each time the write request to the disk comes are classified, and an appearance frequency thereof is stored in the variable prepared per data length, whereby a dynamic appearance frequency distribution is formed. The remaining capacity may be predicted by use of this dynamic appearance frequency distribution. In this prediction, the appearance frequency distribution has to be updated successively. Nevertheless, the distribution conforming to the actual data strings is obtained, and this prediction therefore exhibits an effect of performing the allocation to the compression sector at a high efficiency. Note that Table 2 shows an example of the classification of the data lengths and the frequencies thereof.

| Data Length | Classification | Frequency |
| --- | --- | --- |
| 0–512 | Class 0 | 12 |
| 513–1024 | Class 1 | 25 |
| 1025–136 | Class 2 | 123 |

It is to be noted that the method of predicting the data length of the compressed segment that will be allocated afterward can entail the use of a combination of the static and dynamic appearance frequency distributions. The dynamic appearance frequency distribution conforms to the actual data strings but is unstable in the form of distribution as well as lacking its reliability if a given quantity of samples are not prepared. Then, till a required number of samples on the order of, e.g., 100 KB-several tens MB are prepared to some extent the appearance frequency per data length is counted, and, at the same time, the static appearance frequency distribution is used. After the required number of samples have been prepared, the dynamic appearance frequency distribution is employed. The data length of the compressed segment with a more reliability is thereby predictable.

4.1.18 Example of Allocating Compressed Segment Subjected to Buffering

Next, a plurality of compressed segments undergo buffering, and combinations thereof are allocated to the compression sectors. A specific method for this allocation will be discussed with reference to FIG. 24.

Herein, it is assumed that the two compressed segments are combined and then allocated to the compression sector. At first, it is also presumed that the data (compressed segments) are generated in the sequence such as 1, 2, 3, 4, 5, 6 . . . . Next, pieces of data 5 and 6 are combined and buffered. In this example, the combination of the data 5 and 6 is dealt with as if taking one item of continuous data and allocated to each of the compression sectors (1) through (5). Performed on this occasion is an allocation to the compression sector (3) the remaining capacity of which after being allocated is minimized.

According to this method, unlike the above-mentioned prediction method, the allocation target compression sector can be determined in accordance with the data length of the compressed segment that will certainly come next.

4.1.19 Example of Writing Compression Sector Based on Target Compression Ratio Given next is an explanation of a method of determining a compression sector that should be written to the hard disk

30 among the plurality of compression sectors to which the compressed segments are allocated.

As the allocation of the compressed segments to the compression sectors goes on, the compression sector is brought into a state where the compressed segments cannot be allocated any more. If there is only one compression sector, this compression sector is written to the hard disk 30, thereby making it possible to an unallocated area of the compression sector can revert to a reset status. On the other hand, if the plurality of compression sectors exist, all the compression sectors do not have to be written to the hard disk 30, but one of them may be written to the hard disk 30. The method of determining the compression sector to be written will be discussed.

First, there will be discussed the method of determining the compression sector to be written, which is managed based on a target compression ratio. The data are compressed and thus stored in the hard disk 30, and, in this case, an apparent capacity relative to an actual capacity is required to be set by previously setting the compression ratio. For example, when the compression ratio is set to 50%, the apparent capacity is set twice as large as an actual physical disk capacity. When the physical disk capacity is, e.g., 1 GB, it follows that a 2-fold capacity of 2 GB is given as an apparent capacity.

When the data actually transmitted from the host 10 are compressed, some have a compression ratio 50%, 60% or 40%. It is, however, of importance that the compression ratio is 50% or better than this (e.g., 40%) in average on the hard disk 30 as a whole.

Figure 25:
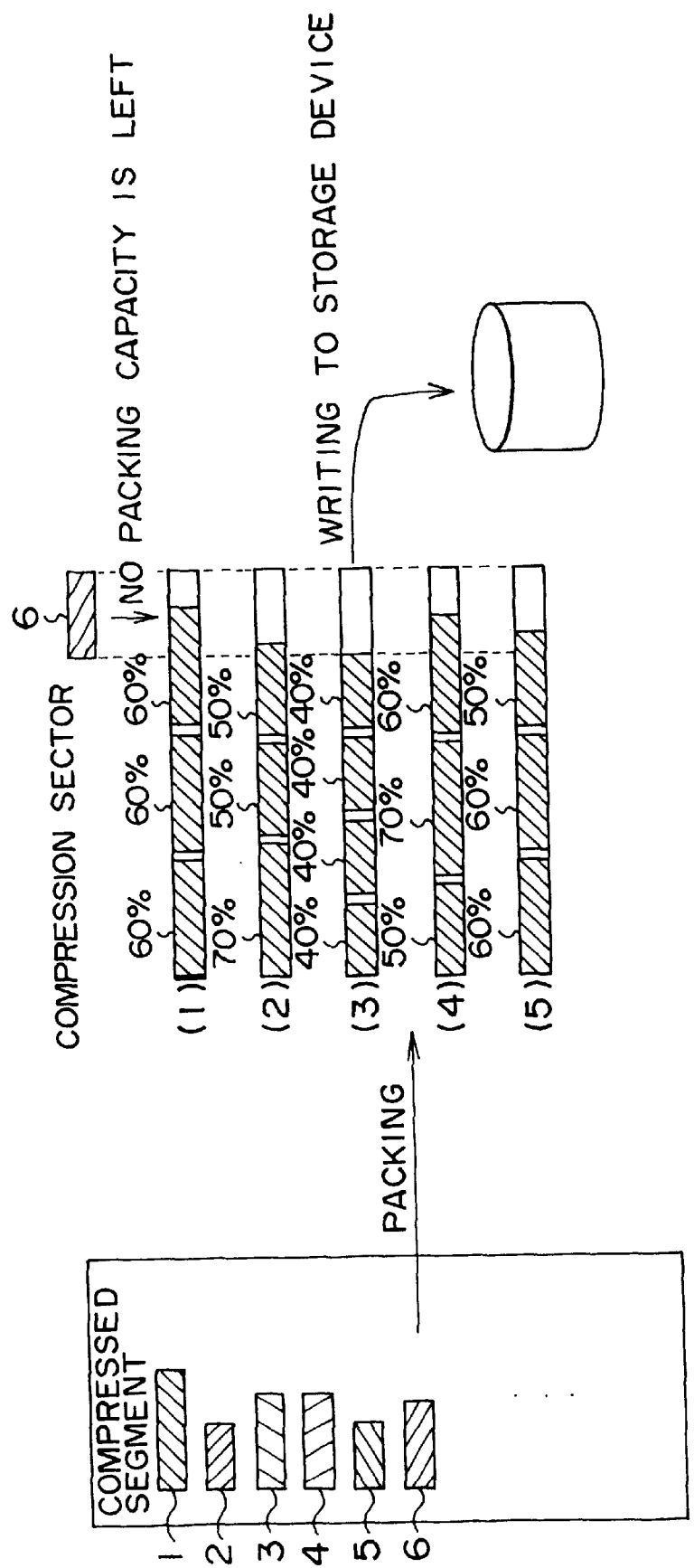
FIG. 25 is a diagram showing an example where the compression sector attaining a target compression ratio.

Then, the compression ratio is managed with respect to the individual compression sector. A specific method of managing the compression ratio will be explained with reference to FIG. 25. Referring to FIG. 25, when the compressed segment 6 is allocated to the compression sector (5) from the compression sector (1), every compression sector has no allowance for the capacity.

For this reason, one of the compression sectors has to be written to the hard disk 30. On this occasion, a quantity of the data allocated to each compression sector is evaluated. A criterion for the evaluation entails knowing what number of compressed segments are allocated to the compression sector. In the case of FIG. 25, the number of compressed segments is 3, 3, 4, 3 and 3 in sequence from above. In this example, the data length of the compression sector is twice as large as the cache segment. Hence, there are allocated four or more compressed segments defined as data into which the cache segments are compressed, and this implies that the compression ratio of the whole compression sector can be obtained by the formula (6):

Compression ratio of Whole Compression Sector=100×times (Compression Sector's Data Length/(Number of Segments Allocated to Compression Sector×times Cache Segment Length))=100×(2×Cache Segment length/(4×Cache Segment Length))=2/4=50 (6)

That is, the number of the compressed segments within the compression sector attaining the target compression ratio is determined by the compression sector length. In this example, the compression sector length is twice as large as the cache segment length, and, therefore, the number of the compressed segments within the compression sector attaining the target compression ratio is 4. Referring to FIG. 25, the compression sector that is third from above has attained the target compression ratio and may therefore be written to the hard disk 30.

4.1.20 Example of Writing Compression Sector With Minimum Remaining Capacity This example presents a method by which the compression sector having the minimum remaining capacity among the plurality of compression sectors is written to the hard disk 30. That is, this method involves checking a remaining capacity after allocating the compressed segments, selecting the compression sector having the minimum remaining capacity among the plurality of compression sectors and writing this compression sector to the hard disk 30.

A specific example will be explained with reference to FIG. 26. At first, it is assumed that pieces of data (compressed segments) are generated in the sequence such as 1, 2, 3, 4, 5, 6 . . . . A hatching area is an already packed area, while a blank area is a not-yet-packed area in the compression sectors (1)–(5). In each of the compression sectors (1)-(5) does not have a capacity enough to pack the data 6 in the not-yet-packed area. Then, it is the compression sector (3) which has the minimum not-yet-packed area, and hence the compression sector (3) is written to the hard disk 30.

In the case of writing based on the above target compression ratio, when packing the compression segments, and if there is no area for packing the data to be written, it follows that there is generated the compression section which does not attain the target compression ratio but is written thereto. If this kind of compression sector increases, the target compression ratio cannot be attained in the hard disk 30 as a whole. Then, there can be considered a method of emphasizing the data filling rate into the hard disk 30. If the data filling rate is emphasized, it may happen sometimes that a not-so-compressed compression sector having a compression ratio of approximately 70% is to be written.

However, the compression ratio of the compression sector to which a large number of compressed segments with a good compression ratio are allocated becomes, e.g., 30% or thereabouts, and this implies that the writing can be performed at the high compression ratio in the hard disk 30 as a whole.

4.1.21 Example of Writing Compression Sector With Low Appearance Frequency of Remaining Capacity Written in this example to the hard disk 30 is the compression sector having a capacity of the minimum appearance frequency with respect to the remaining capacities after allocating the compressed segments among the plurality of compressed segments.

Figure 27:
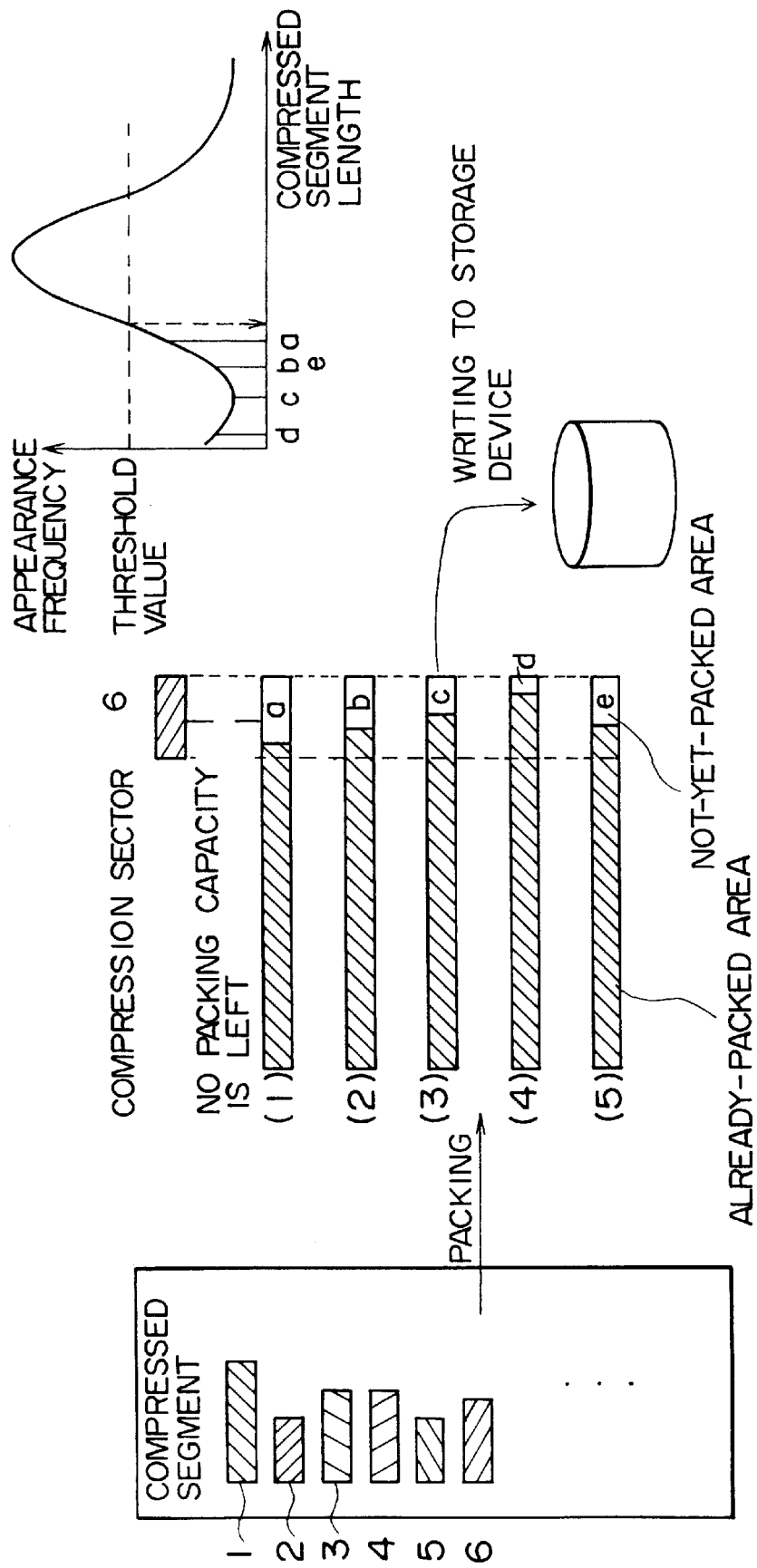
FIG. 27 is a diagram showing an example where the compression sector with a low appearance frequency of the remaining capacity is written.

A specific example will be explained with reference to FIG. 27. Referring first to FIG. 27, a curve depicted rightly upward is a graph in which the axis of abscissas indicates the compression segment length, while the axis of ordinates indicates the appearance frequency. In this graph, a predetermined threshold value X is set in the compressed segment length given on the axis of abscissas, while a predetermined threshold value Y is set in the appearance frequency given on the axis of ordinates.

Then, it is assumed that pieces of data (compressed segments) are generated in the sequence such as 1, 2, 3, 4, 5, 6 . . . . The hatching area is an already packed area, while the blank areas (a, b, c, d, e) are not-yet-packed areas in the compression sectors (1)–(5).

Herein, if the data generated cannot be allocated to any compression sectors (1)–(5), and if a capacity of the blank area in each of the compression sectors (1)–(5) falls within a range from 0 to the threshold value X, the compression sector with the minimum appearance frequency of the compressed segment length equal to a length of the blank area (a, b, c, d, e), i.e., the compression sector (3) (blank area is (c)) is written to the hard disk 30.

In this example, the compression sector that is easy to remain in the memory can be written to the hard disk 30 ahead of others, and it therefore follows that the memory for the compression sectors can be effectively used.

Further, the appearance frequency distribution in FIG. 27 becomes static because of using the static data prepared beforehand, and the remaining capacity may be predicted by using this static appearance frequency distribution. This prediction involves the use of the data prepared beforehand and therefore yields an effect of facilitating the operation.

Further, the appearance frequency distribution in FIG. 27 shows the frequencies versus the compressed segment lengths. Hence, the data lengths of the compressed segments that appear each time the write request to the disk comes are classified, and an appearance frequency thereof is stored in the variable prepared per data length, whereby a dynamic appearance frequency distribution is formed. The remaining capacity may be predicted by use of this dynamic appearance frequency distribution. In this prediction, the appearance frequency distribution has to be updated successively. Nevertheless, the distribution conforming to the actual data strings is obtained, and this prediction therefore exhibits an effect of performing the allocation to the compression sector at a high efficiency.

It is to be noted that the appearance frequency distribution in the method of writing the remaining capacity of a low appearance frequency may involve the use of a combination of the static and dynamic appearance frequency distributions. The dynamic appearance frequency distribution conforms to the actual data strings but is unstable in the form of distribution as well as lacking its reliability if a given quantity of samples are not prepared. Then, till a required number of samples on the order of, e.g., 100 KB—several ten MB are prepared to some extent, the static appearance frequency distribution is employed. After the required number of samples have been prepared, however, the dynamic appearance frequency distribution is used. A more reliable data length of the compressed segment can be thereby predicted.

4.1.22 Example of Writing Inaccessible Compression Sector

Explained next is a method of writing the compression sector that is inaccessible most, i.e., most unsuitable as a packing target among the plurality of compression sectors. The cache memory 22 expels the oldest one in terms of an accessed time outside the memory as compared with others. Similarly, the oldest one in terms of the accessed time as compared with other compression sectors is written to the hard disk 30. With this operation, the memory for the compression sectors can be effectively used.

Note that the compression sectors for packing are numbered, and an access time can be known by updating the sequence thereof for every packing. For example, there are provided 10 pieces of compression sectors, these compression sectors are numbered 1 through 10. Then, it is assumed that the access time sequence thereof goes as follows at a given time.

Accessed <-2 3 6 4 1 5 10 8 9 7-> Non-accessed Herein, supposing that the compression sectors are packed in the sequence such as 9, 5, 7, 3, the sequence is changed as below:

Accessed <-9 2 3 6 4 1 5 10 8 7-> Non-accessed
Accessed <-5 9 2 3 6 4 1 10 8 7-> Non-accessed
Accessed <-7 5 9 2 3 6 4 1 10 8-> Non-accessed
Accessed <-3 7 5 9 2 6 4 1 10 8-> Non-accessed That is, the access sequence is to be managed at all times by bringing the accessed one to the head position. Then, when packed next, if there is no space for packing and there comes to a phase to write the compression sector to the disk, it follows that the No.8 packing compression sector accessed at the oldest time is written to the disk.

Operations based on the above method will be shown as follows:

(a) The cache segment to which the write request is given is compressed.

(b) If there is no space for storing the compressed segment in the packing area, that is, if in a state where packing cannot be conducted any more, the compression sector is written to the disk 30. At this time, a method of determining the compression sector to be written to the disk 30 among the plurality of compression sectors involves the use of the compression sector accessed oldest as shown above.

(c) The compressed segments are packed.

(d) The processing returns to the operation (a).

4.1.23 Example of Updating Through Partial Replacement

Given next is a description of a process executed when replacing the data that have already been written to the hard disk 30, i.e., an updating process.

Figure 28:
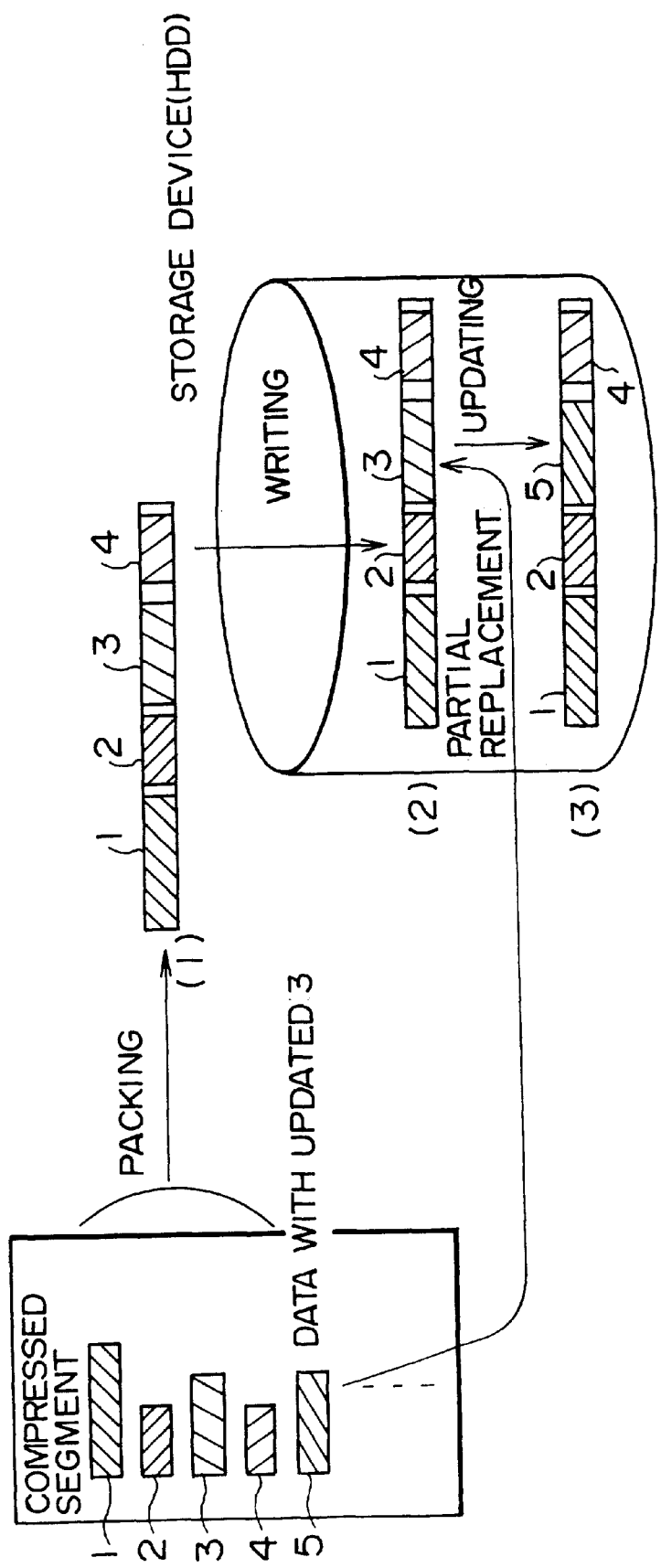
FIG. 28 is a diagram showing an example of updating by a partial replacement.

FIG. 28 shows a method of updating through the partial replacement. In the case of updating the compressed segment 3 in the compression sector to which the compressed segments 1, 2, 3, 4, 5 are allocated, this is a process executed on the occasion of a replacement with the compressed segment 5 defined as a piece of data after being updated. Herein, a data length of the compressed segment 5 is not larger than a data length of the compressed segment 3, and, hence, the compressed segment 5 is written directly to the area occupied by the compressed segment 3 and then updated.

According to this method, the data rewriting is effected with respect to only the area needed for updating, and the operation can be therefore done at a high speed.

4.1.24 Example of Erasing and Updating by New Packing

Figure 29:
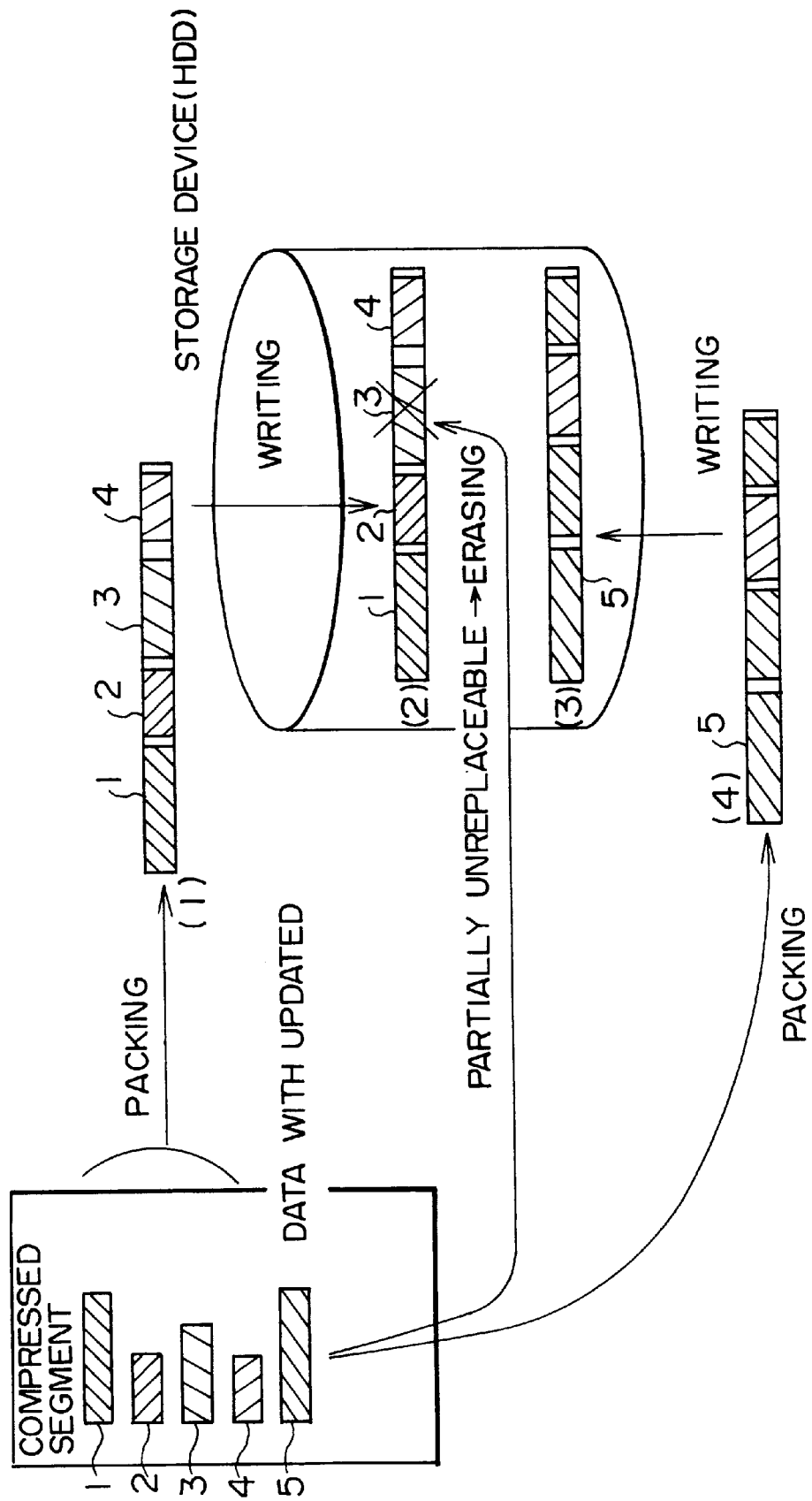
FIG. 29 is a diagram showing an example of erasing and updating by new packing.

FIG. 29 illustrates how erasing and updating based on new packing are performed. This is a process executed when replacing the compressed segment 3 in the compression sector constructed of the compressed segments 1, 2, 3, 4 with the compressed segment 5 defined as a piece of data after being updated. In this case, the compressed segment 5 defined as the data to be updated has a data length larger than the compressed segment 3, and therefore the area on the hard disk 30 cannot be replaced. Then, the compressed segment 3 is to be erased.

More specifically, in a correspondence table of the compressed segment versus the compression sectors which table is provided in the management table 27a, items with a description of the correspondence thereof are erased. Then, the compressed segment 5 is written to the hard disk 30 by effecting the packing separately.

Videlicet, referring to FIG. 29, the compressed segment 3 is erased from the compression sector (1), and the compressed segment 5 is allocated to the compress on sector (2).

In this example, when using the plurality of compression sectors, as in the same way with the normal (new) writing process, the compression sector to be written to the disk is determined and then written to the hard disk 30.

4.1.25 Development of Compression Sector and Updating by Repacking

Figure 30:
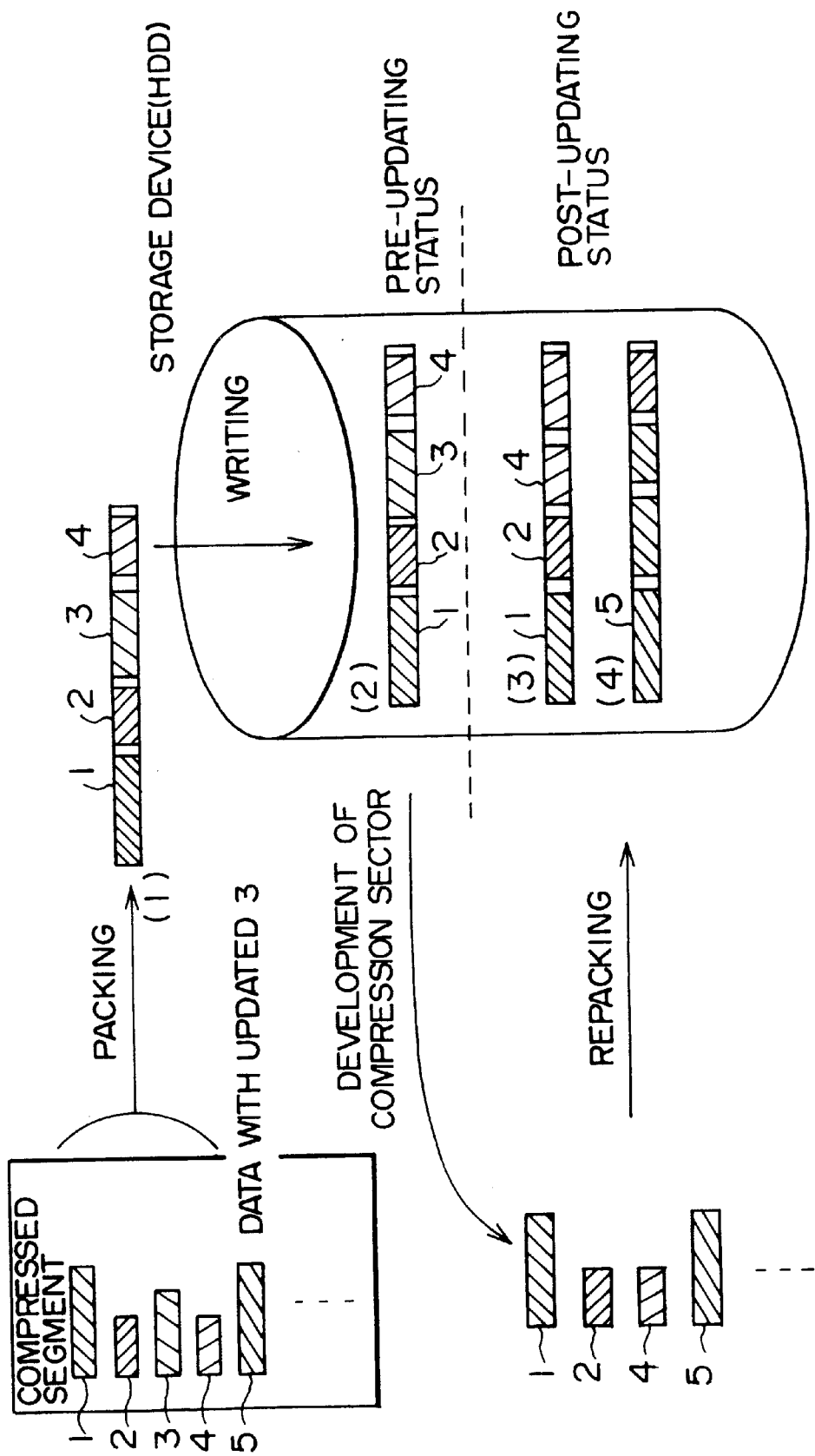
FIG. 30 is a diagram illustrating an example of a development of the compression sector and updating by repacking.

FIG. 30 shows a method of developing the compression sector and effecting the updating by repacking. This is a process executed when replacing the compressed segment 3 in the compression sector constructed of the compressed segments 1, 2, 3, 4 with the compressed segment 5 defined as a piece of data after being updated. This process entails performing a fixed process irrespective of the data length of the compressed segment before and after the updating.

To be specific, all the compressed segments exclusive of the compressed segments before being updated are developed with respect to the compression sector including the compressed segment 3 conceived as the compressed segment before being updated. That is, referring to FIG. 30, when the compressed segment 5 conceived as the data after being updated comes, the updating is conducted by operations which follow.

(a) The compression sector (3) inclusive of the compressed segment 3 is read from the disk 30, and the read data are successively developed (copied) on the memory. The compressed segment 3 itself is defined as the data before being updated and is not therefore required to be developed on the memory.

(b) The compressed segments 1, 2, 4 which have been developed are each packed in the compression sector. Note that if there is no space for packing in the act of performing the packing process, the compression sector for packing will be written ahead to the disk 30.

Next, all the compressed segments (1, 2, 4 in FIG. 30) developed are allocated (packed) to the compression sector as in the same way with the new compressed segments.

Further, the compressed segment 5 conceived as the one after being updated is allocated (packed) to the compression sector.

Then, the thus allocation-processed compression sector is written to the hard disk 30.

When updated as described above, the developed compressed segments and the compressed segment after being updated are packed as in the same manner with the normal (new) writing process.

Also, in this packing process, when the plurality of compression sectors are employed, the compression sector to be written to the disk is determined as in the same way with the normal (new) writing process and then written to the hard disk 30.

4.1.26 Example of Updating With Emphasis on Access Time

Figure 31:
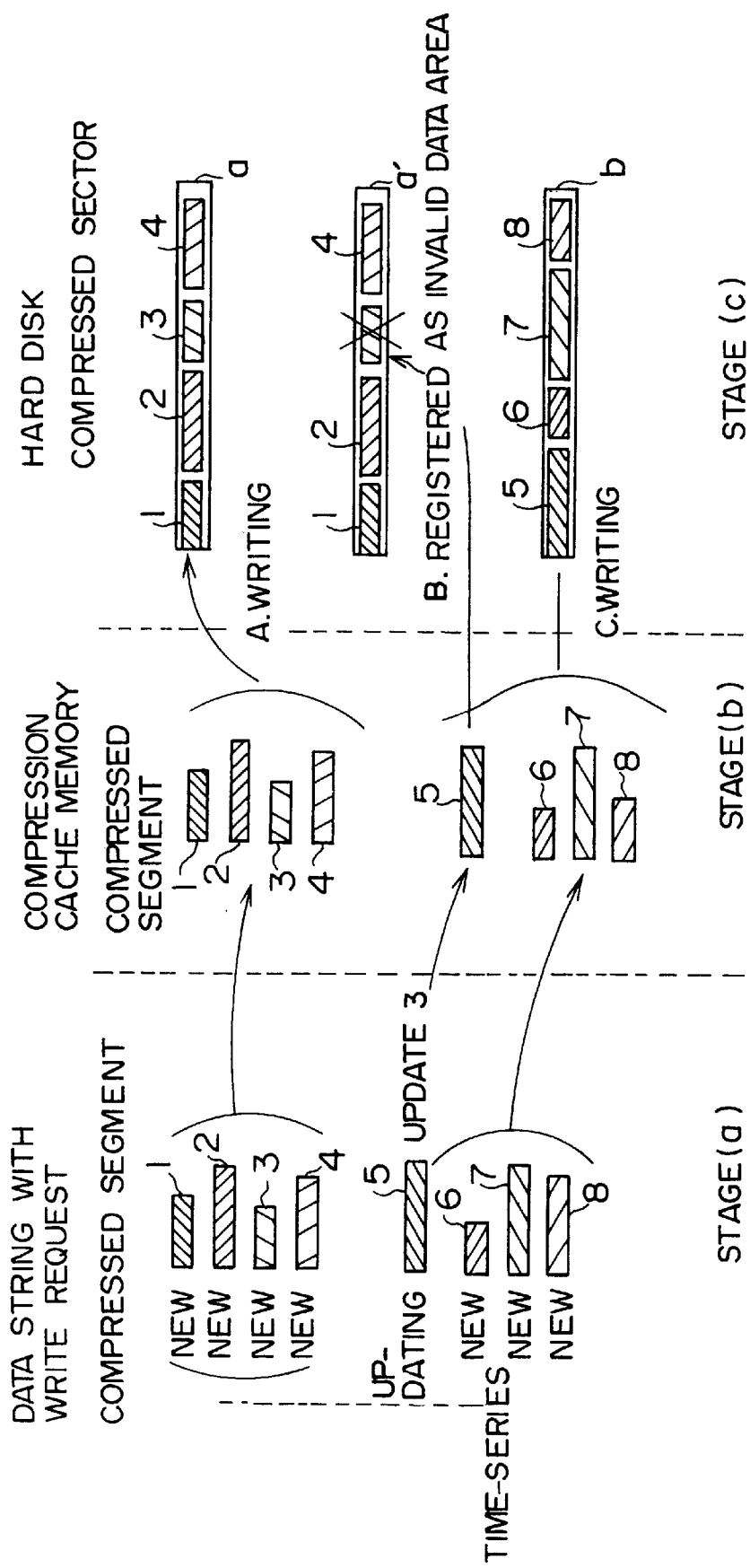
FIG. 31 is a diagram illustrating an example of updating with an emphasis on an access time.

Referring to FIG. 31, an example of updating with an emphasis on an access time will be explained.

A stage (a) shows the compressed segments 1–8.

These compressed segments 1–8 are generated in the time-series sequence, and, particularly, the compressed segment 5 is generated with the compressed segment 3 serving as a target for updating. Each compressed segment is, after being stored in the cache memory 22 (see stage (b)), allocated (packed) to the compression sector by the above-mentioned method. Then, the compression sector packed with the compressed segments is written to the hard disk 30 (see stage (c)).

FIG. 31 illustrates how a compression sector (a) is, after packing with the compressed segments 1–4, written to the hard disk 30.

Herein, it is assumed that the compressed segments 5–8 are stored in the cache memory 22 after the compression sector (a) has been written to the hard disk 30. The compressed segment 5 is used for updating the compressed segment 3, and, therefore, an area to which the compressed segment 3 in the compression sector (a) is allocated is registered as an invalid data area.

Thereafter, a compression sector (b) is, after being packed with the compressed segments 5–8, written to the hard disk 30.

It is to be noted that the compressed segments stored in the cache memory 22 are not immediately packed but packed later when the packing space disappears in the cache memory 22.

Thus, the area allocated with the compressed segment to be updated is registered as the invalid data area, thereby making unnecessary the processes such as replacing (updating) and erasing the contents of the record as well as making unnecessary the access for reading of the area to be updated. It is therefore possible to reduce the time needed for updating.

4.1.27 Example of Releasing Compression Sector

According to the example described in 4.1.26, with the use of the hard disk 30, each time the update data is generated, the number of the invalid data areas is incremented. In other words, the number of recordable areas within the hard disk 30 is decremented. This also means that a data filling rate expressed by a rate of a size of the area recorded with the valid data to a size of the whole record area decreases with the use of the hard disk 30.

Then, with respect to the compression sector having the invalid data area the size of which is larger than a predetermined fiducial value, there is executed such a process (called a compression sector releasing process) that the compressed segments allocated to an area other than the invalid data area are read, and the compression sector from which the compressed segments are read is changed so that the whole areas thereof are made available for the allocation (packing).

FIG. 32 shows an example of the compression sector releasing process. In the compression sector (a) packed with the four compressed segments (1, 2, 3 and 4 in FIG. 32), if the area allocated with the three compressed segments (2, 3 and 4 in FIG. 32) is registered as an invalid data area, a size of the invalid data area becomes larger than the fiducial value (e.g., a half size of the compression sector). Then, the compressed segment 1 allocated to the area exclusive of the invalid data area is read and stored in the cache memory 22.

The compressed segment 1 read herein turns out again a packing target. On the other hand, the compression sector (a) becomes again a packing target.

The compression sector is thus released, thereby making it possible to pack the new compressed segments and restraining the drop in the data filling rate. Also, the capacity of the hard disk 30 can be increased in a logical sense.

4.1.28 Example of Managing Invalid Data Capacity in Each Compression Sector by Use of Table The compression sector releasing process stated in 4.1.27 is effected on the compression sector including the largest invalid data area, which is advantageous in terms of the following points.

First, the number of reading operations from the hard disk 30 can be reduced most, whereby the access time to the hard disk 30 can be reduced when updated.

Second, the time required for repacking can be decreased because of a quantity of the data allocated to the area other than the invalid data area being small.

Figure 33:
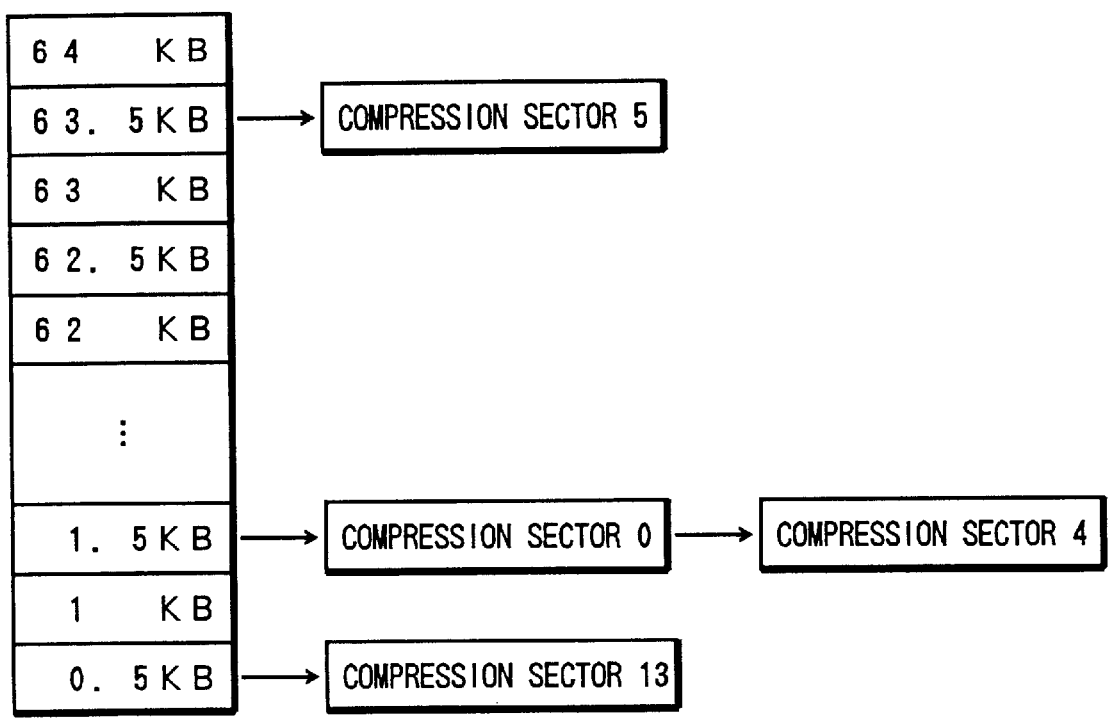
FIG. 33 is a diagram showing an example of a table for managing an invalid data capacity in each compression sector.

Herein, a detection of the compression sector including largest invalid data area makes use of a table shown in FIG. 33. This table is stored with a plurality of numerical values indicating sizes of the invalid data areas and the compression sectors having these numerical values by way of the sizes of the invalid data areas in a correspondence relationship. The numerical values are values of multiples of integers of the minimum allocation unit (512 bytes=0.5 KB) within the compression sector. Then, the invalid data area size exceeding the fiducial value can be searched by referring to this table.

4.2 Processing Operation in Second Embodiment

Next, a processing operation in a second embodiment will be discussed with reference to a flowchart.

4.2.1 Processes Down to Writing Data With Write Request From Host 20 to Hard Disk 30

Figure 34:
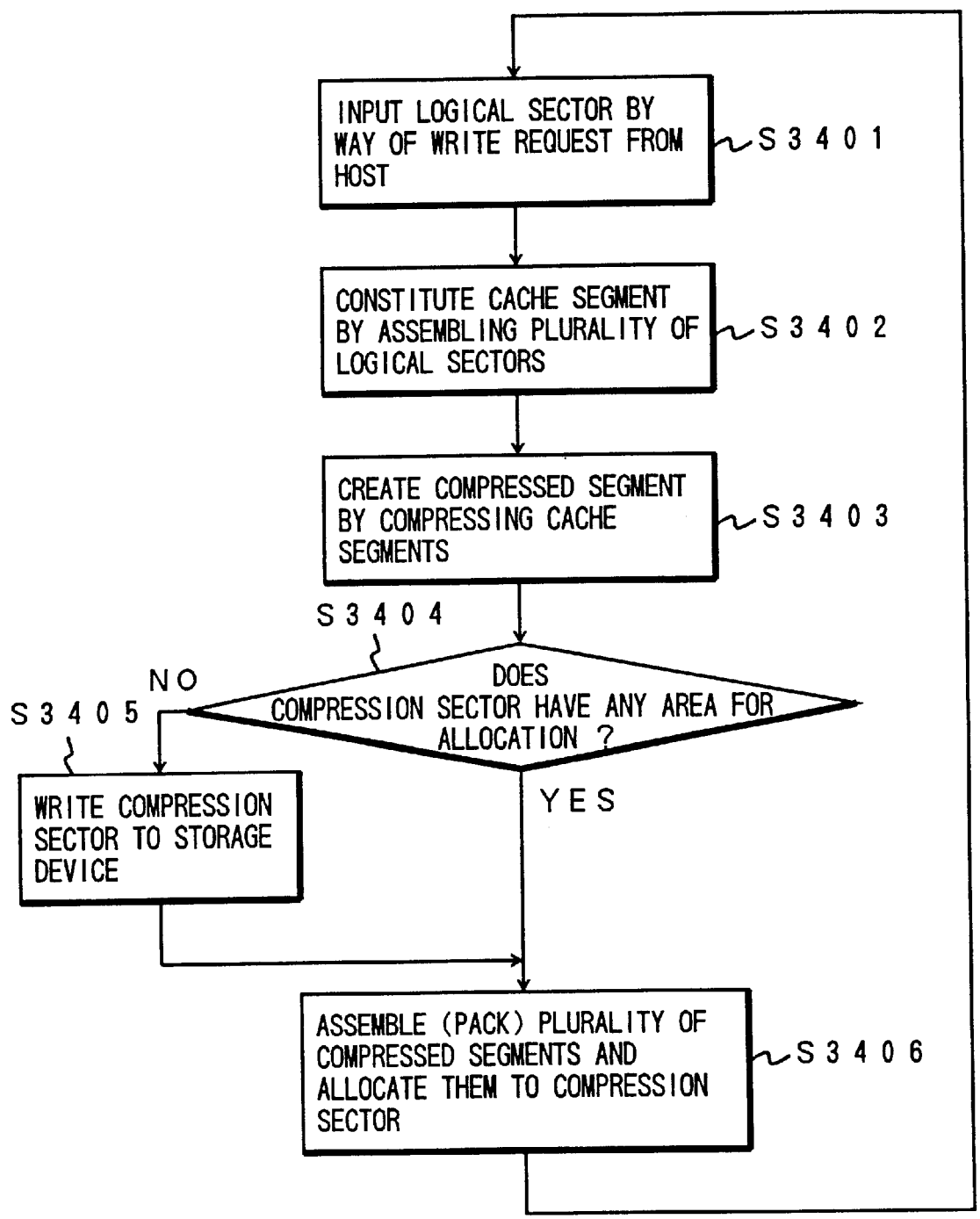
FIG. 34 is a flowchart relative to processes down to writing the data, on a storage device, to which a write request is given from a host.

FIG. 34 shows processes down to writing the data with a write request from the host 10 to the hard disk 30, i.e., a flowchart relative to the processes of FIG. 13 that are referred in 4.1.1.

Input at first is a logical sector by way of the write request given from the host 10 (operation 3401).

Next, a plurality of logical sectors are assembled to form a cache segment having a predetermined size (operation 3402).

Subsequently, the cache segment is compressed to create a compressed segment (operation 3403).

Herein, whether or not there is left an area for allocating the compressed segment to the compression sector is checked by comparing the number of compression sectors with the number of compressed segments (operation 3404).

If answered such as in operation 3404, the compression sector is written to the hard disk 30 (operation 3805).

Whereas if answered such as in operation 3404 as well as after the execution in operation 3405, a plurality of compressed segments are assembled (packed) and allocated to the compression sector (operation 3406).

Then, the processing is re-executed from operation 3401.

4.2.2 Processes for Time-Series Packing

Figure 35:
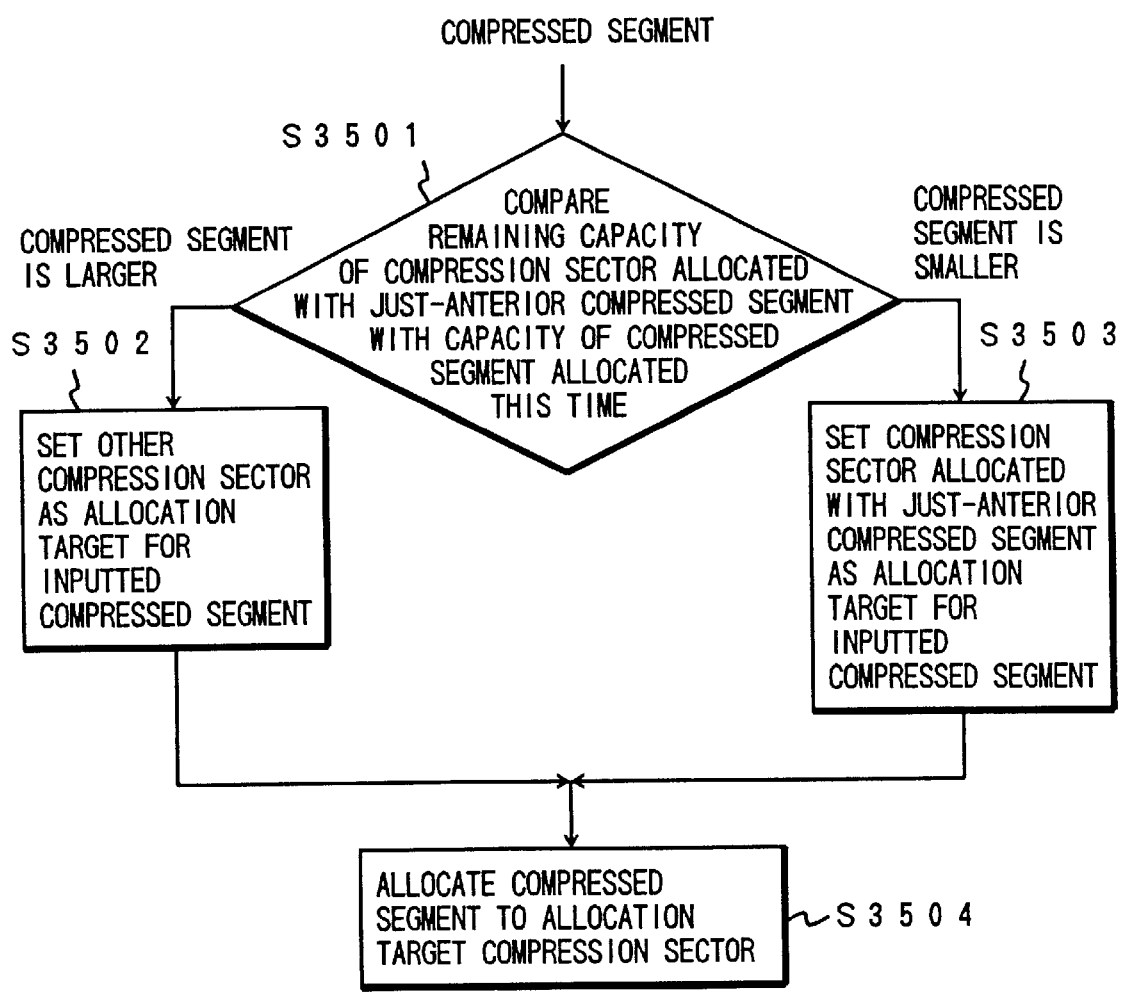
FIG. 35 is a flowchart relative to processes for time-series packing.

FIG. 35 shows processes for time-series packing, viz., a flowchart relative to the processes of FIG. 17 that are referred in 4.1.11.

To start with, the compressed segment is input, and there is made a comparative determination of a remaining capacity of the compression sector to which a compressed segment just anterior thereto with a capacity of a compressed segment allocated this time (operation 3501).

If the determination is that the in operation 3501, other compression sector is set as a target to which the compressed segment input is to be allocated (operation 3502).

Whereas if the determination is that the in operation 3501, the compression sector to which the compressed segment just anterior thereto is allocated is set as an allocation target to which the compressed segment input is to be allocated (operation 3503).

After executing the processes in operations 3502 and 3503, the compressed segment is allocated to the allocation target compression sector (operation 3504).

4.2.3 Processes for Packing With Combination of Specified Sizes

Figure 36:
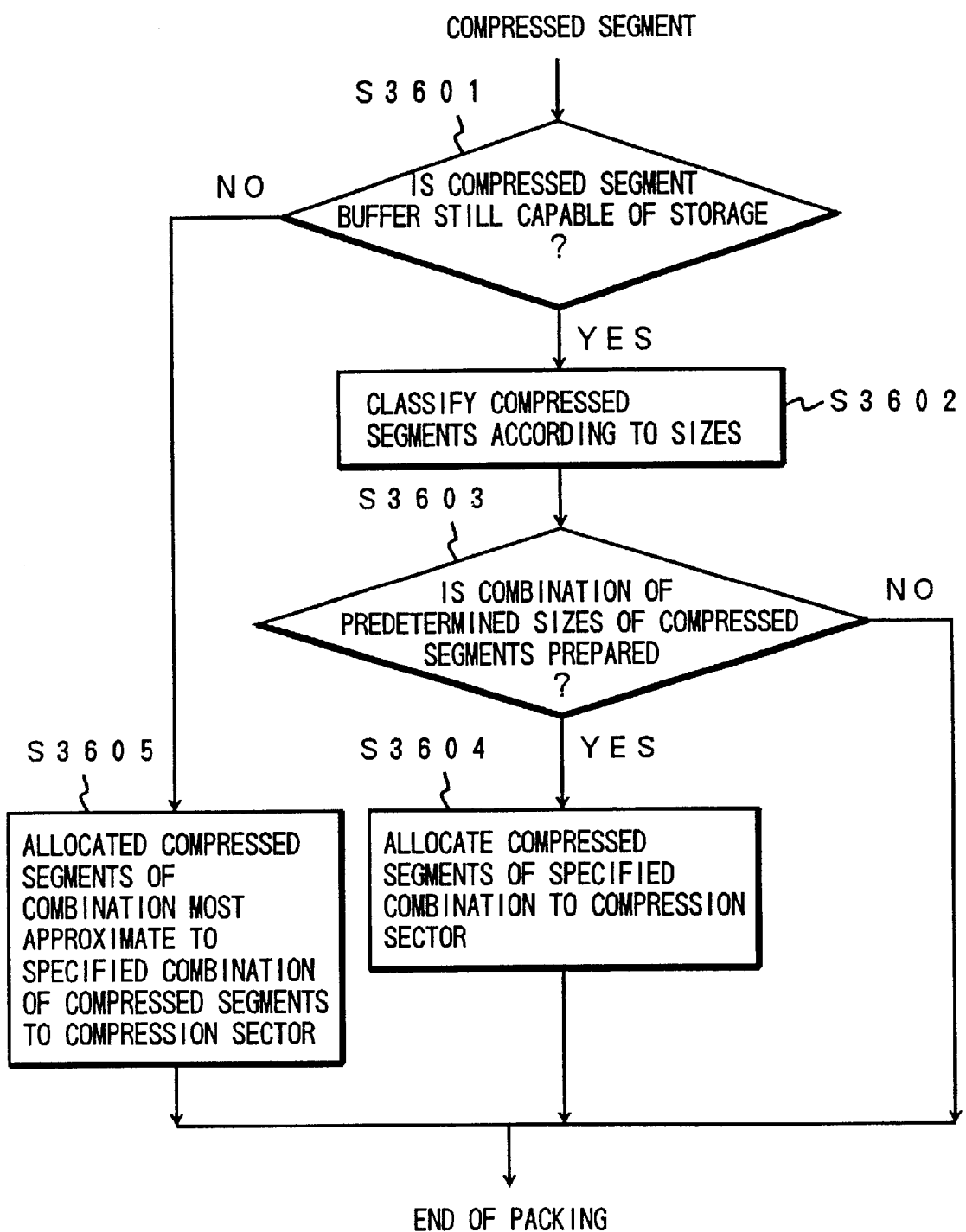
FIG. 36 is a flowchart relative to processes for packing with a combination of specified sizes.

FIG. 36 shows process for packing with a combination of specified sizes, i.e., a flowchart relative to the processes of FIG. 18 that are referred in 4.1.12.

To begin with, the compressed segment is input, and whether or not a buffer for the compressed segments is still capable of storing them is checked (operation 3601).

If determined as being capable of the storage in operation 3602, the compressed segments are classified according to the sizes (operation 3602).

Checked then is whether or not a combination of the predetermined sizes of the compressed segments is prepared (step 3603).

If determined as being unprepared in step 3602, the packing terminates.

Whereas if determined as being prepared in operation 3602, the compressed segments in a specified combination are allocated to the compression sector (step 3603), and the packing comes to an end.

If determined as being incapable of storage in operation 3601, the compressed segments in a combination with a capacity most approximate to that of the specified combination of the compressed segments are allocated to the compression sector (operation 3605), and the packing is finished.

Note that the term prepared in the above discussion implies a state where the compressed segments are each buffered by at least ones with respect to the predetermined sizes (10%, 30%, 60%, 100% in FIG. 18). It may happen that the buffer is full of the compressed segments without any appearance of the compressed segments having the predetermined sizes. In this case, however, the condition of being entails attaining a combination with the capacity most approximate to the predetermined combination.

4.2.4 Processes for Packing Compressed Segment Having Neighboring Address

Figure 19:
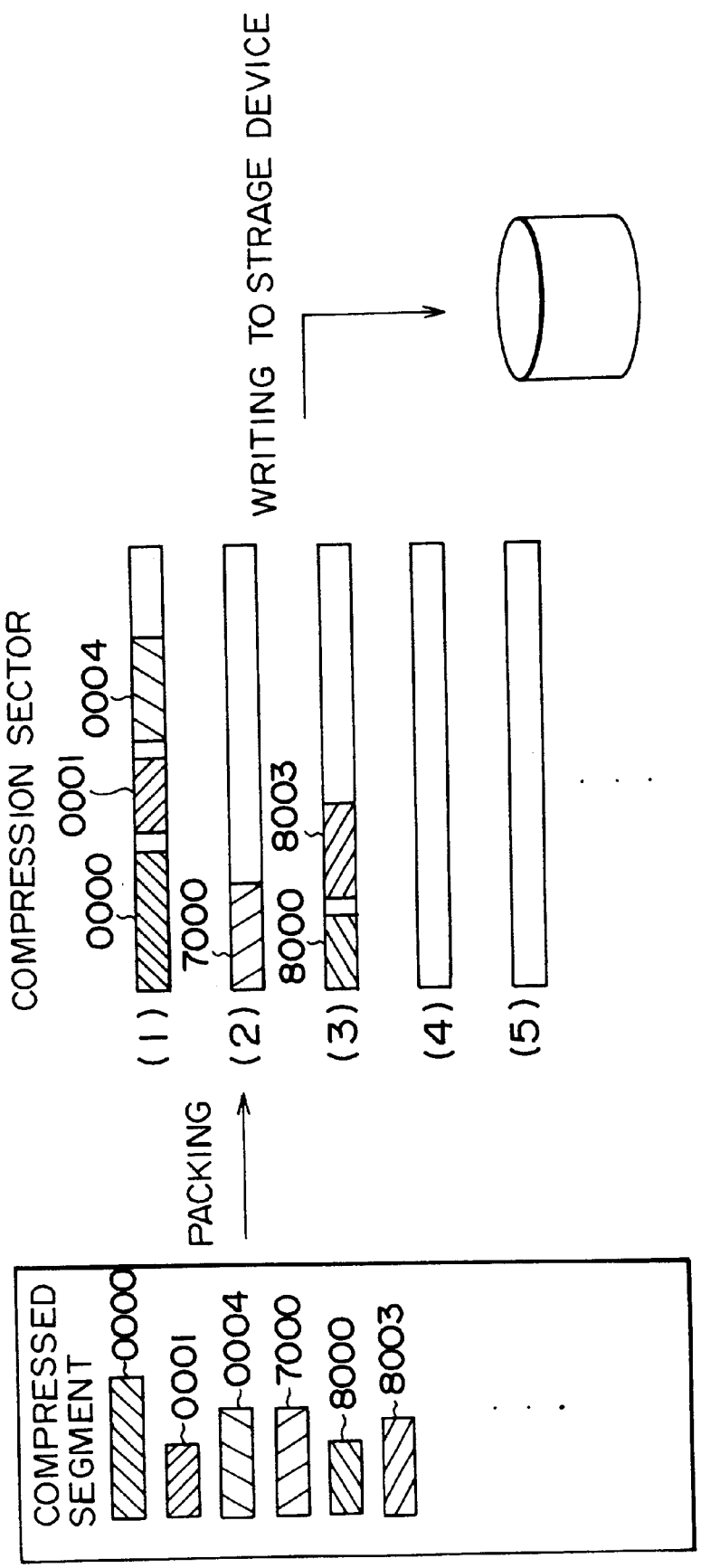
FIG. 19 is a diagram showing an example where the compressed segments having neighboring addresses are allocated to the same compression sector.
Figure 37:
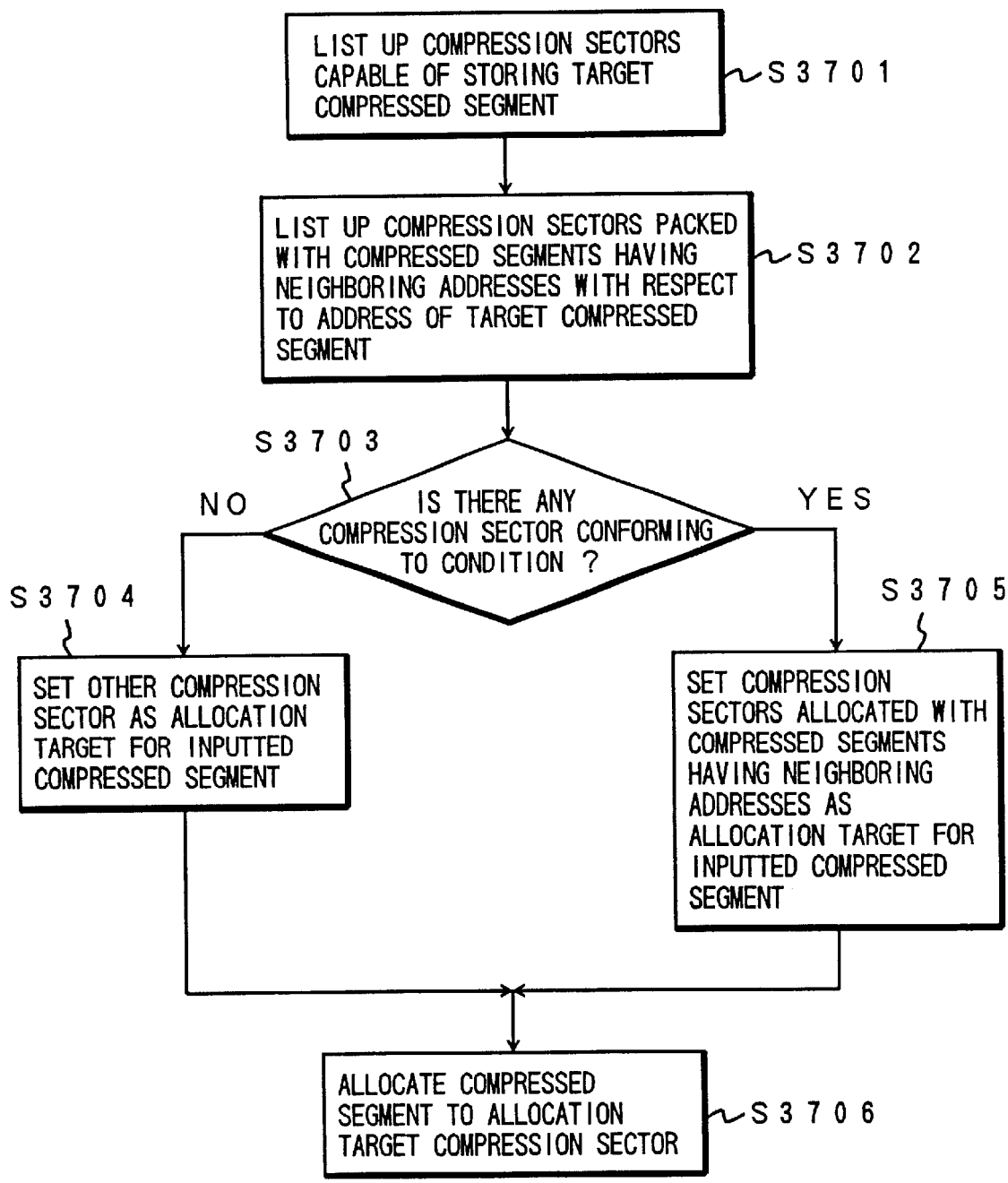
FIG. 37 is a flowchart relative to processes for packing the compressed segments having neighboring addresses.
Figure 38:
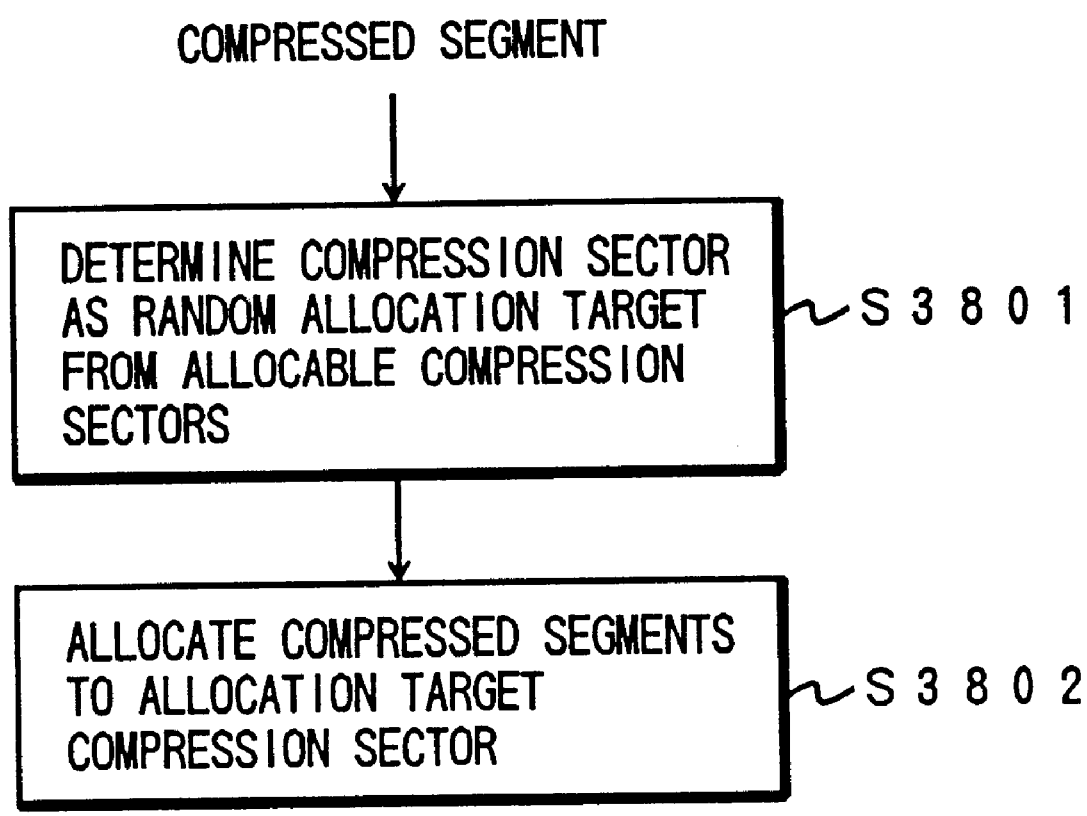
FIG. 38 is a flowchart relative to processes for random packing.

FIG. 37 shows processes for packing the compressed segment having a neighboring address, viz., a flowchart relative to the processes of FIG. 19 that are referred in 4.1.13.

At first, the compressed segment is input, and a compression sector capable of storing the target compressed segment is listed up (operation 3701).

Listed up next is the compression sector packed with the compressed segment having a neighboring address to the address the target compressed segment has (operation 3702).

Then, whether or not there is a compression sector which meets the condition is checked (operation 3703).

If determined as NO in operation 3703, other compression sector is set as a target to which the compressed segment input is to be allocated (operation 3704).

Whereas if determined as YES in operation 3703, the compression sector allocated with the compressed segment having the neighboring address is set as an allocation target to which the compressed segment input is to be allocated (operation 3705).

After executing the processes in operations 3704 and 3705, the compressed segment is allocated to the allocation target compression sector (operation 3706).

4.2.5 Processes for Random Packing

Figure 20:
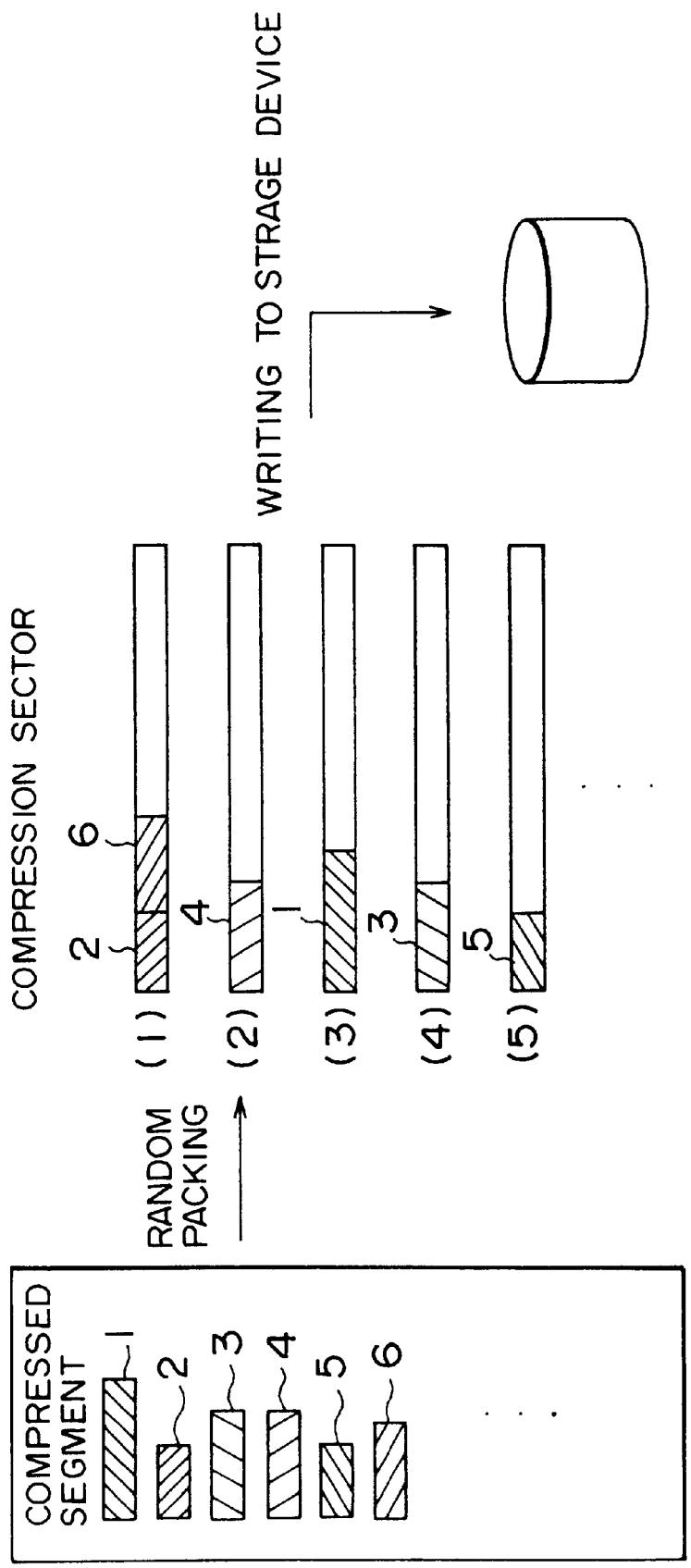
FIG. 20 is a diagram showing an example where the compressed segments are allocated at random to the compression sector.

FIG. 28 shows processes for random packing, i.e., a flowchart relative to the processes of FIG. 20 that are referred in 4.1.14.

To begin with, the compressed segment is input, and a compression sector serving as a target for a random allocation is determined by random number among the allocable compression sectors (operation 3801).

Then, the compressed segment is allocated to the allocation target compression sector (operation 3802).

4.2.6 Processes for Packing Compressed Segments in Sequence

Figure 21:
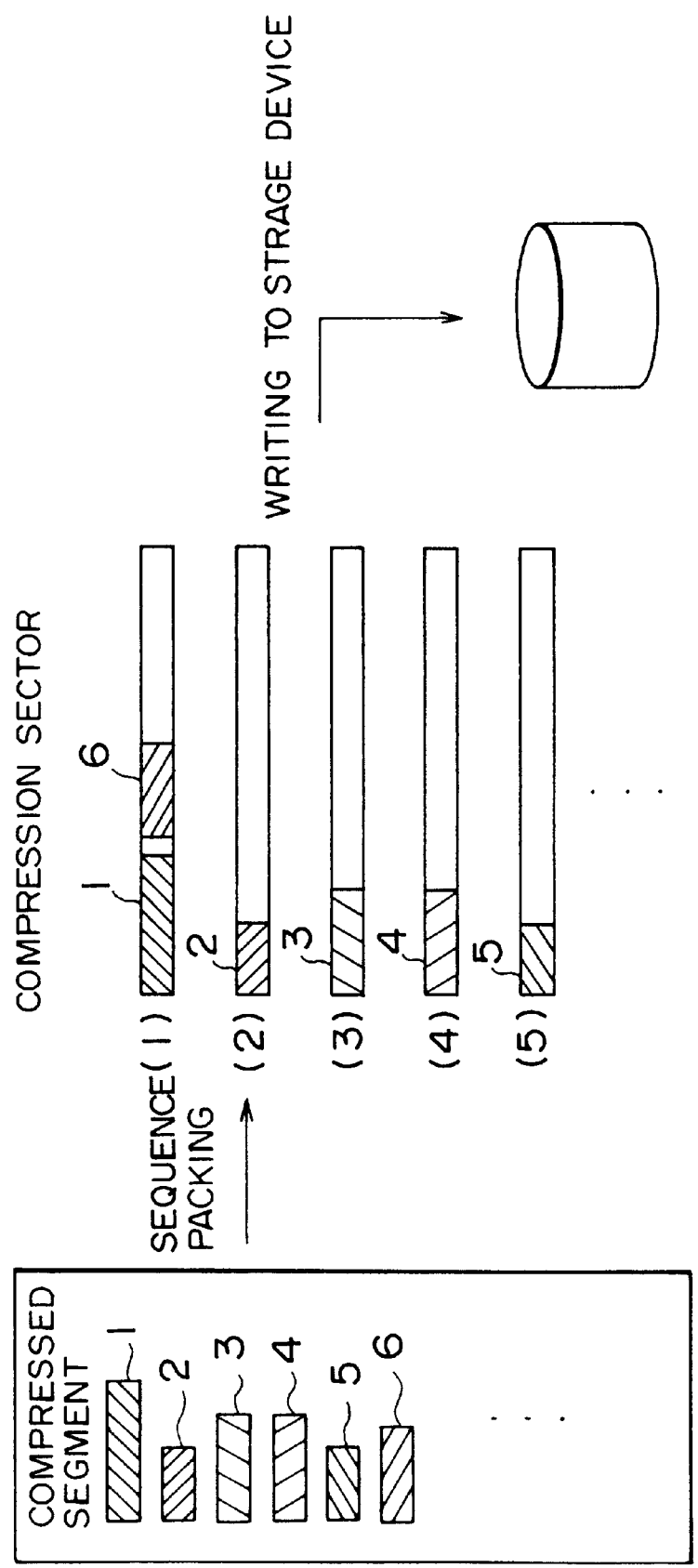
FIG. 21 is a diagram showing an example where the compressed segments are allocated in sequence to the compression sector.
Figure 39:
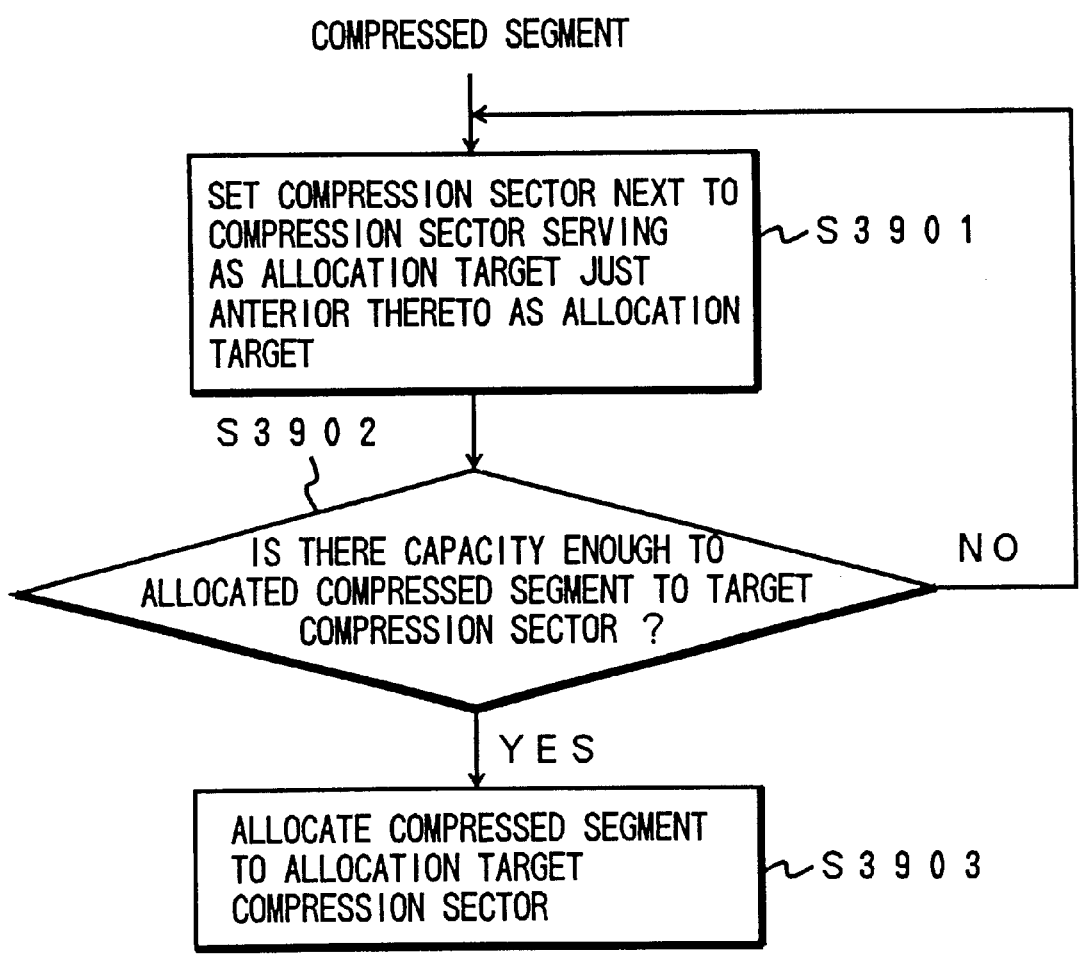
FIG. 39 is a flowchart relative to processes for packing the compressed segments in sequence.

FIG. 39 shows processes for packing the compressed segments in sequence, viz., a flowchart relative to the processes of FIG. 21 that are referred in 4.1.1.

At first, the compressed segment is input, and a compression sector next to the compression sector serving as a target for the allocation just anterior thereto is set as an allocation target (operation 3901).

Checked subsequently is whether or not there is a capacity for allocating the compressed segment to the target compression sector (operation 3902).

If determined as NO in operation 3902, the processing returns to operation 3901 because of shifting to the next compression sector.

Whereas if determined as in operation 3902, the compressed segment is allocated to the allocation target compression sector (operation 3903).

4.2.7 Processes for Packing to Reduce Remainder of Compression Sectors

Figure 40:
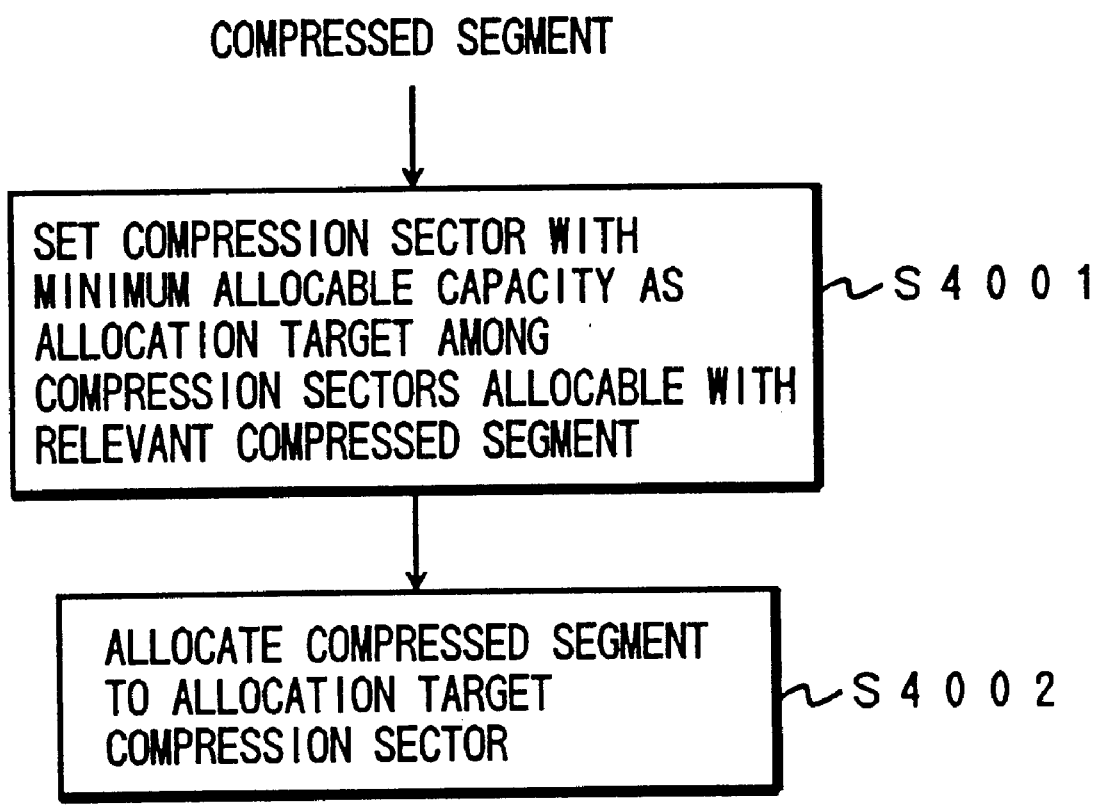
FIG. 40 is a flowchart relative to processes for packing so as to reduce the remainder of the compression sectors.

FIG. 40 shows processes for packing to reduce the remainder of the compression sectors, viz., a flowchart relative to the processes of FIG. 22 that are referred in 4.1.16.

To start with, the compressed segment is input, among the compression sectors to which the relevant compressed segment can be allocated, the compression sector having a minimum allocable capacity is set as an allocation target (operation 4001). That is, the remaining capacity of each compression sector has a variable corresponding thereto, and a content of the variable is changed for every packing. Hence, the compression sector with the minimum allocable capacity can be obtained by comparing the value of this variable per compression sector. Note that if there is no allocable one, the compression sector is written to the disk 30.

Then, the compressed segment is allocated to the allocation target compression sector (operation 4002).

4.2.8 Processes for Packing by Predicting Length of Next Compressed Segment

Figure 41:
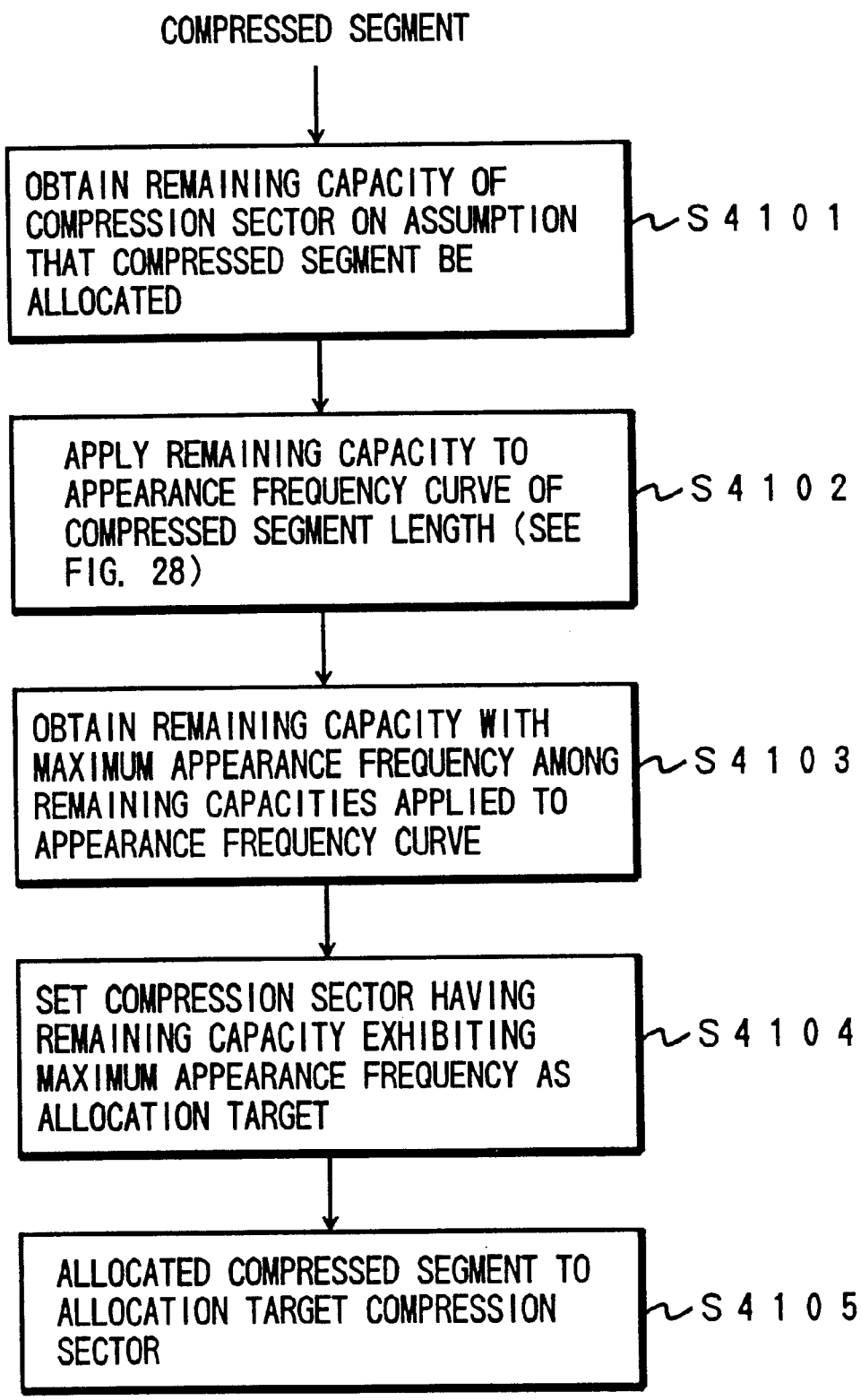
FIG. 41 is a flowchart relative to processes for packing with a prediction of a length of the next compressed segment.

FIG. 41 shows processes for packing by predicting a length of the next compressed segment, i.e., a flowchart relative to the processes of FIG. 23 that are referred in 4.1.7.

To begin with, the compressed segment is input, and there is obtained a remaining capacity on the assumption that the compressed segment is allocated with respect to the individual compression sectors (operation 4101).

Next, the remaining capacity is applied to an appearance frequency curve of the compressed segment length for every sector (operation 4102).

Obtained next is the compressed segment length exhibiting a maximum appearance frequency in the remaining capacity applied to the appearance frequency curve (operation 4103).

Next, the compression sector having the remaining capacity of the maximum appearance frequency is set as an allocation target (operation 4104).

Then, the compressed segment is allocated to the allocation target compression sector (operation 4105).

4.2.9 Processes for Packing by Buffering Next Compressed Segment

Figure 24:
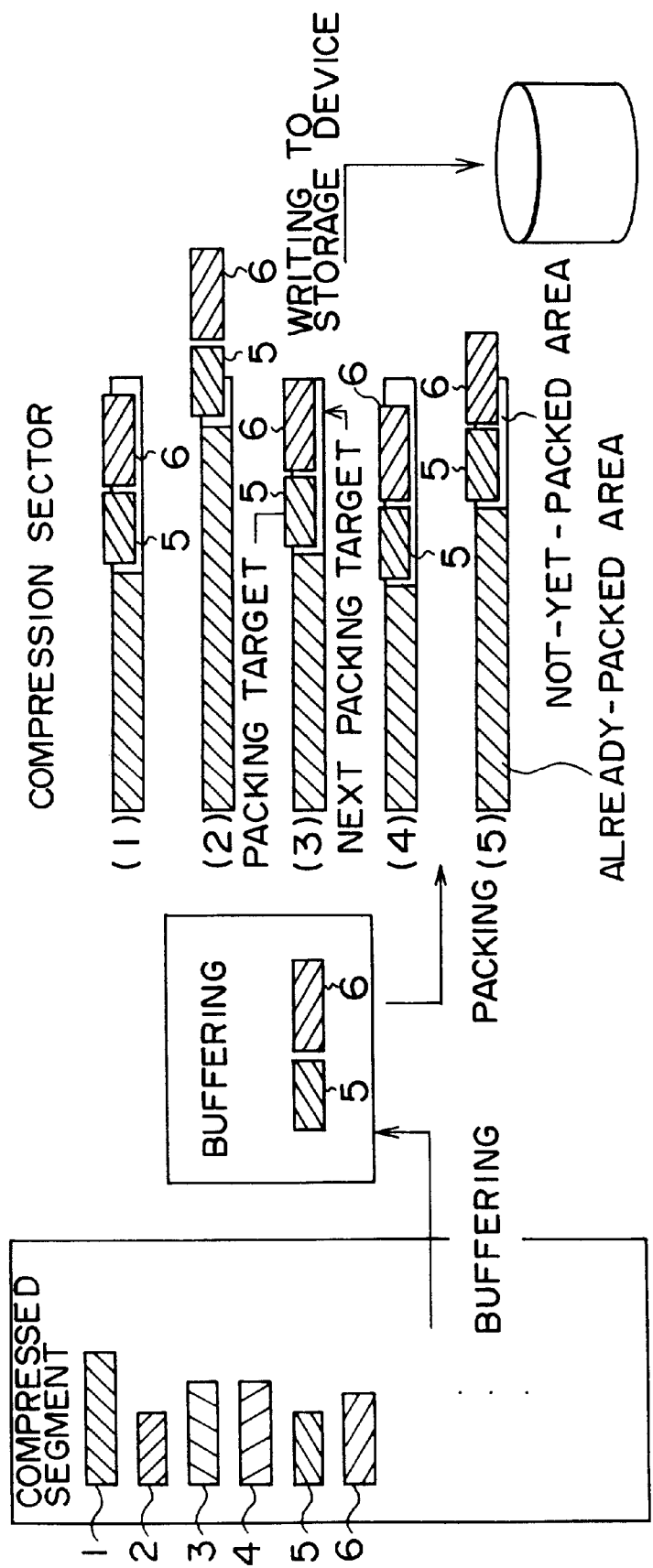
FIG. 24 is a diagram showing an example where the compressed segments are buffered and then allocated to the compression sector.
Figure 42:
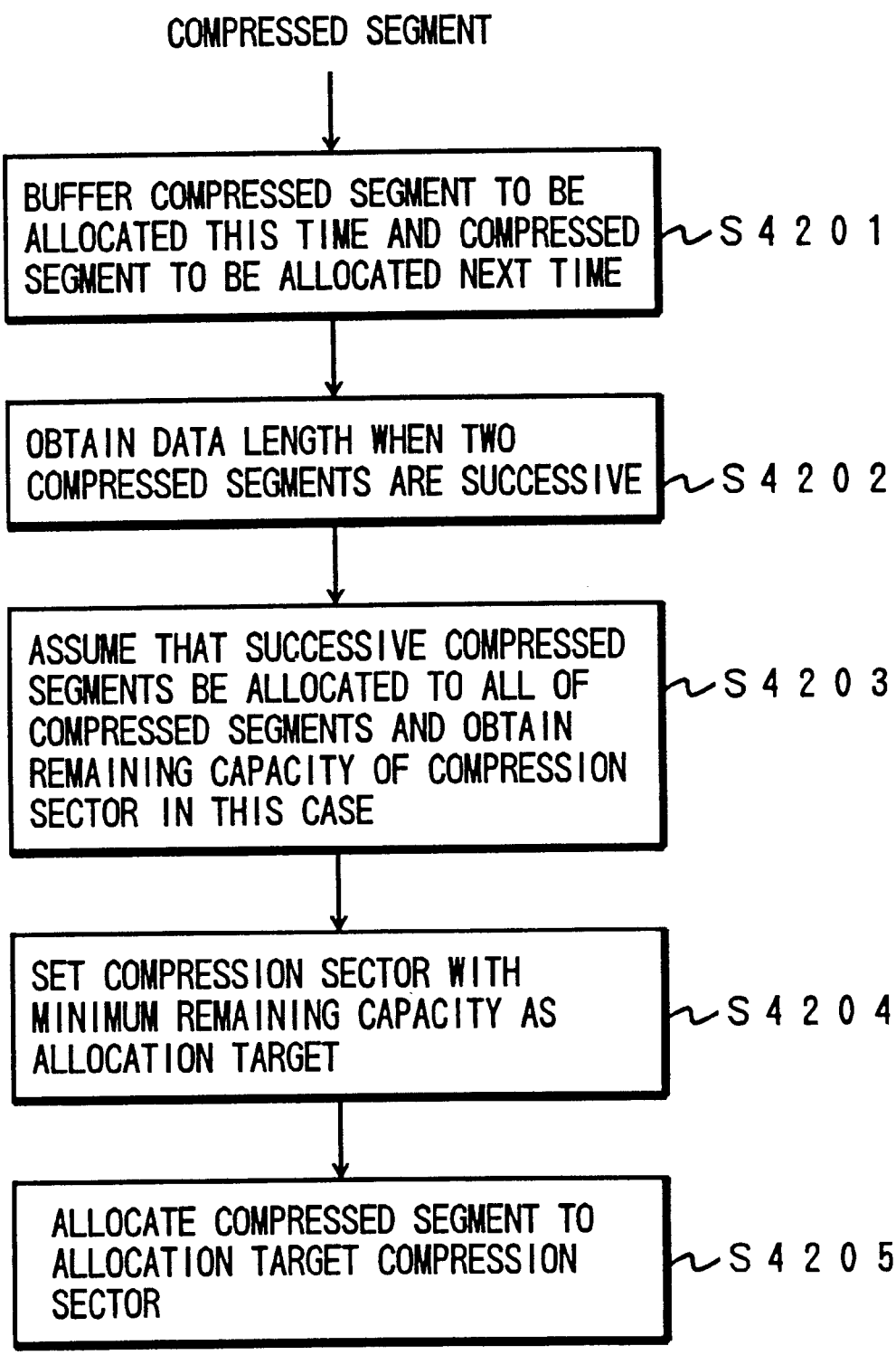
FIG. 42 is a flowchart relative to processes for packing by buffering the next compressed segment.

FIG. 42 shows processes for packing by buffering the next compressed segment, i.e., a flowchart relative to the processes of FIG. 24 that are referred in 4.1.18.

At the first onset, the compressed segments are input, and a compressed segment to be allocated at this time and a compressed segment to be allocated next are buffered (operation 4201).

Obtained next is a data length when the two compressed segments continue (operation 4202).

Subsequently, it is assumed that the continuous compressed segments are allocated to all the compression sectors, and, in this case, a remaining capacity of each compression sector is obtained (operation 4203).

Next, the compression sector with the minimum capacity is set as an allocation target (operation 4204).

Then, the compressed segment is allocated to the allocation target compression sector (operation 4205).

Figure 43:
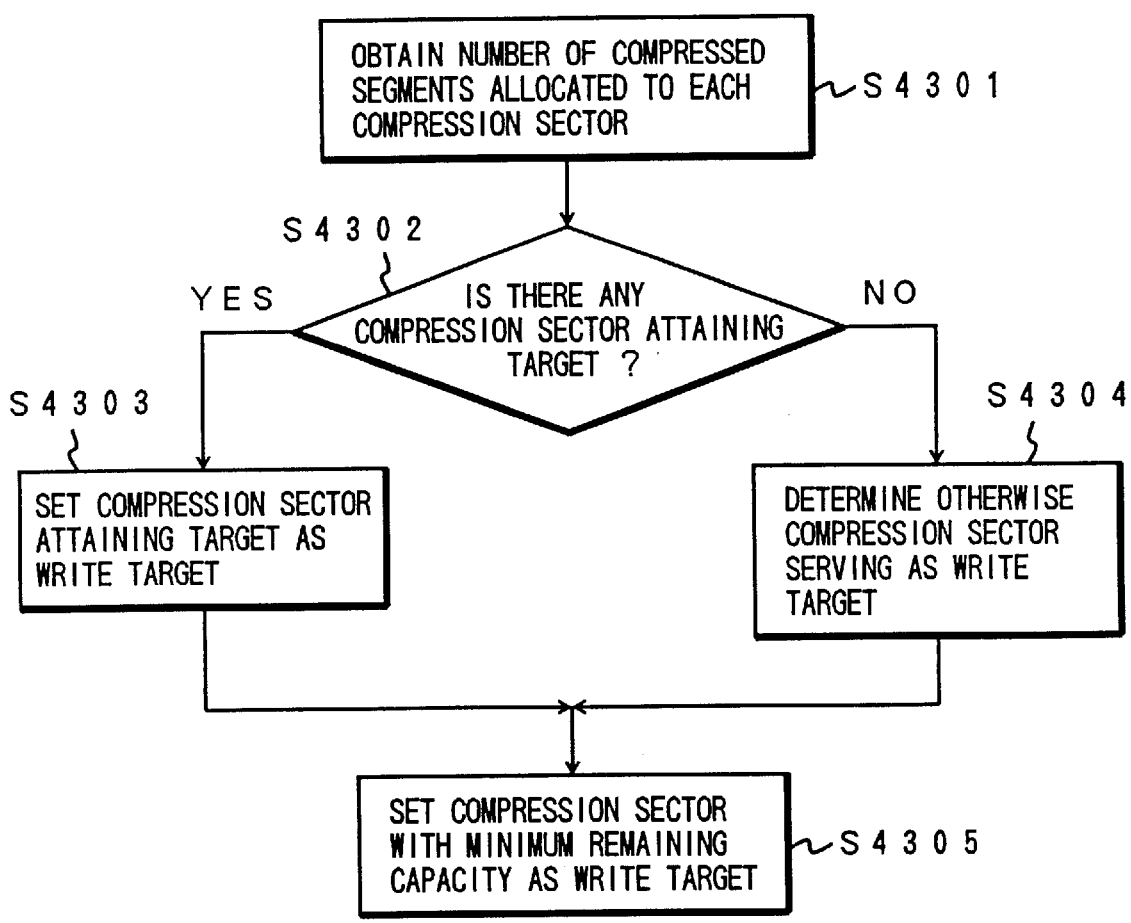
FIG. 43 is a flowchart relative to processes for writing the compression sector attaining a target compression ratio.

4.2.10 Processes for Writing Compression Sector Attaining Target Compression Ratio FIG. 43 shows processes for writing the compression sector attaining a target compression ratio, viz., a flowchart relative to the processes of FIG. 25 that are referred in 4.1.19.

In these processes, a premise is that the compression sector has no capacity for storing the compressed segments.

To begin with, the number of the compressed segments allocated to each compression sector is obtained (operation 4301).

Checked next is whether or not there exists the compression sector that has attained the target compression ratio (operation 4302).

If determined as in operation 4302, the compression sector attaining the target compression ratio is set as the one to be written (operation 4303).

Whereas if determined as, the compression sector to be written is determined by other measure, i.e., by a writing method exclusive of the (operation 4304).

After executing the processes in operations 4303 and 4304, the compression sector to be written is written to the hard disk 30 (operation 4305).

Figure 26:
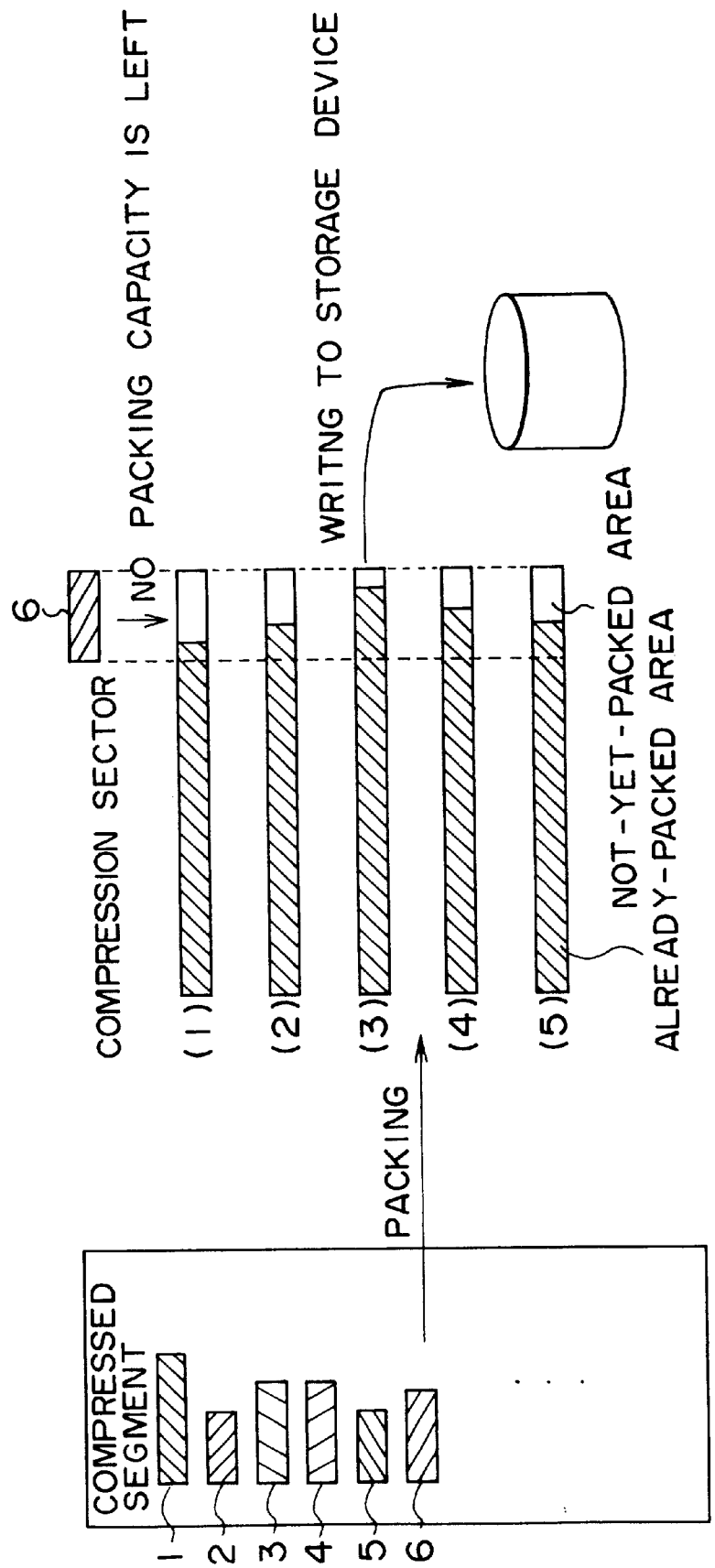
FIG. 26 is a diagram showing an example where the compression sector with a minimum remaining capacity is written.
Figure 44:
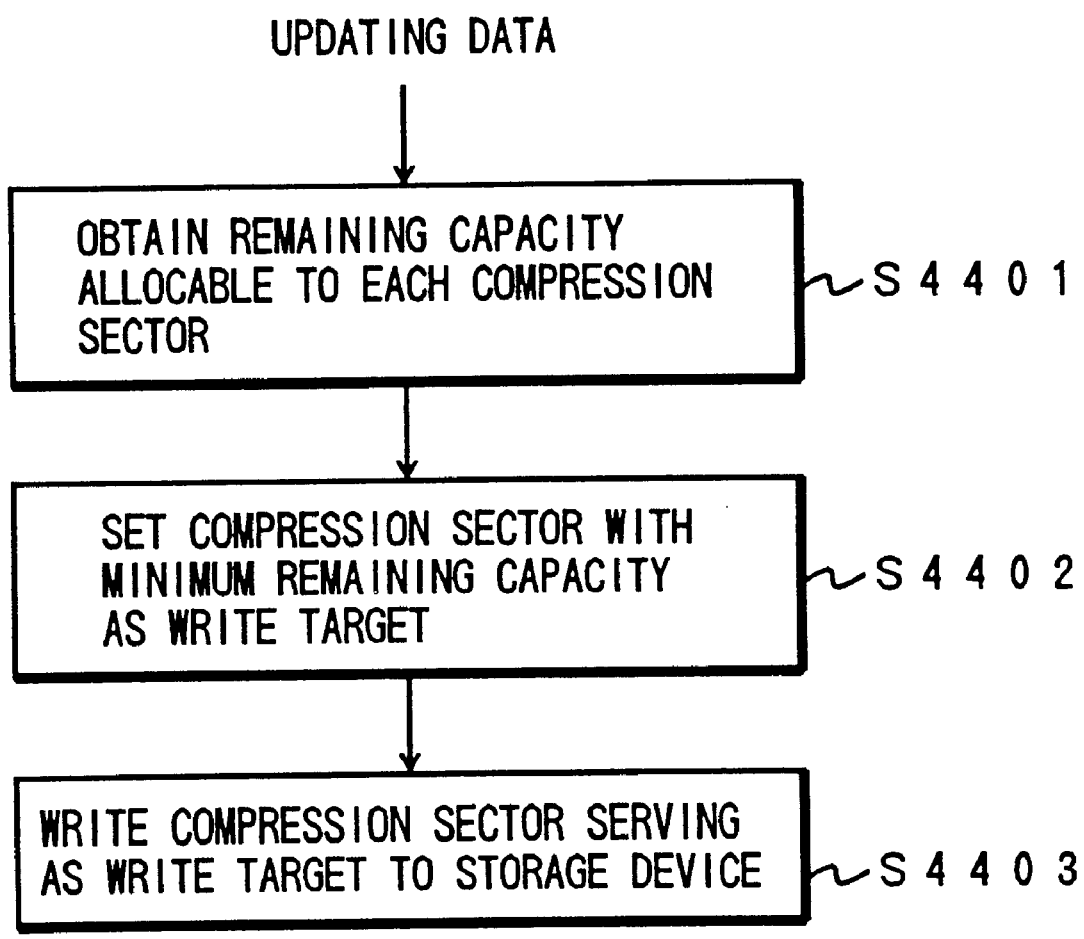
FIG. 44 is a flowchart relative to processes for writing the compression sector with a minimum remaining capacity.

4.2.11 Processes for Writing Compression Sector With Minimum Remaining Capacity FIG. 44 shows processes for writing the compression sector with a minimum remaining capacity, viz., a flowchart relative to the processes of FIG. 26 that are referred in 4.1.20.

To start with, a remaining capacity allocated to each compression sector is obtained (operation 4401).

Next, the compression sector with the minimum remaining capacity is set as the one to be written (operation 4402).

Then, the compression to be written is written to the hard disk 30 (operation 4403).

Figure 45:
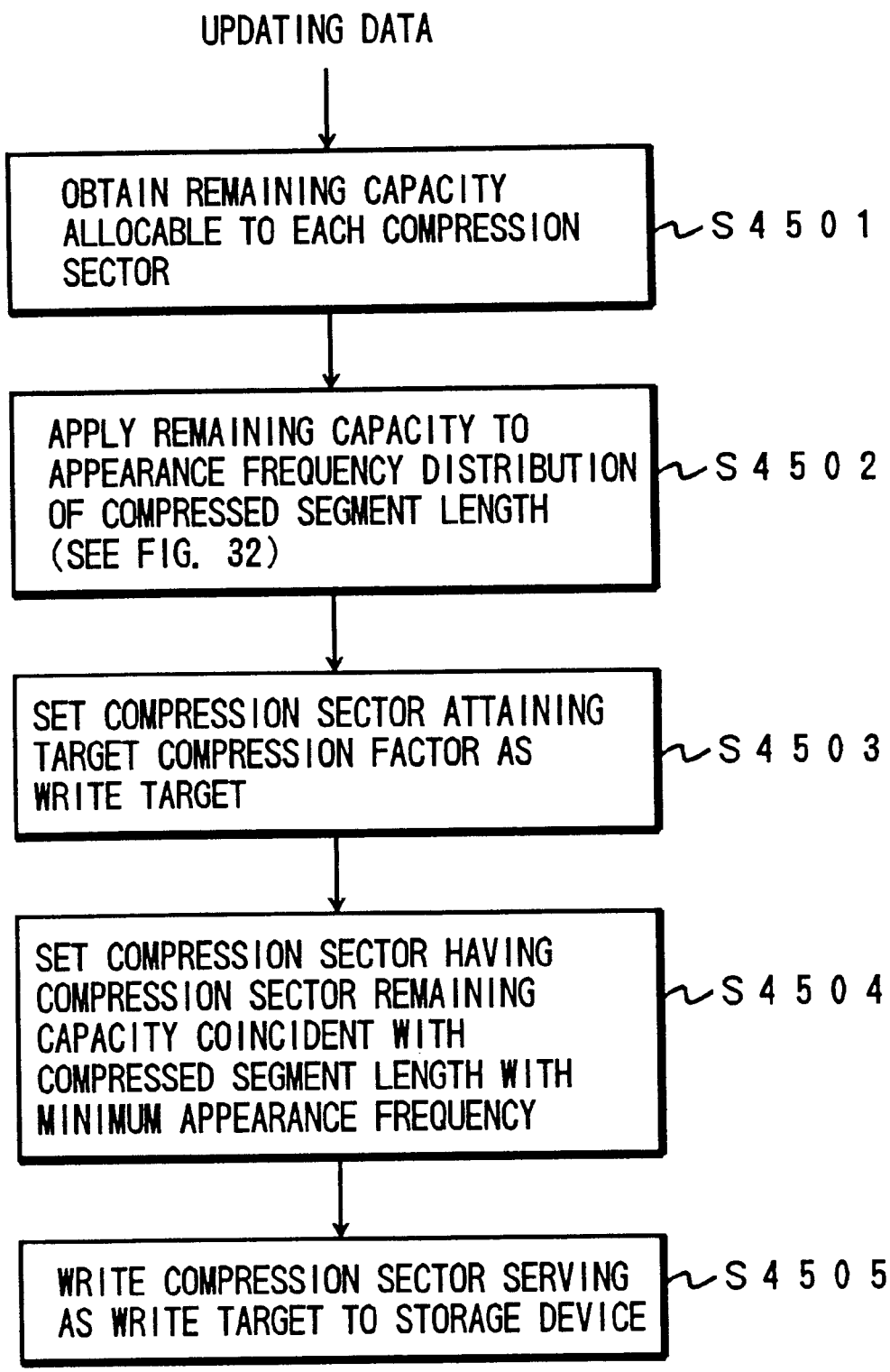
FIG. 45 is a flowchart relative to processes for writing the compression sector with a low appearance frequency of the remaining capacity.

4.2.12 Processes for Writing Compression Sector With Low Appearance Frequency of Remaining Capacity FIG. 45 shows processes for writing the compression sector with a low appearance frequency of the remaining capacity, viz,. a flowchart relative to the processes of FIG. 27 that are referred in 4.1.21.

At first, a remaining capacity allocable to each compression sector is obtained (operation 4501).

Next, the remaining capacity of each compression sector is applied to an appearance frequency distribution of the compressed segment length (operation 4502).

Subsequently, the compression sector attaining a target compression ratio is set as the one to be written (operation 4503).

Set next as the one to be written is the compression sector having a compression sector remaining capacity coincident with the compressed segment of the minimum appearance frequency among the remaining capacity of the respective compression sectors (operation 4504).

Then, the compression sector to be written is written to the hard disk 30 (operation 4505).

4.2.13 Processes for Updating Through Partial Replacement

Figure 46:
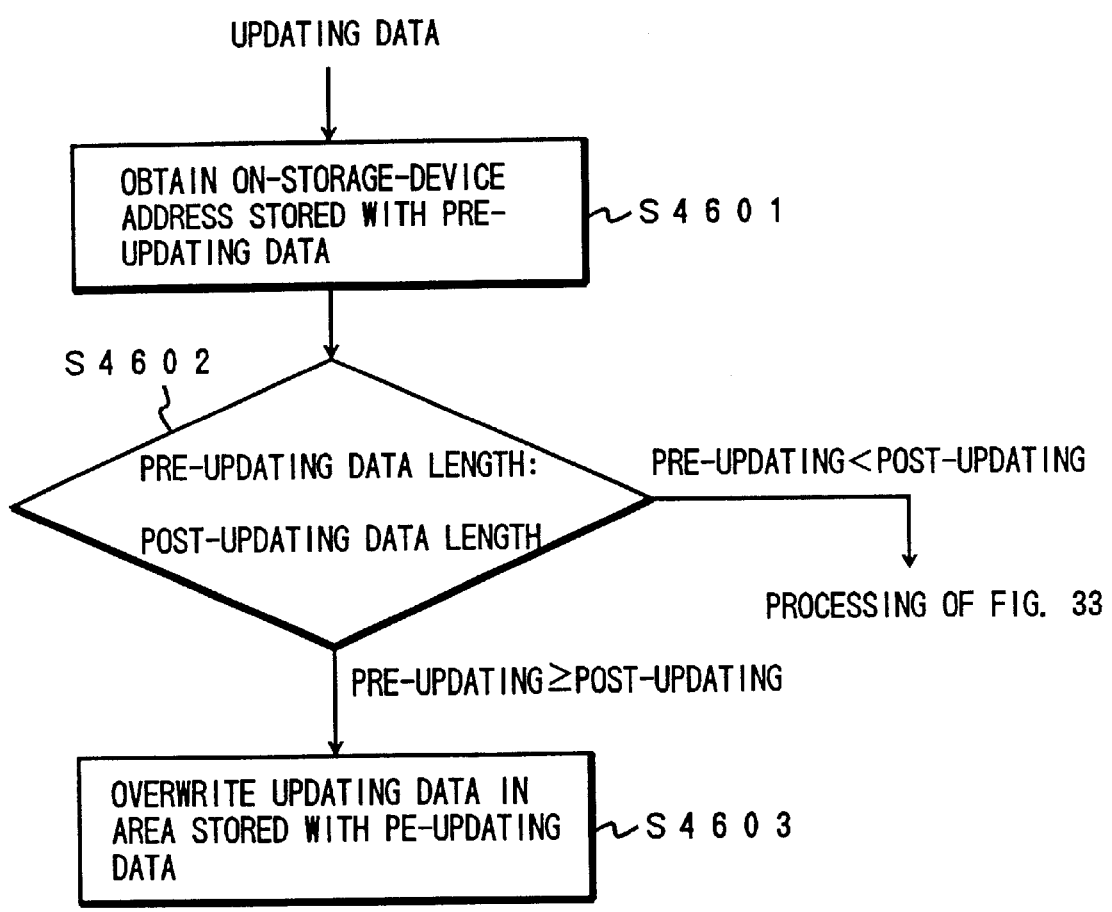
FIG. 46 is a flowchart relative to processes for updating by a partial replacement.

FIG. 46 shows processes for updating through a partial replacement, viz., a flowchart relative to the processes of FIG. 28 that are referred in 4.1.23.

At first, updating data is input, and there is obtained an address on the hard disk 30 stored with the data before updating (operation 4601).

Made next is a comparative determination of a data length before updating with a data length after updating (operation 4602). That is, the is managed for every individual cache segment by the management table 27a, while the turns out a data length of the compressed segment that is set as a target at present. Hence, these data lengths are compared by use of the operators ">" and "<" on the firmware.

If the determination is that in operation 4602, the updating data are overwritten to the area stored with the data before updating (operation 4603).

Figure 47:
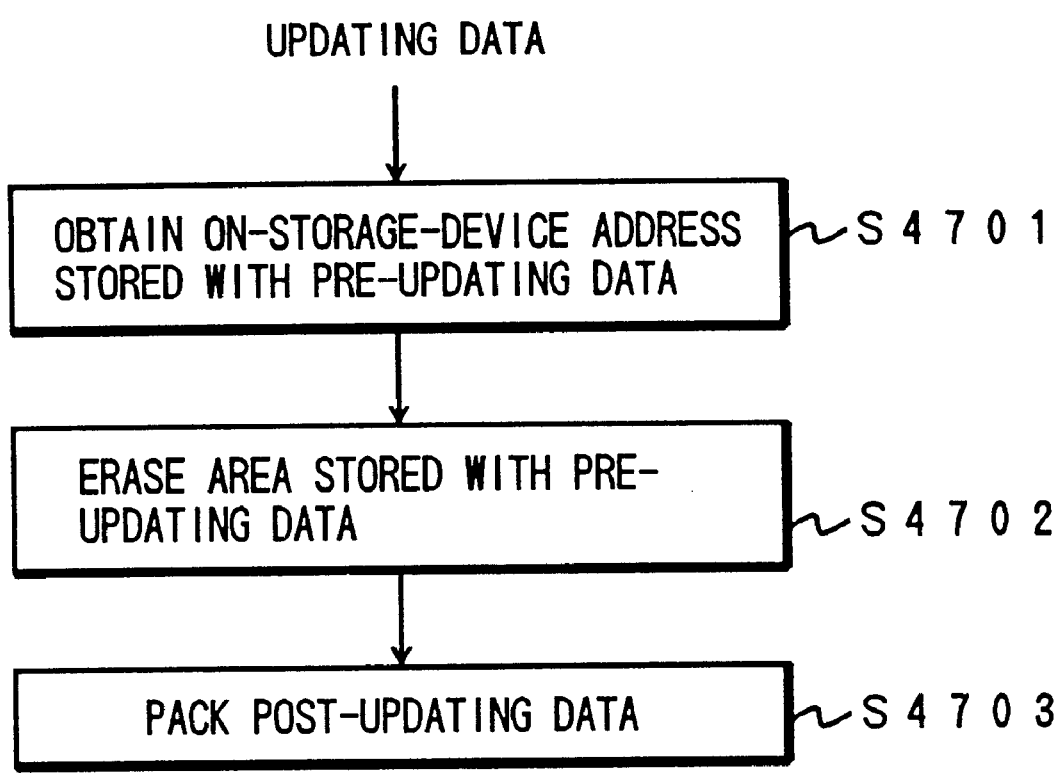
FIG. 47 is a flowchart relative to processes for erasing and replacing by new packing.

If the determination is that in operation 4602, the operation moves to processes shown in FIG. 47.

4.2.14 Processes for Erasing and Replacement by New Packing

FIG. 47 shows processes for erasing and the replacement by new packing, i.e., a flowchart relative to the processes of FIG. 29 that are referred in 4.1.24.

At first, the updating data is input, and an address on the hard disk 30 stored with the data before updating is obtained (step 4701).

Next, if the determination is that the data length before updating is smaller than the data length after updating, the area stored with the pre-updating data undergoes erasing (operation 4702).

Then, post-updating data are packed (operation 4703).

Figure 48:
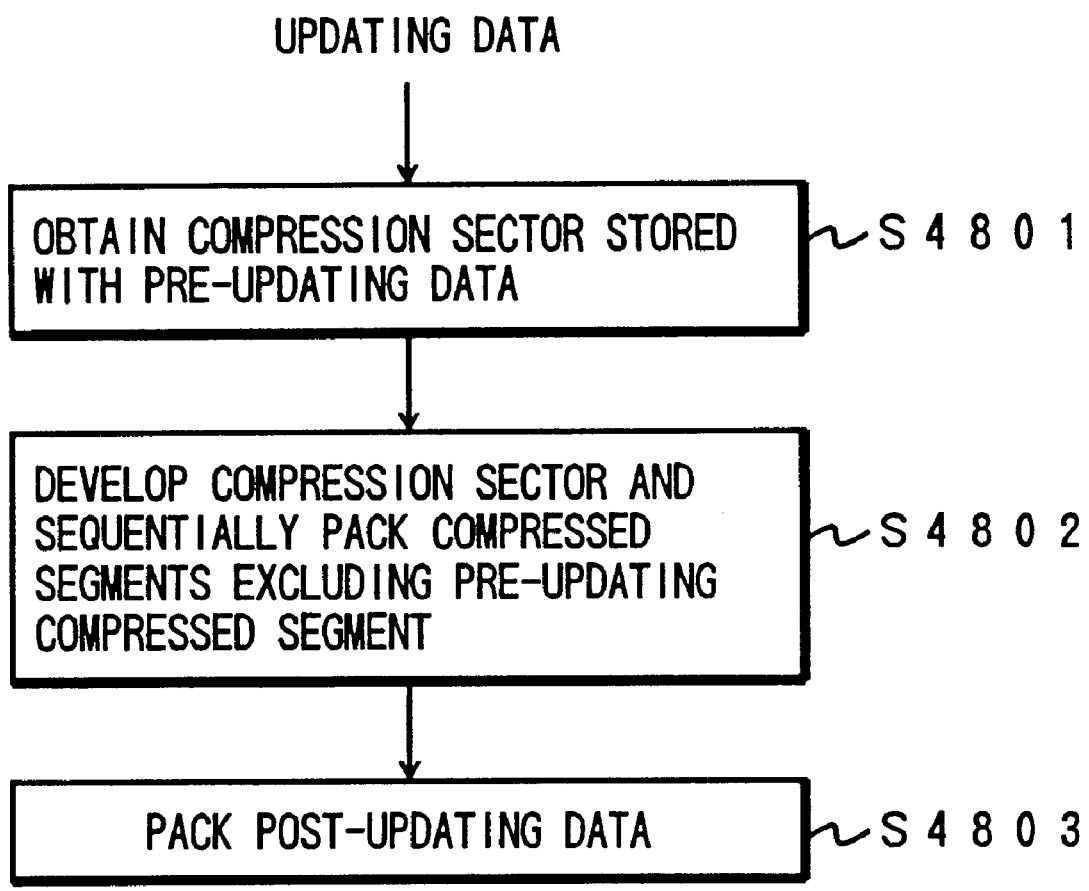
FIG. 48 is a flowchart relative to processes for a development of the compression sector and updating by repacking.

4.2.1 Processes for Development of Compression Sector and Updating by Repacking FIG. 48 shows processes for a development of the compression sector and updating by repacking, i.e., a flowchart relative to the processes of FIG. 30 that are referred in 4.1.25.

To begin with, the updating data is input, and the compression sector stored with the pre-updating data is obtained (operation 4801).

Next, the compression sector is developed, and the compressed segments exclusive of the pre-updating compressed segment are sequentially packed (operation 4802).

Then, the post-updating data are packed (operation 4803).

4.2.16 Processes for Updating With Emphasis on Access Time

Figure 49:
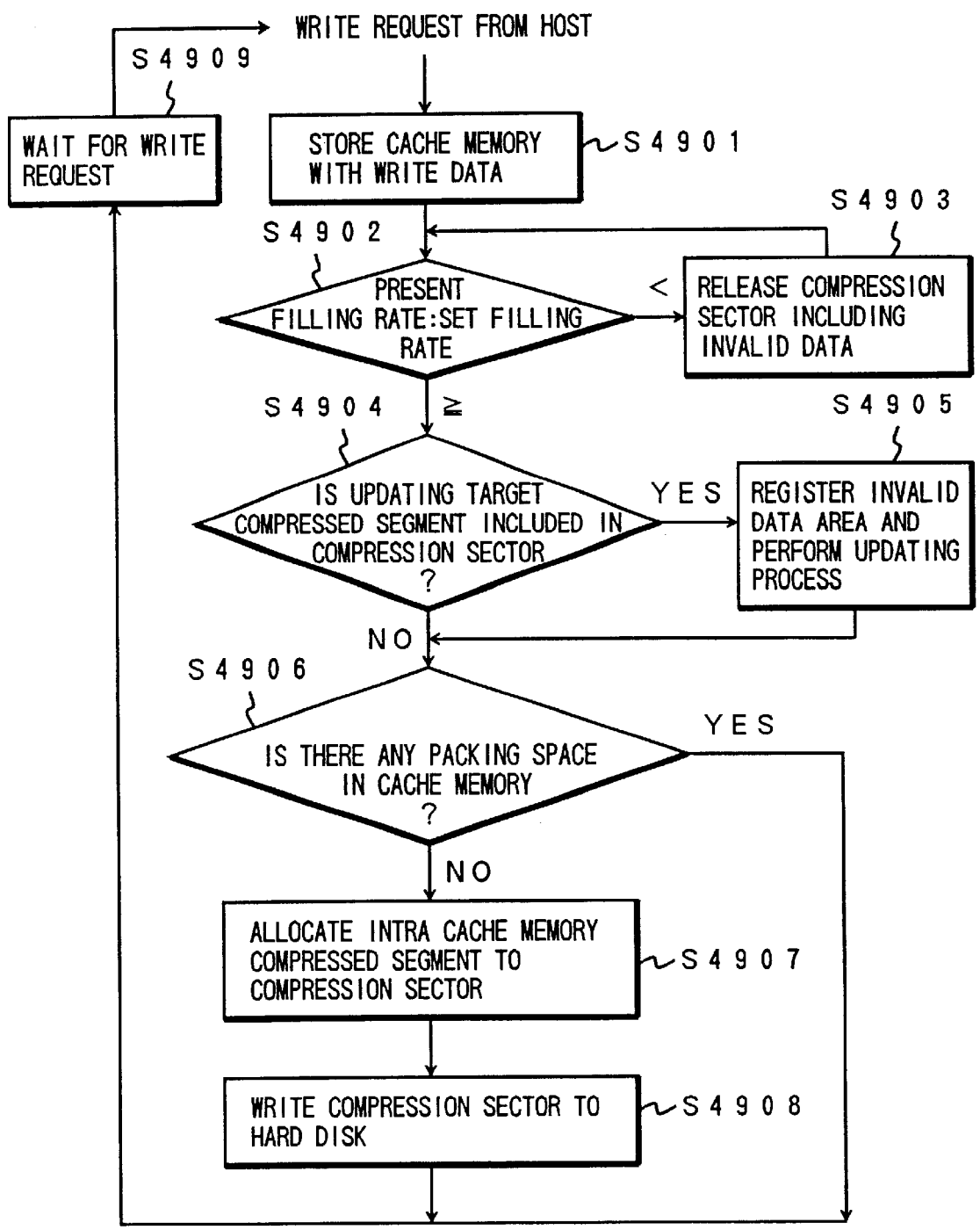
FIG. 49 is a flowchart relative to processes for updating with the emphasis on the access time.

FIG. 49 shows processes for updating with an emphasis on an access time, viz., a flowchart relative to the processes of FIG. 31 that are referred in 4.1.26 and 4.1.27.

At first, when the write request is given from the host 10, the write data is stored in the cache memory 22 (operation 4901).

Thereafter, a present data filling rate in the compression sector is compared with a preset data filling rate (operation 4902).

If the present data filling rate is smaller than the preset data filling rate (a path indicated by "<" in operation 4902), the compression sector including the invalid data is released (operation 4903).

Whereas if the present data filling rate is larger than the preset data filling rate, there is checked whether or not the compression sector includes the compressed segment to be updated (operation 4904).

In the case of including the compressed segment to be updated (a path indicated by YES in operation 4904), the invalid data area is registered, and the updating process is performed (operation 4905).

In the case of including no compressed segment to be updated (a path indicated by NO in operation 4904), whether or not there is a packing space in the cache memory 22 is checked in (operation 4906).

If there is no packing space in the cache memory 22 (a path indicated by NO in operation 4906), the compressed segment in the cache memory 22 is allocated (packed) to the compression sector (operation 4907).

The compression sector allocated with that compressed segment is written to the hard disk 30 (operation 4908).

Whereas if there is the packing space in the cache memory 22 (a path indicated by YES in operation 4906), and after executing operation 4908, the processes from operation 4901 are again executed with a wait for the write request from the host 10 (operation 4909).

Figure 50:
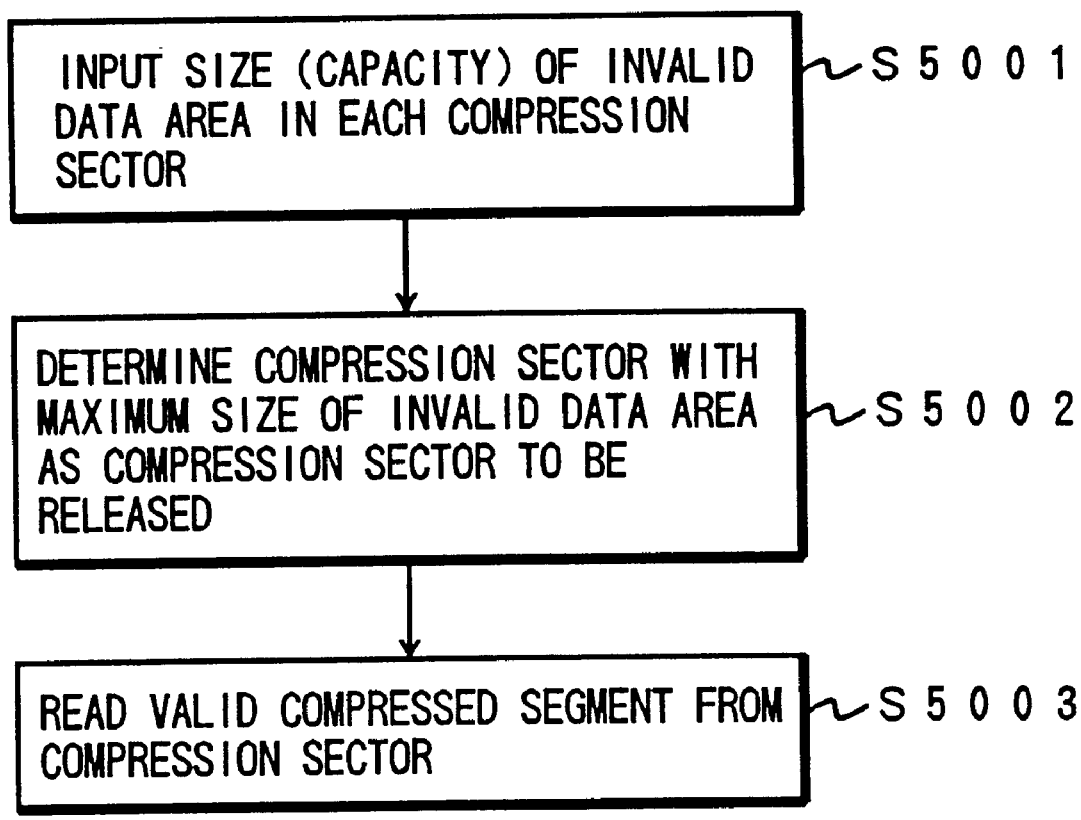
FIG. 50 is a flowchart showing operation 4903 of FIG. 49 in detail.

Next, the processing operation in operation 4903 will be discussed in greater detail with reference to FIG. 50. FIG. 50 shows a flowchart relative to the processes stated in 4.1.27.

At first, a size (capacity) of the invalid data area in each compression sector is input (operation 5001).

Next, the compression sector with a maximum size of the invalid data area is determined as a compression sector to be released (operation 5002). At this time, the table illustrated in FIG. 33 is referred.

Then, the valid compressed segments, viz., the compressed segments allocated to the area other than the invalid data areas are read from the compression sector determined to be released in operation 5002 (operation 5003).

It is apparent that, in this invention, a wide range of different working modes can be formed based on the invention without deviating from the spirit and scope of the invention. This invention is not restricted by its specific working modes except being limited by the appended claims.

What is claimed is:

1. A method of managing compressed data, comprising:

an allocating operation allocating a compressed segment representing data that is obtained by assembling plural pieces of data requested for writing, and compressing the assembled data to a compression sector representing a block having a predetermined length;

a compression sector recording operation recording the compression sector comprising at least one compressed segment on a disk storage device;

an invalid data area changing operation changing, when updating content of a compressed segment in the compression sector recorded in said disk storage device, an area storing the compressed segment corresponding to an update target into an invalid data area;

a comparing operation comparing a size of an invalid data area in each compression sector recorded in said disk storage device with a preset fiducial value;

an operation of determining whether the size of the invalid data area is larger that the preset fiducial value for each compression sector recorded in the disk storage device; and a releasing process executing operation reading from the disk storage device, when it is determined that the size of the invalid data is larger than the preset fiducial value with respect to a certain compression sector, all of the compressed segments, exclusive of the invalid data area, allocated to the certain compression sector and releasing a storage area of the disk storage device recording the certain compression sector.

2. The method of managing compressed data according to claim 1, further comprising:

a compression sector detecting operation detecting a compression sector having a largest invalid data area within one or more compression sectors recorded in the disk storage device, wherein the compression sector releasing process executing operation is executed with respect to the compression sector detected in the compression sector detecting operation.

3. The method of managing compressed data according to claim 2, further comprising:

an operation of managing a table for storing a size of an invalid data area in each compression sector recorded in said disk storage device, wherein the compression sector detecting operation detects the compression sector having a largest invalid data area using the table.

4. A compressed data managing apparatus, comprising:

means for allocating one or more compressed segments to at least one compression sector, each compressed segment representing data that is obtained by assembling plural pieces of data requested for writing, and compressing the assembled data, and the at least one compression sector representing a block having a predetermined length;

means for recording a compression sector allocated with at least one compressed segment on a disk storage device;

means for changing, when updating content of the compressed segment in the compression sector recorded in the disk storage device, an area storing a compressed segment corresponding to an update target into an invalid data area;

means for comparing a size of an invalid data area in each compression sector with a preset fiducial value;

means for determining whether the size of the invalid data area is larger than the preset fiducial value for each compression sector recorded in the disk storage device; and means for reading from the disk storage device, when it is determined that the size of the invalid data area is larger than the preset fiducial value with respect to a certain compression sector, all of the compressed segments, exclusive of the invalid data area, allocated to the certain compression sector and releasing a storage area of the disk storage device recording the certain compression sector.

* * * * *

UNITED STATES PATENT AND TRADEMARK OFFICE
CERTIFICATE OF CORRECTION

PATENT NO.    : 6,745,282 B2
DATED         : June 1, 2004
INVENTOR(S)   : Yoshiyuki, Okada et al.

It is certified that error appears in the above-identified patent and that said Letters Patent is hereby corrected as shown below:

Column 35,
Line 19, please change "larger that the" to -- larger than the --.

Signed and Sealed this

Twenty-first Day of June, 2005

JON W. DUDAS
*Director of the United States Patent and Trademark Office*